(12) United States Patent
Yoneda et al.

(10) Patent No.: US 8,479,001 B2
(45) Date of Patent: Jul. 2, 2013

(54) SELF-AUTHENTICATION COMMUNICATION DEVICE AND DEVICE AUTHENTICATION SYSTEM

(75) Inventors: Takeshi Yoneda, Tokyo (JP); Nobuhiro Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 202 days.

(21) Appl. No.: 13/139,203

(22) PCT Filed: Dec. 9, 2009

(86) PCT No.: PCT/JP2009/070581
§ 371 (c)(1),
(2), (4) Date: Jun. 10, 2011

(87) PCT Pub. No.: WO2010/067812
PCT Pub. Date: Jun. 17, 2010

(65) Prior Publication Data
US 2012/0036364 A1  Feb. 9, 2012

(30) Foreign Application Priority Data

Dec. 11, 2008 (WO) .................. PCT/JP2008/072477

(51) Int. Cl.
*G06F 21/00* (2006.01)

(52) U.S. Cl.
USPC ........................................................ 713/175

(58) Field of Classification Search
USPC ................. 713/175, 168; 726/2, 5, 10, 20
See application file for complete search history.

(56) References Cited

U.S. PATENT DOCUMENTS 6,839,841 B1  1/2005  Medvinsky et al.
6,968,060 B1  11/2005  Pinkas (Continued)

FOREIGN PATENT DOCUMENTS

JP  2001 211171  8/2001
JP  2002 535740  10/2002

(Continued)

OTHER PUBLICATIONS

Kobayashi, N., et al., "Maintenance-Free Security System," The 2010 Symposium on Cryptography and Information Security, pp. 1-5, (Jan. 19-22, 2010) (with partial English translation).

(Continued)

*Primary Examiner* — Brandon Hoffman
*Assistant Examiner* — Anthony Brown
(74) *Attorney, Agent, or Firm* — Oblon, Spivak, McClelland, Maier & Neustadt, L.L.P.

(57) ABSTRACT

In a system where a communication device performs secure communication by using a digital certificate, to enable a device of a communication party to verify that a self certificate is certainly generated by a device indicated on the self certificate even if the self certificate is not delivered offline in advance. Based on a master key and a public parameter, a communication device generates an ID-based encryption private key for which a device unique ID is used as a public key. Then, the communication device generates the digital signature of an RSA public key as a ID-based encryption signature by using the ID-based encryption private key. Then, the communication device generates an RSA self signature for the RSA public key, an expiration date, a host name, the device unique ID, and the ID-based encryption signature as the target. Then, the communication device generates a self-signed certificate to include the ID-based encryption signature and the RSA self signature.

15 Claims, 32 Drawing Sheets

U.S. PATENT DOCUMENTS

| | | |
|---|---|---|
| 6,980,660 B1 | 12/2005 | Hind et al. |
| 7,256,698 B2 | 8/2007 | Su |
| 2002/0194477 A1 | 12/2002 | Arakawa et al. |
| 2003/0177094 A1 | 9/2003 | Needham et al. |
| 2005/0005097 A1 | 1/2005 | Murakawa |

FOREIGN PATENT DOCUMENTS

| | | |
|---|---|---|
| JP | 2002 537685 | 11/2002 |
| JP | 2003 500923 | 1/2003 |
| JP | 2004 519874 | 7/2004 |
| JP | 2005 6076 | 1/2005 |
| JP | 2005 521281 | 7/2005 |
| JP | 2006 094536 | 4/2006 |
| JP | 2007 215103 | 8/2007 |

OTHER PUBLICATIONS

Kobayashi, N., et al., "Trust Distribution Server," The 2008 Symposium on Cryptography and Information Security, total 7 pages, (Jan. 22-25, 2008) (with partial English translation).

Al-Riyami, S.S., et al., "Certificates Public Key Cryptography," Cryptology Eprint Archive, pp. 1-40, (Oct. 21, 2003).

International Search Report issued Mar. 16, 2010 in PCT/JP09/070581 filed Dec. 9, 2009.

International Search Report issued Jan. 20, 2009 in PCT/JP08/072477 filed Dec. 11, 2008.

US 6,425,083, filed Jul. 2002, Wheeler et al.

Fig.26

200:COMMUNICATION DEVICE
- DEVICE UNIQUE ID 291b
- INDIVIDUAL-DEVICE COMMON KEY 293d
- HOST NAME 291c
- RSA KEY PAIR 292
- SELF-SIGNED CERTIFICATE 294

(AFTER SYSTEM CONSTRUCTION PROCESS)

294:SELF-SIGNED CERTIFICATE
- RSA PUBLIC KEY 292b
- EXPIRATION DATE
- HOST NAME 291c
- DEVICE UNIQUE ID 291b
- INDIVIDUAL-DEVICE COMMON KEY MAC 294d OF RSA PUBLIC KEY 292b

RSA SELF SIGNATURE 294a

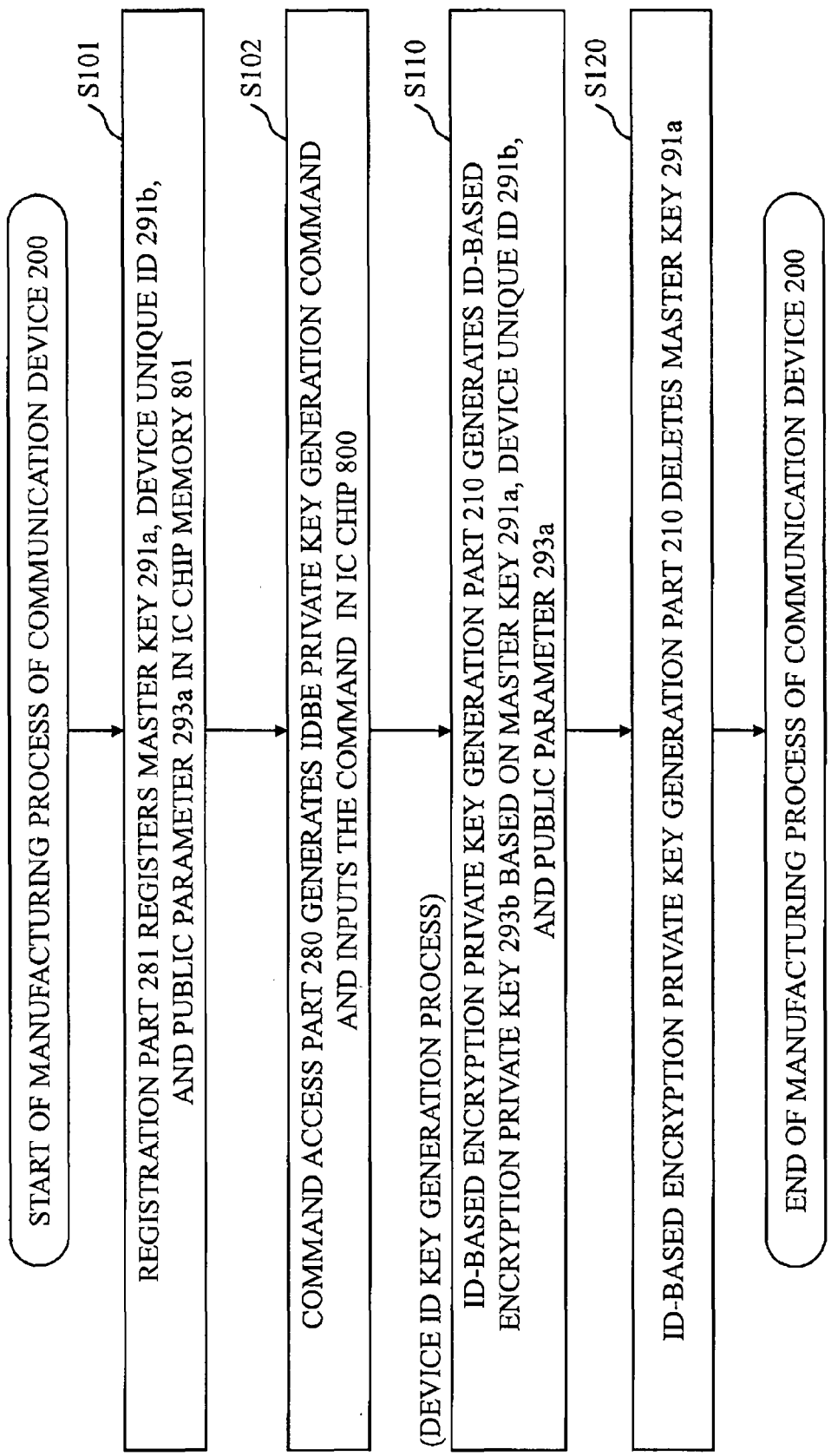

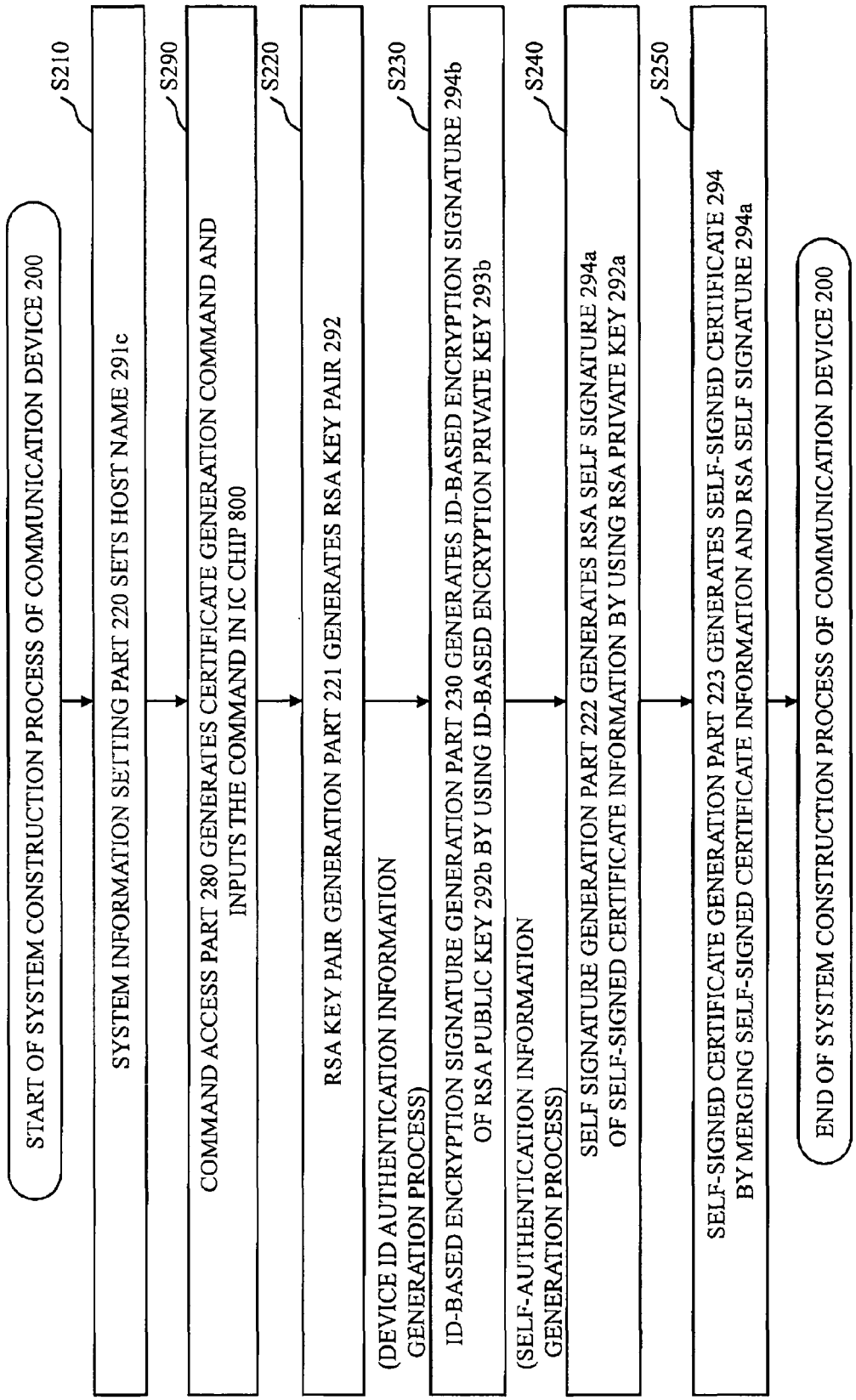

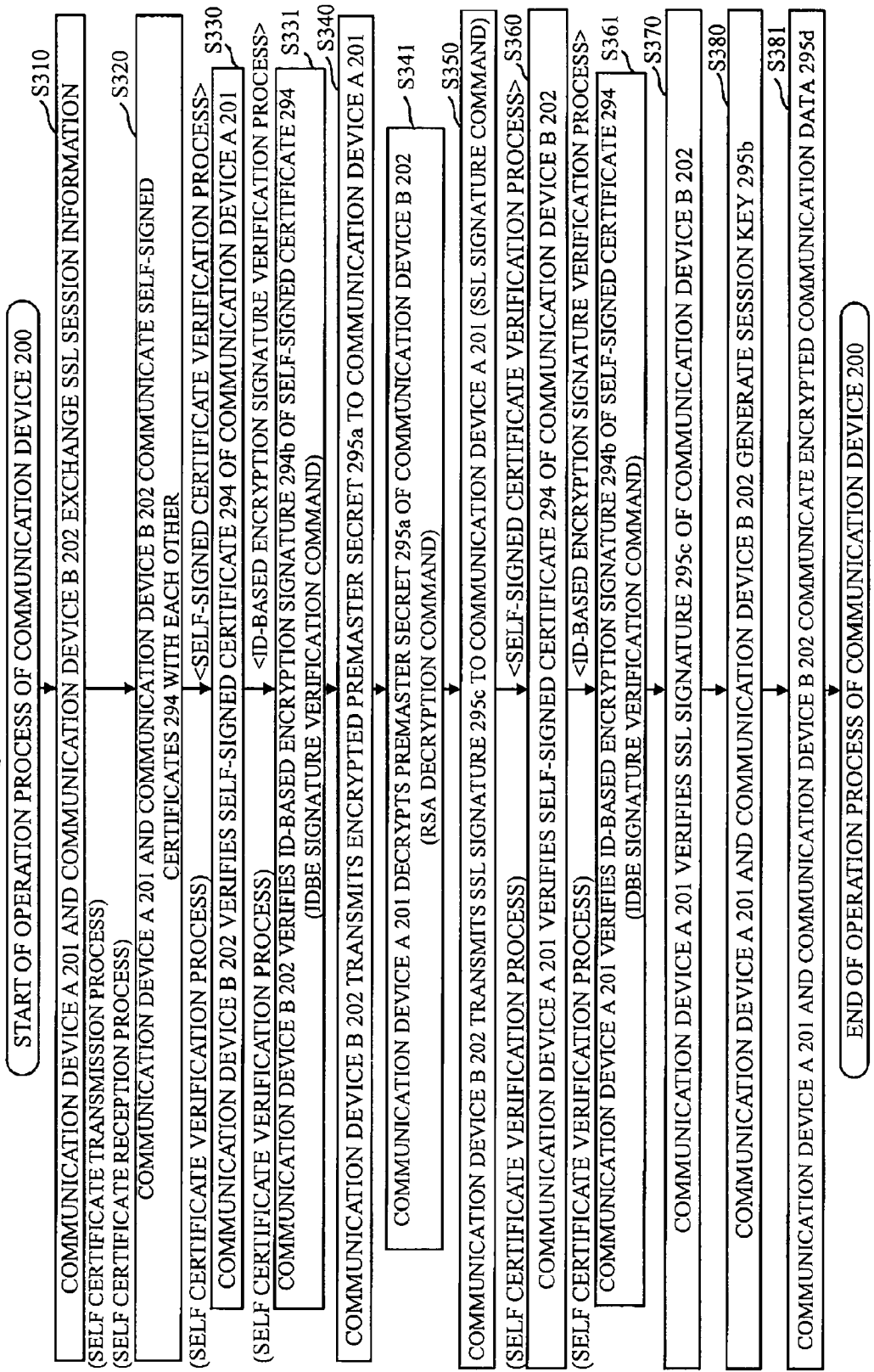

SELF-AUTHENTICATION COMMUNICATION DEVICE AND DEVICE AUTHENTICATION SYSTEM

TECHNICAL FIELD

The present invention relates to a self-authentication communication device, a self-authentication verification communication device, a device authentication system, a device authentication method for a device authentication system, a self-authentication communication program, and a self-authentication verification communication program that allow secure communication between devices, between a device and an administrative terminal, and between a device and a server via, for example, a network.

BACKGROUND ART

Along with the development of the network, products and services that provide an additional value when they are connected to the network are becoming available, for example, a surveillance camera and a video recorder, a car navigation system and a map delivery server, and a home/building facility devices and their administrative terminal.

Network connection can lead to threats such as data interception/tamper or identity fraud. This increases the need for loading a de-facto-standard cryptographic authentication communication function which uses a public key certificate such as SSL (Secure Socket Layer)/TLS (Transport Layer Security) or IPSec (IP Security) on a device, a terminal, or a server.

When practicing cryptographic authentication communication, a key and a certificate which are necessary for encryption and authentication must be set for the device. Such certificate must include the host name and IP address of the device.

As in Patent literature 1, when storing a private key and a certificate in a device at the time of manufacture, information such as an IP address or host name that are not determined yet at the time of device manufacture cannot be stored in the certificate.

As a result, in a case where a device communicates by using a private key and a certificate (for example, when the device has an SSL server function), when the device is accessed by the browser by https communication, the browser displays a message "the access target device may be a fraud". This is due to the following reason. The host-name-corresponding portion of the head portion of the URL specified by the browser does not coincide with the host-name-corresponding portion which is stored at the CommonName of the subject name of the certificate sent from the device in question. As a result, the browser cannot discriminate if the device is the authentic device specified by the host name.

Meanwhile, in order to include the device identification information such as the host name in the device certificate at the time of system construction, after the device identification information is set in the device, the device needs to perform a certificate generation process, and the device identification information needs to be set in the certificate.

If the device administrator is allowed to perform a procedure of obtaining the certificate from the certificate authority and setting the obtained certificate in the device, the certificate including the host name can be set in the device easily. In general, however, it is not allowed to practice a complicated procedure requiring a manual operation for a facility device which is to be installed in a home/building or for an information appliance marketed for home use.

A network camera as one type of facility device comprises a function of automatically generating a certificate including a host name at the time of system construction. The certificate is, however, a self-signed certificate (SelfSign Certificate). Unlike a certificate whose authenticity can be verified based on a certificate separately issued by a certificate authority, for a self-signed certificate, no certificate exists which is issued by a certificate authority to verify the authenticity. For this reason, when a self-signed certificate is to be used, it is necessary to deliver the self-signed certificate to a verification side system by using a secure offline transmission means, and to install the self-signed certificate in the verification side system as a trustworthy certificate.

CITATION LIST

Patent Literature

Patent Literature 1: JP 2004-519874
Patent Literature 2: JP 2001-211171
Patent Literature 3: JP 2002-535740

SUMMARY OF INVENTION

Technical Problem

For example, the object of the present invention is as follows.

The object is, in a system where a device such as a facility device or information appliance performs secure communication by using a certificate, to enable the device to generate and automatically update a certificate that includes device identification information, for example, a host name, which is not determined yet at the time of manufacture.

The object is to enable the device or system of a communication party to verify that the certificate has been surely generated by a device indicated on the certificate even if the certificate is not delivered offline in advance.

Solution to Problem

A self-authentication communication device according to the present invention includes: a device ID key generation part that generates, based on a device ID (IDentity) that identifies the self-authentication communication device, encryption key data as a device ID key by using a CPU (Central Processing Unit), a device ID authentication information generation part that generates, based on public key data of the self-authentication communication device and the device ID key generated by the device ID key generation part, authentication information of the public key data as device ID authentication information by using the CPU; a self-authentication information generation part that generates, based on predetermined data and private key data of the self-authentication communication device, authentication information of the predetermined data as self-authentication information by using the CPU; and a self certificate transmission part that transmits a digital certificate, including the predetermined data, the device ID authentication information generated by the device ID authentication information generation part, and the self-authentication information generated by the self-authentication information generation part, to a specific device as a self certificate (to be called a self-signed certificate as well) by using a communication unit.

The self-authentication information generation part generates the self-authentication information by treating data including the public key data, the device ID, and the device ID authentication information, as the predetermined data. The self certificate transmission part transmits a self certificate, including the device ID authentication information, the self-authentication information, and the predetermined data excluding the device ID authentication information.

The self-authentication communication device further includes an authentication key pair update part that updates the private key data and the public key data, as an authentication key pair at a predetermined timing by using the CPU. The device ID authentication information generation part newly generates the device ID authentication information based on the public key data updated by the authentication key pair update part. The self-authentication information generation part newly generates the self-authentication information based on the private key data updated by the authentication key pair update part. The self certificate transmission part transmits a self certificate, including the device ID authentication information newly generated by the device ID authentication information generation part and the self-authentication information newly generated by the self-authentication information generation part, to the specific device.

The device ID key generation part generates an ID-based encryption private key, having the device ID as an ID-based encryption public key, as the device ID key in accordance with an ID-based encryption system. The device ID authentication information generation part generates an ID-based encryption private key signature, which is a digital signature of the public key data, as the device ID authentication information by using the ID-based encryption private key. The self-authentication information generation part generates a self signature, which is a digital signature of the predetermined data, as the self-authentication information by using the private key data.

The self certificate transmission part transmits the self certificate, including the public key data, the device ID, the ID-based encryption private key signature, and the self signature, to the specific device.

The device ID key generation part generates an individual-device private key which is private key data, and an individual-device public key which is public key data, as the device ID key in accordance with a public key encryption system by using the device ID. The device ID authentication information generation part generates an individual-device private key signature, which is a digital signature of the public key data of the self-authentication communication device, as the device ID authentication information by using the individual-device private key. The self-authentication information generation part generates a self signature, which is a digital signature of the predetermined data, as the self-authentication information by using the private key data of the self-authentication communication device.

The self certificate transmission part transmits the self certificate, including the public key data of the self-authentication communication device, the individual-device public key, the individual-device private key signature, and the self signature, to the specific device.

The self-authentication communication device further includes an individual-device signature generation part that generates a digital signature of the individual-device public key as an individual-device signature based on the private key data of the self-authentication communication device by using the CPU. The self certificate transmission part transmits the self certificate, including the individual-device signature generated by the individual-device signature generation part, to the specific device.

The device ID key generation part generates an individual-device common key, which is common key data, as the device ID key in accordance with a common key encryption system by using the device ID. The device ID authentication information generation part generates an individual-device common key MAC, which is a MAC (Message Authentication Code) of the public key data, as the device ID authentication information by using the individual-device common key. The self-authentication information generation part generates a self signature, which is a digital signature of the predetermined data, as the self-authentication information by using the private key data.

The self certificate transmission part transmits the self certificate, including the public key data, the device ID, the individual-device common key MAC, and the self signature, to the specific device.

A self-authentication verification communication device according to the present invention includes a self certificate reception part that receives a self certificate, transmitted by the self-authentication communication device, by using a communication unit, and a self certificate verification part that verifies the self certificate, received by the self certificate reception part, by using a CPU.

The self certificate reception part receives a self certificate that includes: an ID-based encryption private key signature, which is a digital signature of the public key data generated by using an ID-based encryption private key, for which the device ID is used as an ID-based encryption public key, as the device ID authentication information; and a self signature, which is a digital signature of the predetermined data generated by using the private key data, as the self-authentication information. The self certificate verification part verifies the self signature by using the public key data, and verifies the ID-based encryption private key signature by using the device ID.

The self certificate reception part receives a self certificate that includes: an individual-device private key signature, which is a digital signature of the public key data generated by using an individual-device private key which is private key data based on the device ID, as the device ID authentication information; and a self signature, which is a digital signature of the predetermined data generated by using the private key data, as the self-authentication information. The self certificate verification part verifies the self signature by using the public key data, and verifies the individual-device private key signature by using an individual-device public key corresponding to the individual-device private key.

The self certificate reception part receives a self certificate that includes: an individual-device key MAC, which is a MAC (Message Authentication Code) of the public key data generated by using an individual-device common key which is common key data based on the device ID, as the device ID authentication information; and a self signature, which is a digital signature of the predetermined data generated by using the private key data, as the self-authentication information. The self certificate verification part verifies the self signature by using the public key data, and verifies the individual-device MAC by using the individual-device common key.

A device authentication system according to the present invention includes the self-authentication communication device and the self-authentication verification communication device.

A device authentication method for a device authentication system according to the present invention is a device authentication method for a device authentication system including a self-authentication communication device and a self-authentication verification communication device. In the self-authentication communication device, a device ID key generation part performs a device ID key generation process of generating, based on a device ID (IDentity) that identifies the self-authentication communication device, encryption key data as a device ID key by using a CPU (Central Processing Unit). A device ID authentication information generation part performs a device ID authentication information generation process of generating, based on public key data of the self-authentication communication device and the device ID key generated by the device ID key generation part, authentication information of the public key data as device ID authentication information by using the CPU. A self-authentication information generation part performs a self-authentication information generation process of generating, based on predetermined data and private key data of the self-authentication communication device, authentication information of the predetermined data as self-authentication information by using the CPU. A self certificate transmission part performs a self certificate transmission process of transmitting a digital certificate, including the predetermined data, the device ID authentication information generated by the device ID authentication information generation part, and the self-authentication information generated by the self-authentication information generation part, to a specific device as a self certificate by using a communication unit. In the self-authentication verification communication device, a self certificate reception part performs a self certificate reception process of receiving the self certificate, transmitted by the self-authentication communication device, by using a communication unit. A self certificate verification part performs a self certificate verification process of verifying the self certificate, received by the self certificate reception part, by using a CPU.

A self-authentication communication program according to the present invention causes a communication device to execute a device ID key generation process of generating, based on a device ID (IDentity) that identifies the communication device, encryption key data as a device ID key by using a CPU (Central Processing Unit), a device ID authentication information generation process of generating, based on public key data of the communication device and the device ID key generated by the device ID key generation process, authentication information of the public key data as device ID authentication information by using the CPU, and a self-authentication information generation process of generating, based on predetermined data and private key data of the communication device, authentication information of the predetermined data as self-authentication information by using the CPU, and a self certificate transmission process of transmitting a digital certificate, including the predetermined data, the device ID authentication information generated by the device ID authentication information generation process, and the self-authentication information generated by the self-authentication information generation process, to a specific device as a self certificate by using a communication unit.

A self-authentication verification communication program according to the present invention causes a communication device to execute a self certificate reception process of receiving a self certificate transmitted by the self-authentication communication device, by using a communication unit, and a self certificate verification process of verifying the self certificate received by the self certificate reception process, by using a CPU.

Advantageous Effects of Invention

For example, the present invention provides the following effects.

In a system where a communication device such as a facility device or information appliance performs secure communication by using a digital certificate, the device of a communication party can verify that a self-signed certificate (an example of a digital certificate) has been surely generated by a device indicated on the self-signed certificate even if the self-signed certificate is not delivered offline in advance.

BRIEF DESCRIPTION OF DRAWINGS

FIG. 26 is a view showing stored data at the time of system construction (after the system construction process) of the communication device 200 of the fifth embodiment.

FIG. 30 is a flowchart showing the manufacturing process of the communication device 200 of the sixth embodiment.

FIG. 31 is a flowchart showing the system construction process of the communication device 200 of the sixth embodiment.

FIG. 32 is a flowchart showing the operation process of the communication device 200 of the sixth embodiment.

DESCRIPTION OF EMBODIMENTS

Embodiment 1

An embodiment will be described wherein each device generates an ID-based encryption private key at the time of manufacture, and generates a self-signed certificates including the signature of an RSA public key using the ID-based encryption private key (to be referred to as a registered trademark "RSA" hereinafter) at the time of system construction. The respective devices authenticate each other at the time of operation by using the self-signed certificates.

Figure 1:
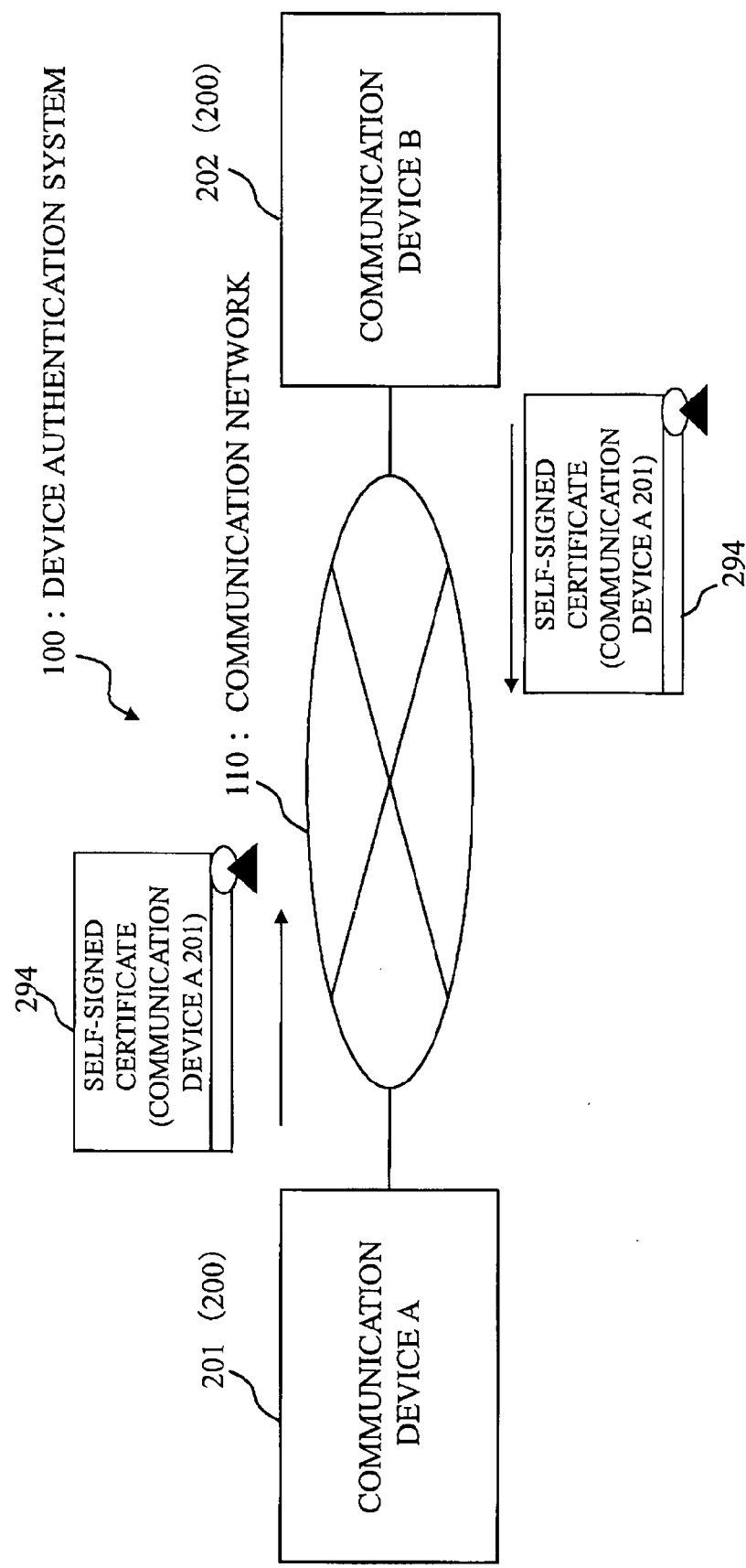
FIG. 1 is an architectural diagram of a device authentication system 100 of the first embodiment.

FIG. 1 is an architectural diagram of a device authentication system 100 of the first embodiment.

The architecture of the device authentication system 100 of the first embodiment will be described hereinafter with reference to FIG. 1.

In the device authentication system 100, a plurality of communication devices 200 (a communication device A 201 and communication device B 202) (examples of a self-authentication communication device) (examples of a self-authentication verification communication device) communicate via a communication network 110 such as the Internet or a LAN (Local Area Network).

When starting communication, the communication devices 200 transmit self-signed certificates 294 (an example of a self certificate) to each other, and verify the self-signed certificate 294 of the communication party to check if the communication party is not a fraud which passes itself as the authentic communication device 200.

Any communication device 200 suffices as far as it is a device having a communication function. Examples of the communication device 200 include a surveillance camera, a video record, and a terminal device (for example, a personal computer) each having a communication function.

Figure 2:
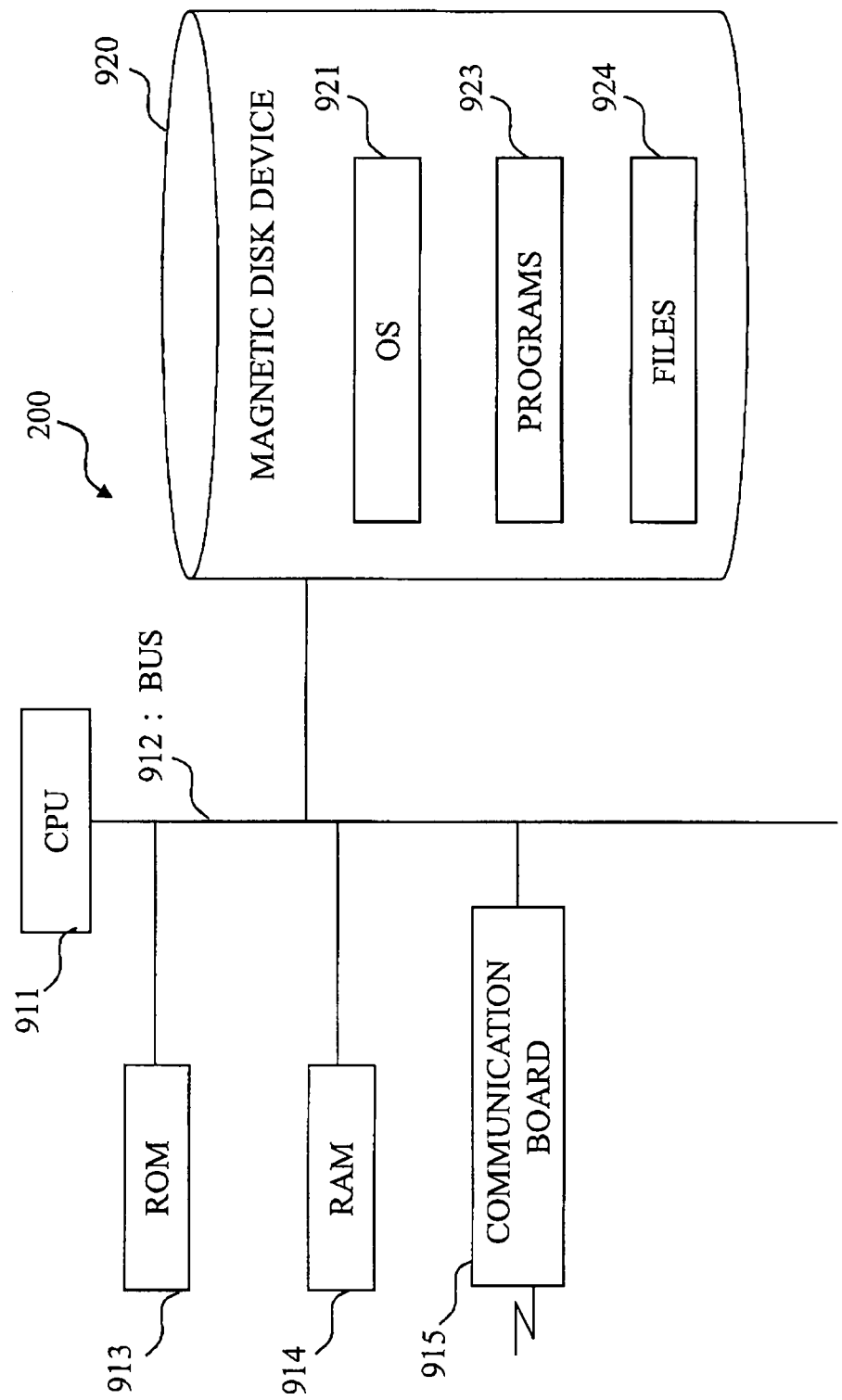
FIG. 2 is a diagram showing examples of the hardware resources of a communication device 200 of the first embodiment.

FIG. 2 is a diagram showing examples of the hardware resources of the communication device 200 of the first embodiment.

Referring to FIG. 2, the communication device 200 comprises a CPU 911 (also referred to as a Central Processing Unit, central processing device, processing device, computation device, microprocessor, microcomputer, or processor) that executes programs. The CPU 911 is connected to a ROM 913, a RAM 914, a communication board 915, and a magnetic disk device 920 via a bus 912, and controls these hardware devices. In place of the magnetic disk device 920, another storage device (for example, a semiconductor memory like a RAM or a flash memory) may be employed.

The RAM 914 is an example of a volatile memory. The storage media of the ROM 913 and magnetic disk device 920 are examples of a nonvolatile memory. These devices are examples of a storage device, storage unit, or storage part. The storage device which stores input data is an example of an input device, input unit, or input part. The storage device which stores output data is an example of an output device, output unit, or output part.

The communication board 915 is an example of an input/output device, input/output unit, or input/output part.

The communication board 915 is connected to a communication network such as a LAN, the Internet, a WAN (Wide Area Network), or a telephone circuit by wired connection or wireless connection.

The magnetic disk device 920 stores an OS 921 (operating system), programs 923, and files 924. Each program in the programs 923 is executed by the CPU 911 and the OS 921.

The programs 923 store a program that executes functions each described as a "part" in the embodiments. The program is read and executed by the CPU 911.

The files 924 store result data such as "determination result", "calculation result", and "processing result" obtained when the function of a "part" is executed, data transferred between the programs each of which executes the function of a "part", and other information, data, signal values, variable values, and parameters, as the items of a "file" and of a "database".

The "files" and "databases" are stored in a recording medium such as a disk or memory. The information, data, signal values, variable values, and parameters stored in the storage medium such as a disk and memory are read out to the main memory or cache memory by the CPU 911 via a read/write circuit, and are used for the operations of the CPU such as extraction, retrieval, reference, comparison, computation, calculation, process, output, print, and display. During these operations of the CPU, the information, data, signal values, variable values, and parameters are temporarily stored in the main memory, cache memory, or buffer memory.

The arrows in the flowcharts described in the embodiment mainly indicate input/output of data and signals. The data and signal values are stored in the memory of the RAM 914, the magnetic disk of the magnetic disk device 920, or other recording medium. The data and signal values are transferred online via the bus 912, signal lines, cables, or other transmission medium.

The "part" described in the embodiment may be a "circuit", "unit" or "device"; or a "step", "procedure", or "process". Namely, the "part" may be realized by the firmware stored in the ROM 913. Alternatively, the "part" may be embodied by only software; by only hardware such as an element, a device, a substrate, or a wiring line; by a combination of software and hardware; or furthermore a combination including firmware. The firmware and software are stored in a magnetic disk or other recording medium as programs. The program is read by the CPU 911 and executed by the CPU 911. In other words, a program causes the computer to function as a "part". Alternatively, the program causes the communication device 200 (computer) to execute the procedure and method of the "part".

Figure 3:
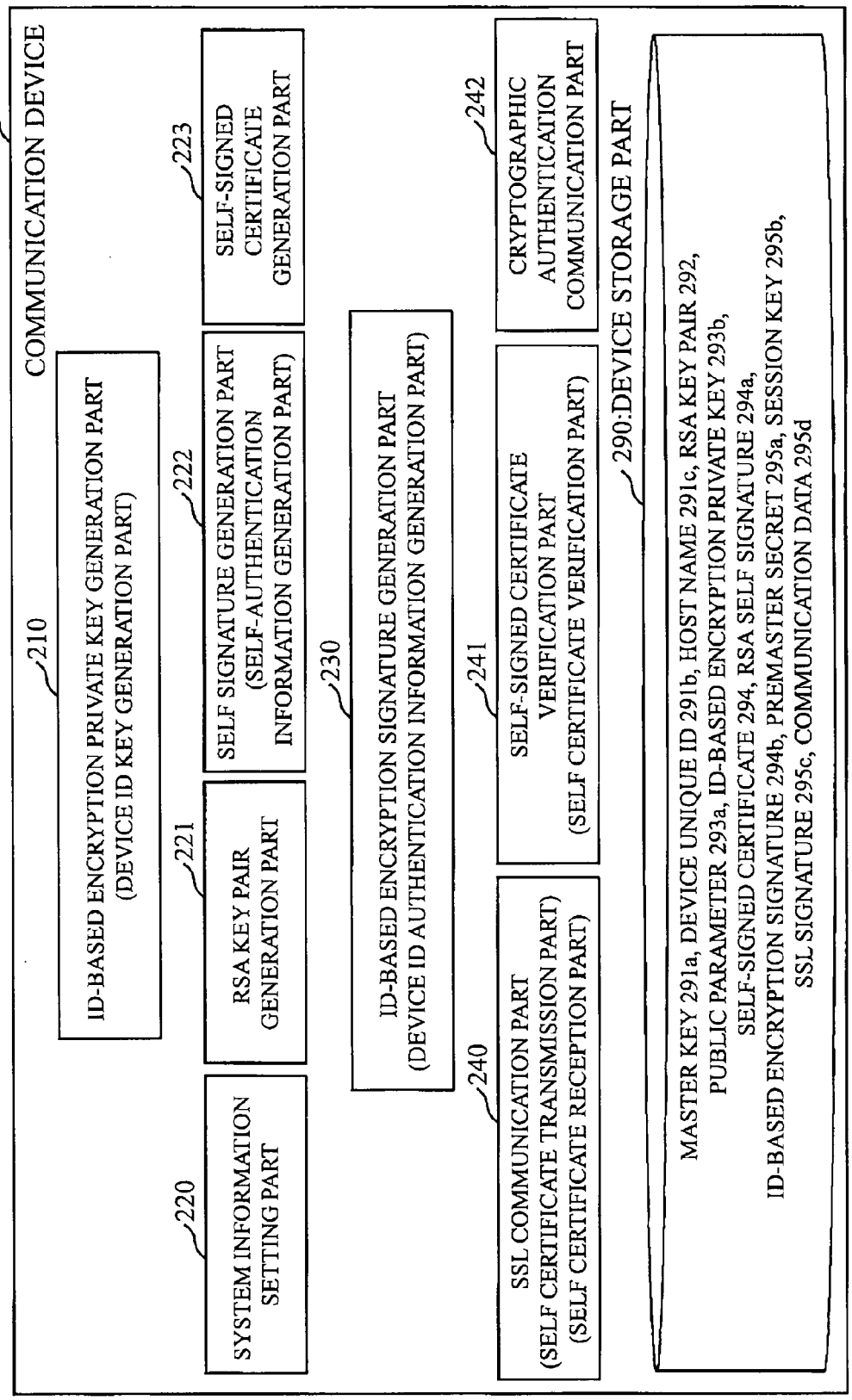
FIG. 3 is a function block diagram of the communication device 200 of the first embodiment.

FIG. 3 is a function block diagram of the communication device 200 of the first embodiment.

The function blocks of the communication device 200 (an example of a self-authentication communication device) (an example of a self-authentication verification communication device) of the first embodiment will be described hereinafter with reference to FIG. 3.

The communication device 200 comprises an ID-based encryption private key generation part 210 (an example of a device ID key generation part), a system information setting part 220, an RSA key pair generation part 221, a self signature generation part 222 (an example of a self-authentication information generation part), a self-signed certificate generation part 223, an ID-based encryption signature generation part 230 (an example of a device ID authentication information generation part), an SSL communication part 240 (an example of a self certificate transmission part) (an example of a self certification reception part), a self-signed certificate verification part 241 (an example of a self certificate verification part), an cryptographic authentication communication part 242, and a device storage part 290.

By using a storage medium, the device storage part 290 stores data to be used by the communication device 200.

For example, the device storage part 290 stores a master key 291a, a device unique ID 291b, a host name 291c, an RSA key pair 292, a public parameter 293a, an ID-based encryption private key 293b, a self-signed certificate 294, an RSA self signature 294a, an ID-based encryption signature 294b, a premaster secret 295a, a session key 295b, an SSL signature 295c, and communication data 295d which are to be described later.

By using the CPU and based on the device unique ID 291b (device ID) (ID; Identity, IDentifier) that identifies its own communication device 200, the ID-based encryption private key generation part 210 (an example of the device ID key generation part) generates encryption key data as a device ID key.

More specifically, the ID-based encryption private key generation part 210 generates the ID-based encryption private key 293b (an example of the device ID key), which uses the device unique ID 291b as an ID-based encryption public key, in accordance with the ID-based encryption system.

The system information setting part 220 sets (stores) information (for example, a device identification name such as an IP address or host name) which is determined and input by the administrator at the time of system construction, in the device storage part 290.

By using the CPU, the RSA key pair generation part 221 generates the RSA key pair 292 (an RSA private key 292a and an RSA public key 292b) in accordance with the RSA public key encryption system.

By using the CPU, the self signature generation part 222 (an example of the self-authentication information generation part) generates the authentication information of predetermined data as self-authentication information based on the predetermined data and the private key data of its own communication device 200.

More specifically, by using the RSA private key 292a (an example of the private key data), the self signature generation part 222 generates a digital signature for the RSA public key 292b (an example of the public key data), the expiration date of the self-signed certificate 294, the host name 291c, the device unique ID 291b, and the ID-based encryption signature 294b (examples of the device ID authentication information) (all of which are examples of the predetermined data), as the RSA self signature 294a (an example of the self-authentication information).

The self-signed certificate generation part 223 generates the self-signed certificate 294 by merging the predetermined data, the ID-based encryption signature 294b, and the RSA self signature 294a by using the CPU.

More specifically, the self-signed certificate generation part 223 generates the self-signed certificate 294 by merging the RSA public key 292b, the expiration date of the self-signed certificate 294, the host name 291c, the device unique ID 291b, the ID-based encryption signature 294b, and the RSA self signature 294a.

By using the CPU, the ID-based encryption signature generation part 230 (an example of the device ID authentication information generation part) generates the authentication information of the public key data as device ID authentication information based on the public key data and the device ID key of the communication device to which the ID-based encryption signature generation part 230 belongs.

More specifically, by using the ID-based encryption private key 293b, the ID-based encryption signature generation part 230 generates the digital signature of the RSA public key 292b as the ID-based encryption signature 294b (the ID-based encryption private key signature) (an example of the device ID authentication information).

By using a communication unit, the SSL communication part 240 transmits and receives various types of data to and from the communication device 200 of the communication party in accordance with a procedure based on the SSL protocol, and establishes a session with the communication device 200 of the communication party.

For example, the SSL communication part 240 (an example of the self certificate transmission part) transmits the self-signed certificate 294 to the communication device 200 of the communication party.

Also, the SSL communication part 240 (an example of the self certificate reception part) receives the self-signed certificate 294 transmitted from the communication device 200 of the communication party.

By using the CPU, the self-signed certificate verification part 241 (an example of the self certificate verification part) verifies the self-signed certificate 294 of the communication party which is received by the SSL communication part 240.

More specifically, the self-signed certificate verification part 241 verifies the RSA self signature 294a by using the RSA public key 292b of the communication party, and verifies the ID-based encryption signature 294b by using the device unique ID 291b of the communication party.

After the SSL communication part 240 establishes the session, the cryptographic authentication communication part 242 transmits and receives the communication data 295d, which is encrypted by the session key 295b, to and from the communication device 200 of the communication party by using the communication unit.

Hereinafter, the life cycle of the device authentication system 100 will be divided into "manufacture", "system construction", and "operation", and the process of the communication device 200 in each process will be explained.

First, a process to be executed by the communication device 200 at the time of manufacture (the manufacturing process of the communication device 200) will be described.

The communication device 200 generates the ID-based encryption private key 293b at the time of manufacture and stores it.

Figure 4:
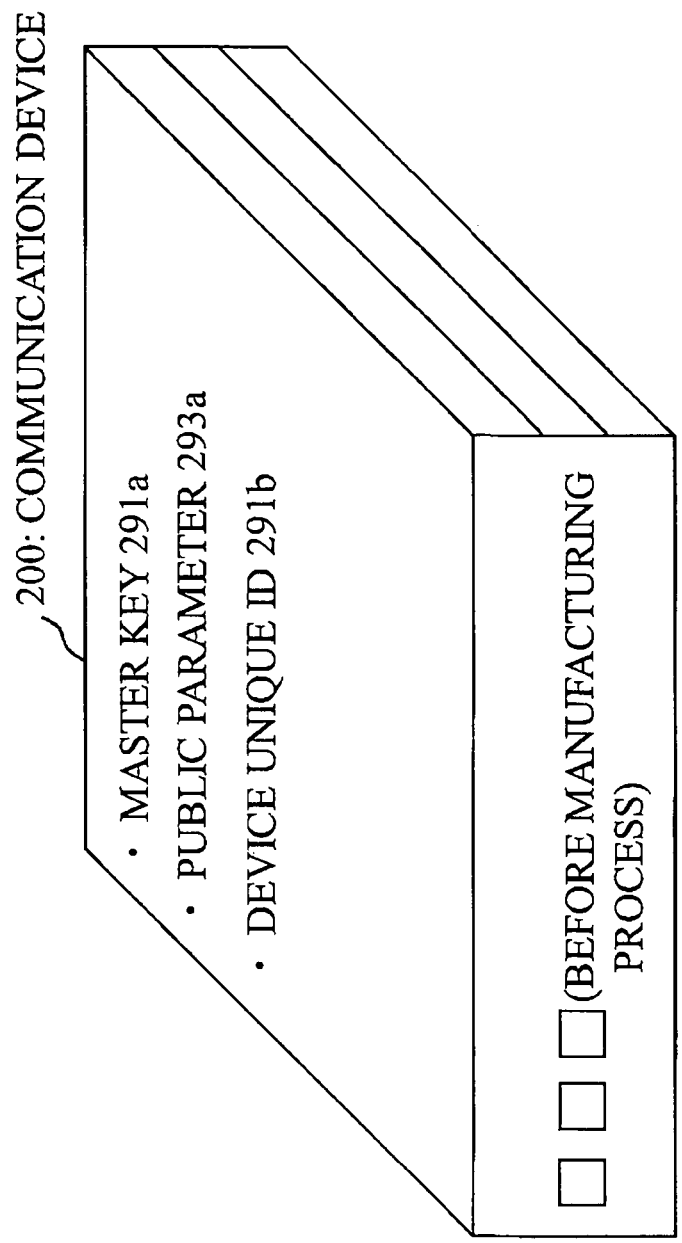
FIG. 4 is a view showing stored data at the time of manufacture (before the manufacturing process) of the communication device 200 of the first embodiment.

FIG. 4 is a view showing stored data at the time of manufacture (before the manufacturing process) of the communication device 200 of the first embodiment.

As shown in FIG. 4, when the communication device 200 is manufactured, the master key 291a, the public parameter 293a, and the device unique ID 291b are registered (stored) in the device storage part 290 (not shown) of the communication device 200.

The master key 291a and public parameter 293a are information that are used for generating the ID-based encryption private key 293b, and are the same among all the communication devices 200. The master key 291a and the public parameter 293a are information that form a pair in the ID-based encryption system, and are called, for example, a system private key and system public key, or a master private key and master public key. For example, the manufacturer of the communication device 200 registers the same master key 291a and the same public parameter 293a in all the communication devices 200 (that may be limited to those of the same type) which the manufacturer manufactured.

The device unique ID 291b is unique information that identifies the communication device 200 individually, and is unique to each device and invariable. A MAC address (MAC: Media Access Control) and device serial number are examples of the device unique ID 291b. The device unique ID 291b is assigned to each communication device 200 and registered at the time of manufacture.

Figure 5:
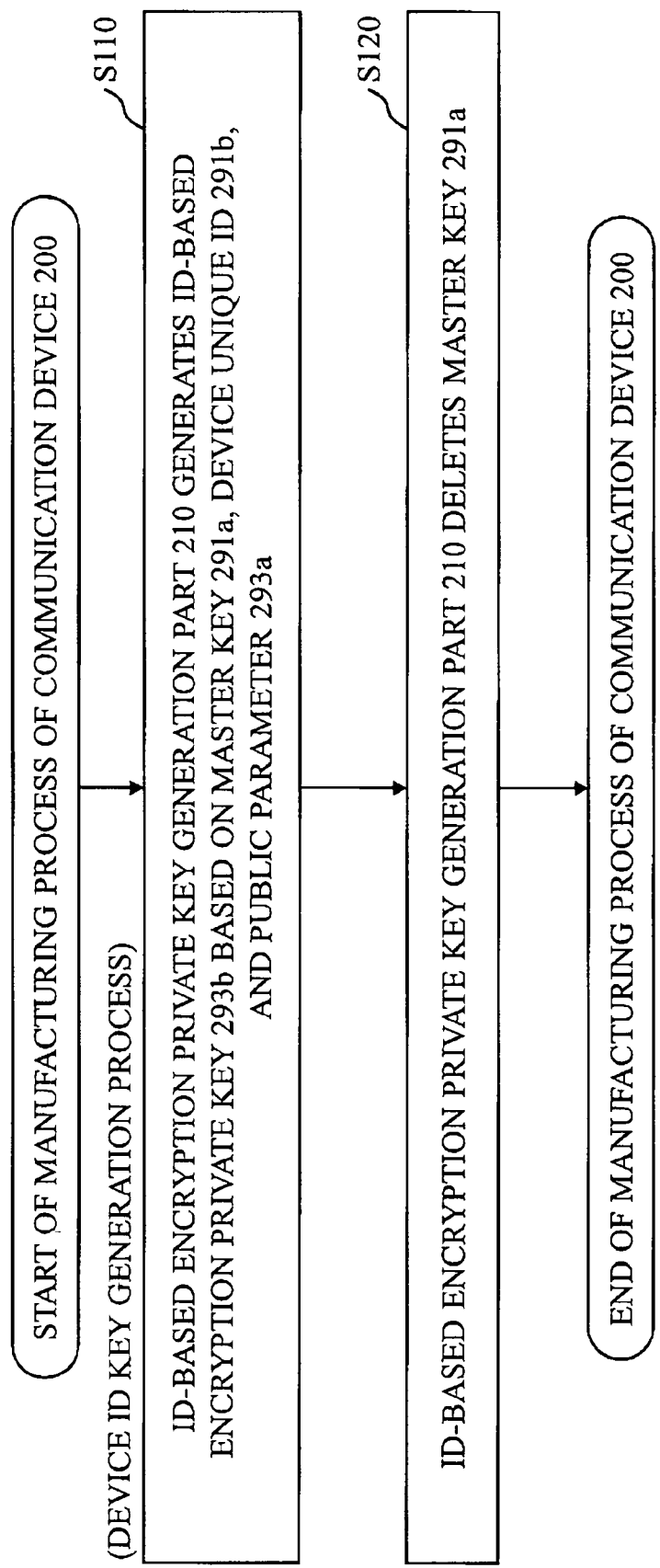
FIG. 5 is a flowchart showing the manufacturing process of the communication device 200 of the first embodiment.

FIG. 5 is a flowchart showing the manufacturing process of the communication device 200 of the first embodiment.

The manufacturing process of the communication device 200 of the first embodiment will be described with reference to FIG. 5.

Each "part" of the communication device 200 executes the process to be described below by using the CPU.

The ID-based encryption private key generation part 210 generates the ID-based encryption private key 293b based on the master key 291a, device unique ID 291b, and public parameter 293a (S110), and deletes the master key 291a (S120).

The respective processes (S110, S120) will be described in detail hereinbelow.

<S110: Example of Device ID Key Generation Process>

The ID-based encryption private key generation part 210 acquires the master key 291a, device unique ID 291b, and public parameter 293a from the device storage part 290.

The ID-based encryption private key generation part 210 executes a key generation algorithm of the ID-based encryption system by treating the acquired master key 291a, device unique ID 291b, and public parameter 293a as input values, to generate the ID-based encryption private key 293b for which the device unique ID 291b is used as the public key (ID-based encryption public key).

The ID-based encryption private key generation part 210 stores the generated ID-based encryption private key 293b in the device storage part 290.

After S110, the process proceeds to S120.

<S120>

The ID-based encryption private key generation part 210 deletes (erases) the master key 291a used for generating the ID-based encryption private key 293b from the device storage part 290.

By deleting the master key 291a, the ID-based encryption private key generation part 210 prevents the master key 291a from leaking from the communication device 200 unloaded from the location of manufacture, so the ID-based encryption private key 293b will not be falsified using the master key 291a that has leaked.

After S120, the process ends.

The manufacturing process of the communication device 200 is executed, for example, manually by the manufacturer, or at the registration of the master key 291a, device unique ID 291b, and public parameter 293a.

Figure 6:
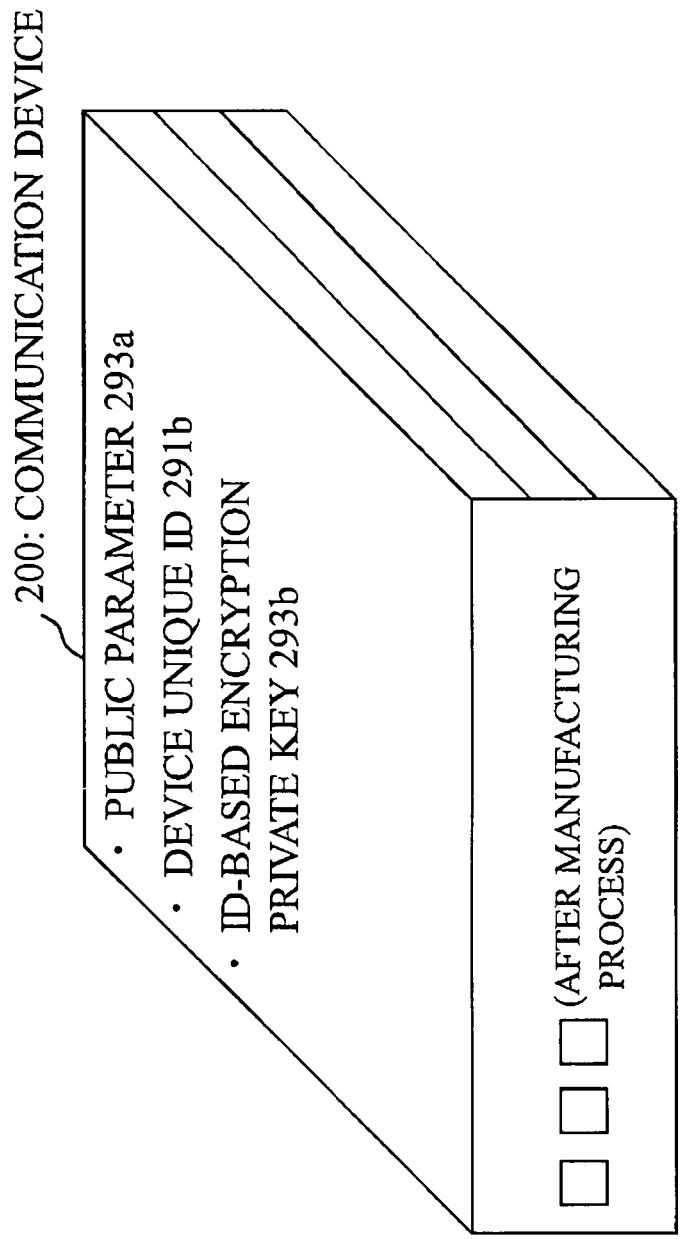
FIG. 6 is a view showing stored data at the time of manufacture (after the manufacturing process) of the communication device 200 of the first embodiment.

FIG. 6 is a view showing stored data at the time of manufacture (after the manufacturing process) of the communication device 200 of the first embodiment.

As shown in FIG. 6, after the manufacturing process of the communication device 200, the public parameter 293a, the device unique ID 291b, and the ID-based encryption private key 293b are stored in the device storage part 290 (not shown) of the communication device 200.

A process executed by the communication device 200 at the time of system construction (a system construction process of the communication device 200) will be described.

At the time of system construction, the communication device 200 generates and stores the self-signed certificate 294.

Figure 7:
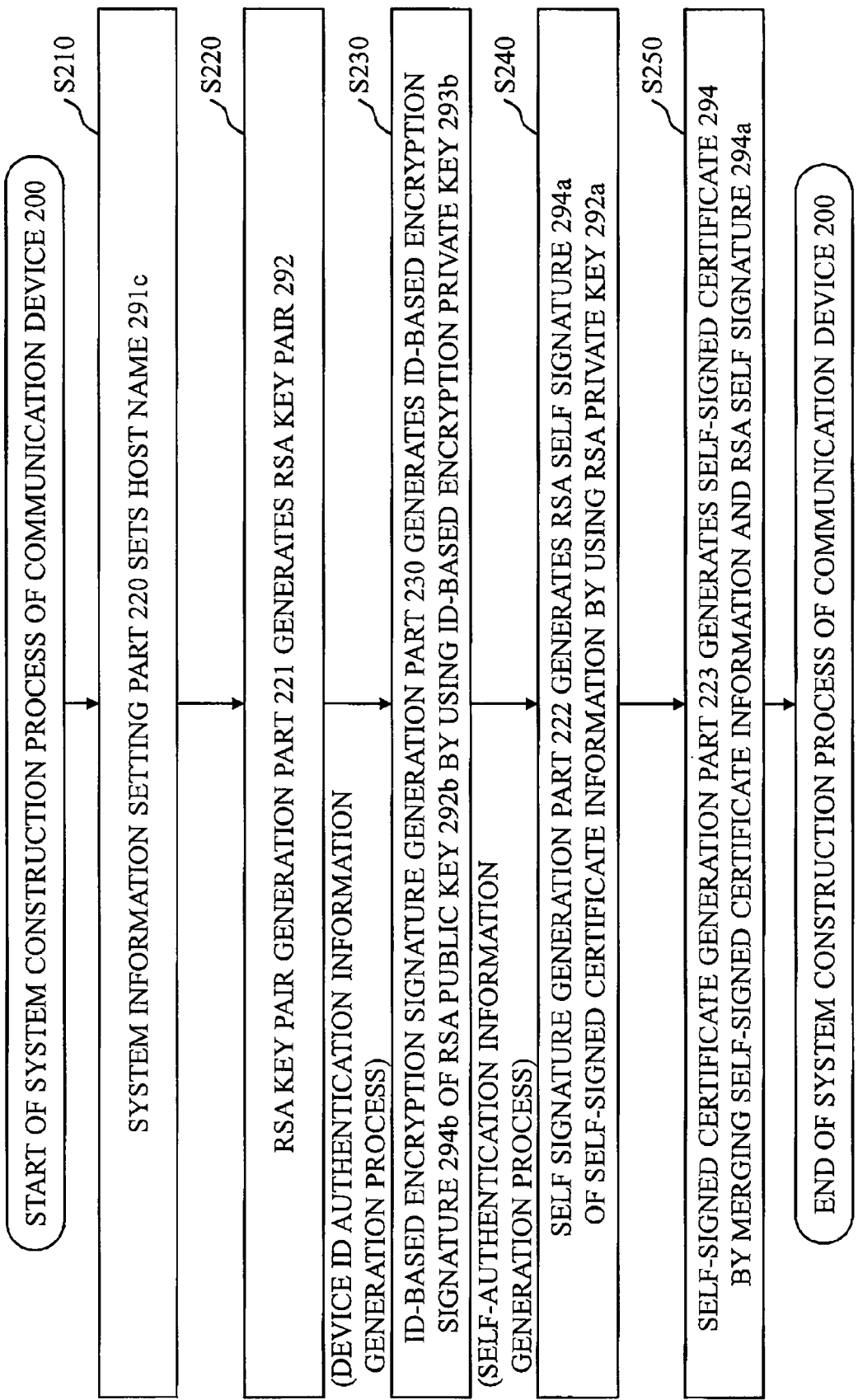
FIG. 7 is a flowchart showing the system construction process of the communication device 200 of the first embodiment.

FIG. 7 is a flowchart showing the system construction process of the communication device 200 of the first embodiment.

The system construction process of the communication device 200 of the first embodiment will be described with reference to FIG. 7.

Each "part" of the communication device 200 executes the processes to be described below by using the CPU.

The system information setting part 220 sets the host name 291c (S210), and the RSA key pair generation part 221 generates the RSA key pair 292 (S220).

The ID-based encryption signature generation part 230 generates the ID-based encryption signature 294b of the RSA public key 292b by using the ID-based encryption private key 293b (S230). The self signature generation part 222 generates the RSA self signature 294a of the self-signed certificate information by using the RSA private key 292a (S240). The self-signed certificate generation part 223 generates the self-signed certificate 294 by merging the self-signed certificate information and the RSA self signature 294a (S250).

The respective processes (S210 to S250) will be described in detail.

<S210>

At the time of system construction, information necessary for the system construction and operation (for example, device identification name) is input to the communication device 200 by the administrator. The host name and IP address are examples of the device identification name, and differ from one communication device 200 to another. Description will be made on an assumption that "host name" is input to the communication device 200.

The system information setting part 220 sets (stores) the host name input by the administrator in the device storage part 290.

After S210, the process proceeds to S220.

<S220>

The RSA key pair generation part 221 executes the key generation algorithm of the RSA public key encryption system, to generate the RSA key pair 292. The RSA key pair 292 is composed of the RSA private key 292a and the RSA public key 292b. The RSA key pair generation part 221 stores the generated RSA key pair 292 in the device storage part 290.

After S220, the process proceeds to S230.

<S230: Example of Device ID Authentication Information Generation Process>

The ID-based encryption signature generation part 230 acquires the ID-based encryption private key 293b generated at the time of manufacture (S110) and the RSA public key 292b generated in S220, from the device storage part 290.

The ID-based encryption signature generation part 230 executes the signature algorithm of the ID-based encryption system by treating the acquired ID-based encryption private key 293b and RSA public key 292b as input values, to generate the ID-based encryption signature 294b of the RSA public key 292b. The ID-based encryption signature 294b of the RSA public key 292b is a digital signature generated for the RSA public key 292b as the target by using the ID-based encryption private key 293b.

The ID-based encryption signature generation part 230 stores the ID-based encryption signature 294b of the generated RSA public key 292b in the device storage part 290.

After S230, the process proceeds to S240.

<S240: Example of Self-Authentication Information Generation Process>

The self signature generation part 222 acquires the RSA private key 292a generated in S220 and various types of information (self-signed certificate information) to be included in the self-signed certificate 294, from the device storage part 290.

The self signature generation part 222 executes the signature algorithm of the RSA public key encryption system by treating the acquired RSA private key 292a and self-signed certificate information as input values, to generate the RSA self signature 294a of the self-signed certificate information. The RSA self signature 294a of the self-signed certificate information is a digital signature generated for the self-signed certificate information as the target by using the RSA private key 292a.

In the following explanation, the ID-based encryption signature 294b, the expiration date of the self-signed certificate 294, the host name 291c, the device unique ID 291b, and the ID-based encryption signature 294b of the RSA public key 292b are the self-signed certificate information. The expiration date of the self-signed certificate 294 is the date calculated by adding a predetermined validity period (for example, 2 years) to the current date. The self-signed certificate information is not limited to the above information.

After S240, the process proceeds to S250.

<S250>

The self-signed certificate generation part 223 generates the self-signed certificate 294 (digital certificate) by merging the self-signed certificate information and the RSA self signature 294a which is generated in S240, and stores the generated self-signed certificate 294 in the device storage part 290.

For example, the host name 291c may be set in the CommonName field of the subject name of the digital certificate. The device unique ID 291b may be set in the SubjectAltName field of the standard extension item of the digital certificate. The ID-based encryption signature 294b may be set in the SubjectKeyIdentifier field of the standard extension item of the digital certificate. Note that the device unique ID 291b and ID-based encryption signature 294b suffice if they are set in a space that matches the format of the digital certificate, and need not necessarily be set as a standard extension item. For example, the self-signed certificate generation part 223 may set the device unique ID 291b and the ID-based encryption signature 294b in private extension item fields that are newly defined in the digital certificate, or in other fields of the standard extension item.

After S250, the process ends.

The certificate generation process carried out in S230 to S250 is the process obtained by adding, to a general self-signed certificate generation process procedure for an RSA public key which is executed in OpenSSL and the like, the signature generation process (S230) for the RSA public key 292b by using the ID-based encryption private key 293b, and the process (S240) of including the device unique ID 291b being the ID-based encryption public key, and the signature (ID-based encryption signature 294b) obtained by using the ID-based encryption private key 293b, as the signature target of the certificate.

Figure 8:
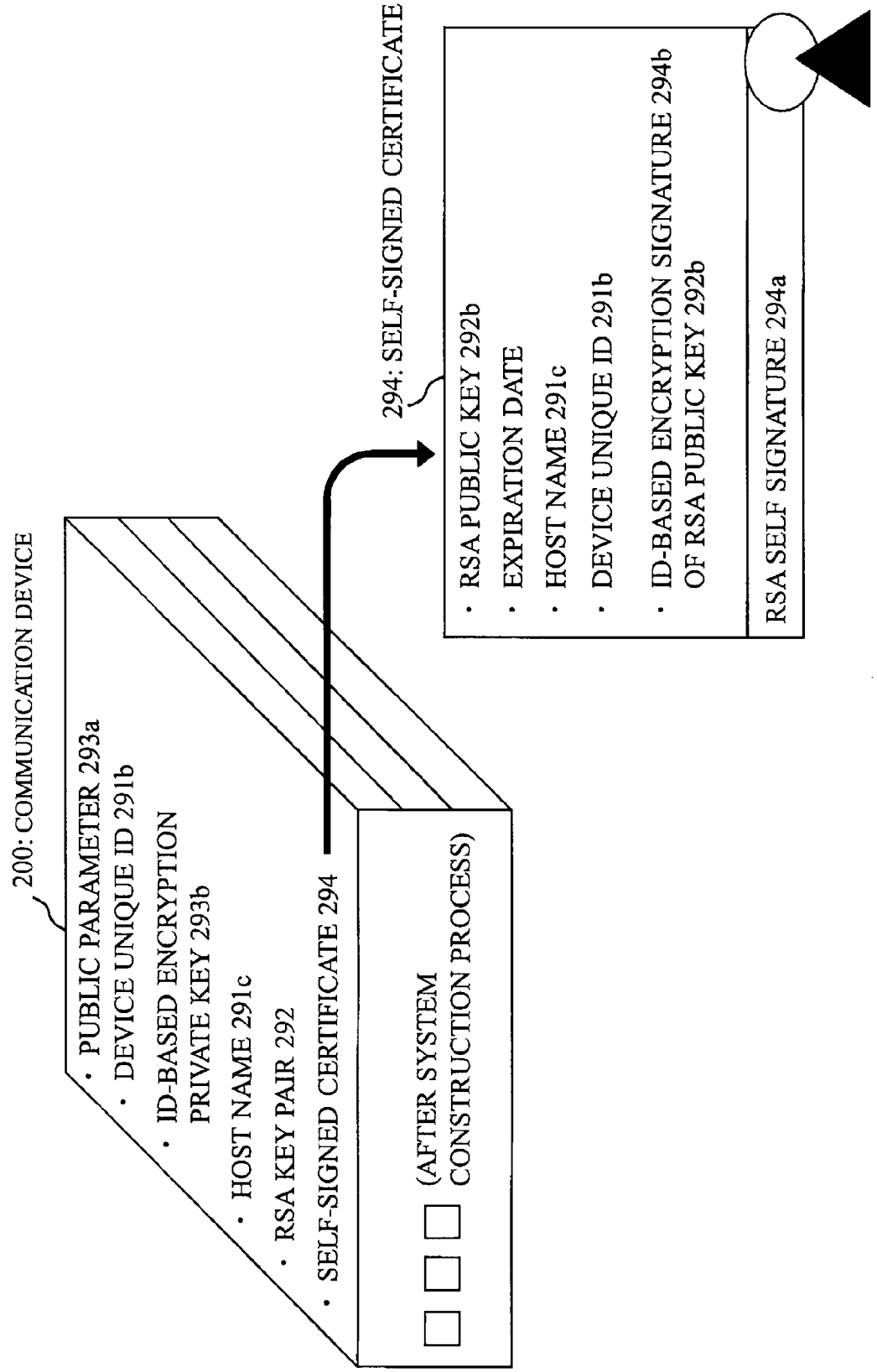
FIG. 8 is a view showing stored data at the time of system construction (after the system construction process) of the communication device 200 of the first embodiment.

FIG. 8 is a view showing stored data at the time of system construction (after the system construction process) of the communication device 200 of the first embodiment.

As shown in FIG. 8, after the system construction process of the communication device 200, the public parameter 293a, the device unique ID 291b, the ID-based encryption private key 293b, the host name 291c, the RSA key pair 292, and the self-signed certificate 294 are stored in the device storage part 290 (not shown) of the communication device 200.

The RSA public key 292b, the expiration date of the self-signed certificate 294, the host name 291c, the device unique ID 291b, the host name 291c being the public key of the ID-based encryption, the ID-based encryption signature 294b of the RSA public key 292b, and the RSA self signature 294a are set in the self-signed certificate 294.

The process to be executed by the communication device 200 at the time of operation (the operation process of the communication device 200) will now be described.

Figure 9:
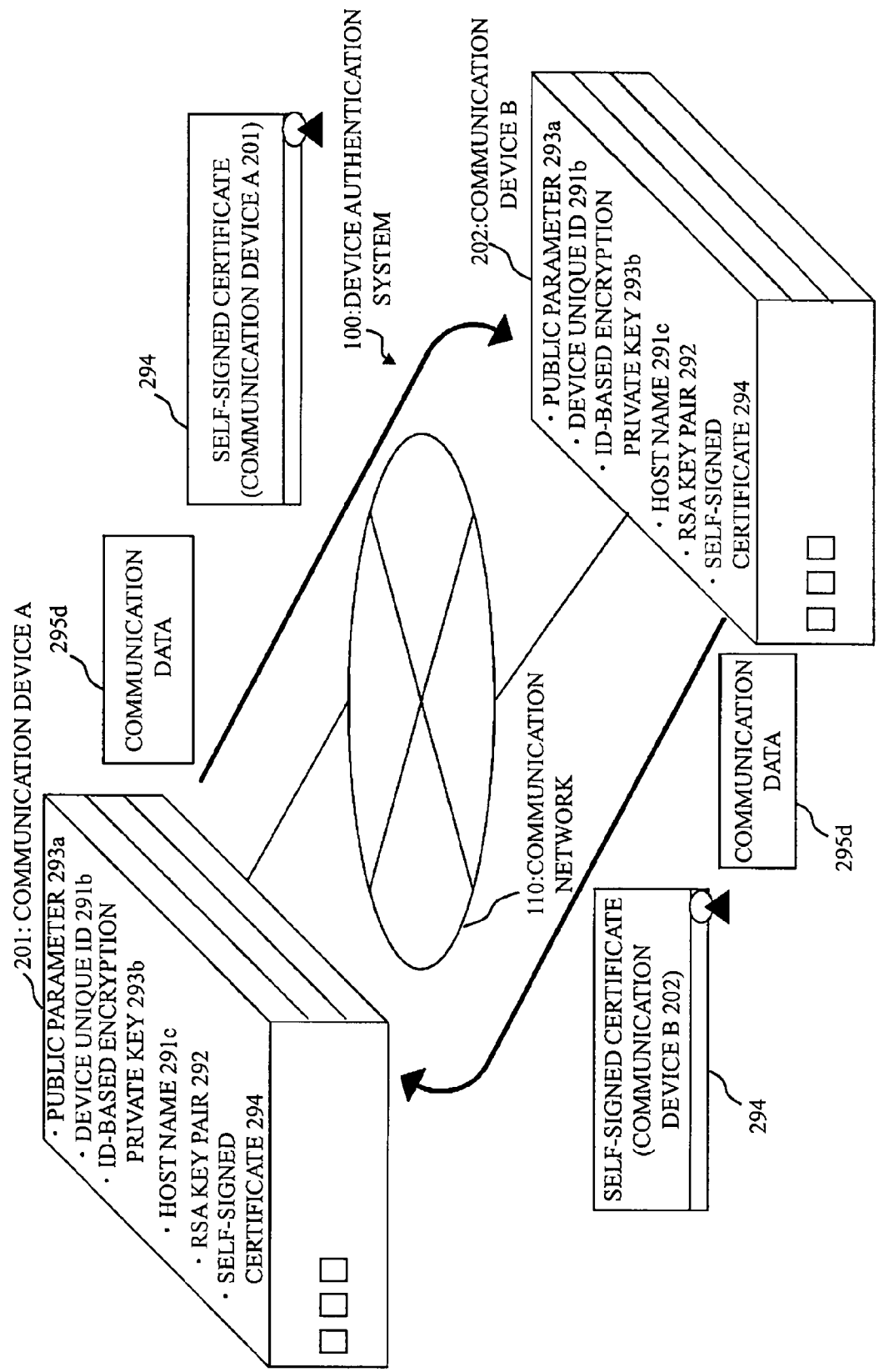
FIG. 9 is a view showing the operation outline of the device authentication system 100 of the first embodiment.

FIG. 9 is a view showing the operation outline of the device authentication system 100 of the first embodiment.

As shown in FIG. 9, the communication device A 201 and communication device B 202 communicate the self-signed certificates 294 via the communication network 110, acknowledge each other by verifying the self-signed certificates 294, and then communicate the encrypted communication data 295d via the communication network 110.

At the time of operation, the public parameter 293a and device unique ID 291b registered at the time of manufacture, the ID-based encryption private key 293b generated at the time of manufacture, the host name 291c set at the time of system construction, and the RSA key pair 292 and self-signed certificate 294 generated at the time of system construction are stored in the device storage part 290 (not shown) of each communication device 200 (the communication device A 201 or communication device B 202).

A case will be described wherein SSL communication is performed at the time of operation between the communication device A 201 as the SSL server and the communication device B 202 as the SSL client.

In the process of the operation of the communication device 200, SSL communication need not always be performed. It suffices as far as the communication party is acknowledged to be the communication device 200 specified by the device unique ID 291b through the verification of the RSA self signature 294a and the verification of the ID-based encryption signature 294b.

Figure 10:
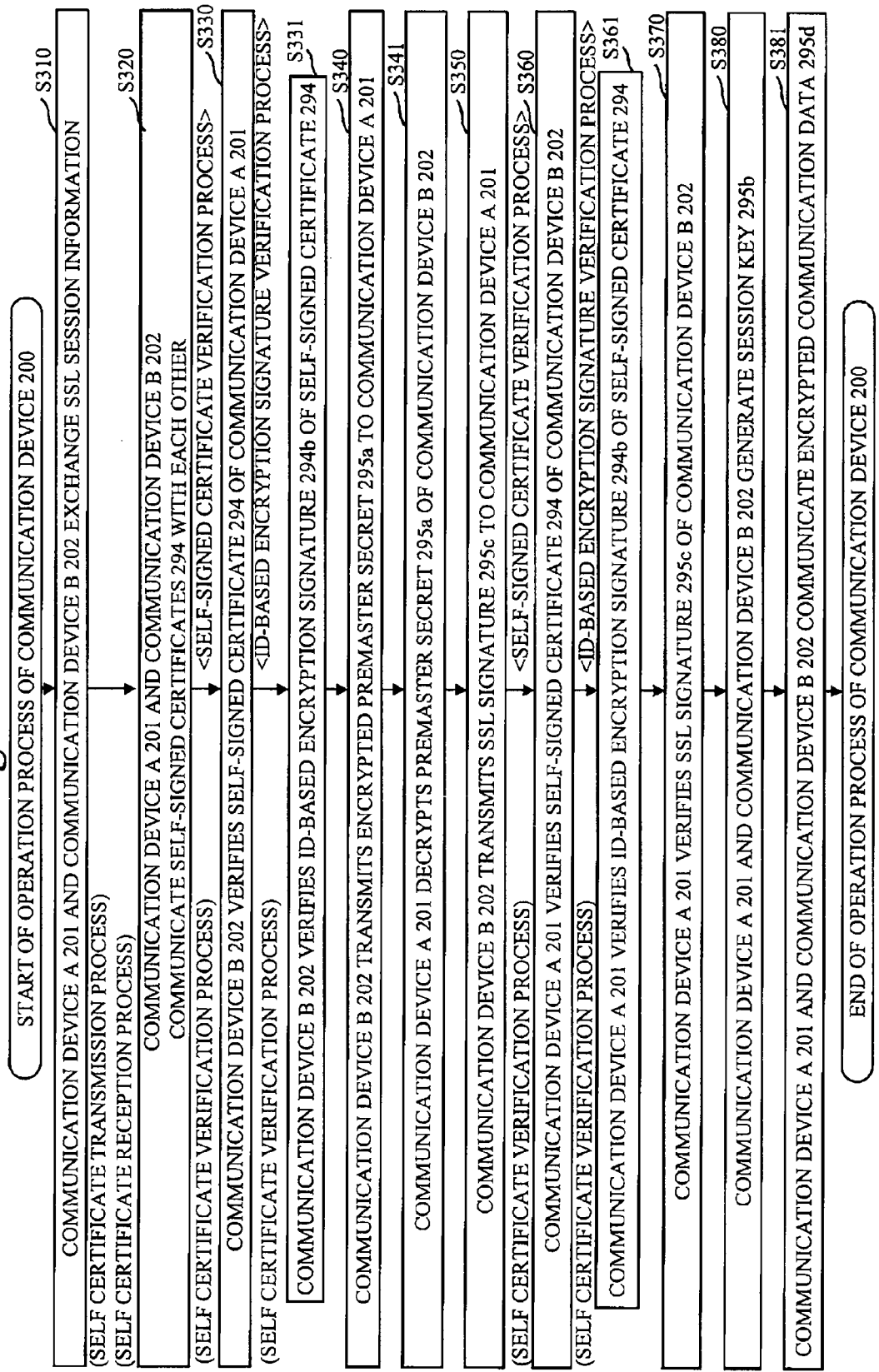
FIG. 10 is a flowchart showing the operation process of the communication device 200 of the first embodiment.

FIG. 10 is a flowchart showing the operation process of the communication device 200 of the first embodiment.

The operation process of the communication device 200 of the first embodiment will be described with reference to FIG. 10.

Each "part" of the communication device A 201 and of the communication device B 202 executes the following process by using the CPU.

The communication device A 201 and the communication device B 202 exchange SSL session information (S310).

The communication device A 201 and the communication device B 202 communicate the self-signed certificates 294 with each other (S320).

The self-signed certificate verification part 241 of the communication device B 202 verifies the self-signed certificate 294 of the communication device A 201 (S330), and verifies the ID-based encryption signature 294b set in the self-signed certificate 294 (S331).

The SSL communication part 240 of the communication device B 202 transmits the premaster secret 295a, encrypted by using the RSA public key 292b of the communication device A 201, to the communication device A 201 (S340). The SSL communication part 240 of the communication device A 201 decrypts the premaster secret 295a of the communication device B 202 (S341). The SSL communication part 240 of the communication device B 202 transmits the SSL signature 295*c* to the communication device A 201 (S350).

The self-signed certificate verification part 241 of the communication device A 201 verifies the self-signed certificate 294 of the communication device B 202 (S360), and verifies the ID-based encryption signature 294*b* set in the self-signed certificate 294 (S361).

The SSL communication part 240 of the communication device A 201 verifies the SSL signature 295*c* of the communication device B 202 (S370).

The communication device A 201 and the communication device B 202 generates the session key 295*b* by using the premaster secret 295*a* (S380), and communicate the encrypted communication data 295*d* by using the session key 295*b* (S381).

Each of S331 and S361 not performed in conventional SSL communication is one of the features of the device authentication system 100 of the first embodiment.

The respective processes (S310 to S381) will be described in detail.

<S310>

First, the SSL communication part 240 of the communication device B 202 (client side) specifies the URL (https://"host name") of the communication device A 201 (server side), and transmits specific random numbers and the list of available algorithms (encryption, compression) (SSL session information) to the communication device A 201 (server side).

Note that the random numbers are generated by executing a predetermined algorithm, and that the available algorithms are set in the device storage part 290 in advance.

The SSL communication part 240 of the communication device A 201 receives the SSL session information of the SSL communication part 240, selects one algorithm that the SSL communication part 240 can use in the list indicated by the SSL session information, and notifies the selected algorithm (encryption, compression) to the communication device B 202.

In S310, the communication device A 201 and the communication device B 202 share the specific random numbers, and the algorithm to be used is determined.

After the SSL session is started in S310, the process proceeds to S320.

<S320: Example of Self Certificate Transmission Process and Self Certificate Reception Process>

After S310, the SSL communication part 240 of the communication device A 201 acquires the self-signed certificate 294 from the device storage part 290, and transmits the acquired self-signed certificate 294 to the communication device B 202.

The SSL communication part 240 of the communication device B 202 receives the self-signed certificate 294 (the self-signed certificate 294 of the communication device A 201) transmitted by the communication device A 201, and stores the self-signed certificate 294 in the device storage part 290.

The SSL communication part 240 of the communication device A 201 transmits a certificate request to the communication device B 202.

Upon reception of the certificate request, the SSL communication part 240 of the communication device B 202 acquires its own self-signed certificate 294 from the device storage part 290, and transmits the acquired self-signed certificate 294 to the communication device A 201.

The SSL communication part 240 of the communication device A 201 receives the self-signed certificate 294 (the self-signed certificate 294 of the communication device B 202) transmitted by the communication device B 202, and stores the self-signed certificate 294 in the device storage part 290.

After S320, the process proceeds to S330.

<S330: Self-Signed Certificate Verification Process (Example of Self Certificate verification Process)>

The self-signed certificate verification part 241 of the communication device B 202 acquires the self-signed certificate 294 of the communication device A 201 from the device storage part 290, and executes the verification algorithm of the RSA public key encryption system, to verify the self-signed certificate 294 of the communication device A 201.

More specifically, by using the RSA public key 292*b* set in the self-signed certificate 294, the self-signed certificate verification part 241 verifies the RSA self signature 294*a* set in the self-signed certificate 294.

The self-signed certificate verification part 241 also compares the expiration date set in the self-signed certificate 294 with the current time, and verifies if the expiration date of the self-signed certificate 294 has expired.

The self-signed certificate verification part 241 also verifies if the host name 291*c* set in the self-signed certificate 294 coincides with the host name which is set at the URL specified in S310.

The self-signed certificate 294 which is valid in every verification is a valid certification which is guaranteed not having been tampered and whose expiration date has not expired yet.

The generator of the RSA public key 292*b* is not guaranteed by the certificate authority, and accordingly there is a possibility that the self-signed certificate 294 might have been generated by another device which passes itself as the communication device A 201.

Namely, at this time point, there is no guarantee that the communication party of the communication device B 202 is the communication device A 201.

If the self-signed certificate 294 of the communication device A 201 is valid (authentication OK), the process proceeds to S331.

If the self-signed certificate 294 of the communication device A 201 is not valid (invalid) (authentication NG), the communication device B 202 ends the communication with the communication device A 201, and the operation process of the communication device 200 ends.

The illustration of a process branch is omitted for a case wherein the self-signed certificate 294 of the communication device A 201 is not valid.

<S331: ID-Based Encryption Signature Verification Process (Example of Self Certificate Verification Process)>

The self-signed certificate verification part 241 of the communication device B 202 acquires the public parameter 293*a* from the device storage part 290.

The self-signed certificate verification part 241 of the communication device B 202 executes the verification algorithm of the ID-based encryption system by using the public parameter 293*a* and the RSA public key 292*b* which is set in the self-signed certificate 294 of the communication device A 201, to verify the ID-based encryption signature 294*b* set in the self-signed certificate 294 of the communication device A 201.

The ID-based encryption signature 294*b* set in the self-signed certificate 294 of the communication device A 201 is generated by using the ID-based encryption private key 293*b* that can be generated based on only the device unique ID 291*b* and public parameter 293*a* of the communication device A 201.

Hence, if the ID-based encryption signature 294b is verified to be valid, this guarantees that the self-signed certificate 294 has been generated by a device (that is, the communication device A 201) in which the device unique ID 291b and public parameter 293a of the communication device A 201 are set.

In other words, at this time point, the communication party of the communication device B 202 is guaranteed to be the communication device A 201.

If the ID-based encryption signature 294b is valid, the process proceeds to S340.

If the ID-based encryption signature 294b is not valid (invalid), the communication device B 202 ends communication with the communication device A 201, and the operation process of the communication device 200 ends.

The illustration of a process branch is omitted for a case wherein the ID-based encryption signature 294b is not valid.

<S340>

The SSL communication part 240 of the communication device B 202 generates the premaster secret 295a which is information to be used for generating the session key 295b, and stores the generated premaster secret 295a in the device storage part 290.

Also, the SSL communication part 240 of the communication device B 202 acquires the RSA public key 292b from the self-signed certificate 294 of the communication device A 201, encrypts the premaster secret 295a by using the acquired RSA public key 292b, and transmits the encrypted premaster secret 295a to the communication device A 201.

After S340, the process proceeds to S341.

<S341>

The SSL communication part 240 of the communication device A 201 receives the premaster secret 295a transmitted by the communication device B 202 in S340.

The SSL communication part 240 of the communication device A 201 acquires its own RSA private key 292a from the device storage part 290, decrypts the received premaster secret 295a by using the RSA private key 292a, and stores the decrypted premaster secret 295a in the device storage part 290.

After S341, the process proceeds to S350.

In S340 through S341, the communication device A 201 and communication device B 202 share the premaster secret 295a.

<S350>

The SSL communication part 240 of the communication device B 202 acquires its own RSA private key 292a from the device storage part 290, generates the signature of the information (called "handshake message") communicated between the communication device A 201 and the communication device B 202 from S310 through S341, as the SSL signature 295c by using the acquired RSA private key 292a, and transmits the generated SSL signature 295c to the communication device A 201.

The SSL signature 295c is received by the SSL communication part 240 of the communication device A 201 and stored in the device storage part 290.

After S350, the process proceeds to S360.

<S360: Self-Signed Certificate Verification Process (Example of Self Certificate Verification Process)>

The self-signed certificate verification part 241 of the communication device A 201 verifies the self-signed certificate 294 of the communication device B 202 in the same manner as the communication device B 202 does in S330.

If the self-signed certificate 294 is valid, the process proceeds to S361.

If the self-signed certificate 294 is not valid, the communication device A 201 ends communication with the communication device B 202, and the operation process of the communication device 200 ends.

The illustration of a process branch is omitted for a case wherein the self-signed certificate 294 is not valid.

<S361: ID-Based Encryption Signature Verification Process (Example of Self Certificate Verification Process)>

The self-signed certificate verification part 241 of the communication device A 201 verifies the ID-based encryption signature 294b set in the self-signed certificate 294 of the communication device B 202, in the same manner as the communication device B 202 does in S331.

If the ID-based encryption signature 294b is valid, the process proceeds to S370.

If the ID-based encryption signature 294b is not valid, the communication device A 201 ends communication with the communication device B 202, and the operation process of the communication device 200 ends.

The illustration of a process branch is omitted for a case wherein the ID-based encryption signature 294b is not valid.

<S370>

The SSL communication part 240 of the communication device A 201 acquires the SSL signature 295c and self-signed certificate 294 of the communication device B 202 from the device storage part 290, and verifies the SSL signature 295c of the communication device B 202 by using the RSA public key 292b included in the self-signed certificate 294 of the communication device B 202.

If the SSL signature 295c is valid, the process proceeds to S380.

If the SSL signature 295c is not valid, the communication device B 202 ends communication with the communication device A 201, and the operation process of the communication device 200 ends.

The illustration of a process branch is omitted for a case wherein the SSL signature 295c is not valid.

<S380>

The SSL communication part 240 of the communication device A 201 and the SSL communication part 240 of the communication device B 202 acquire from the device storage part 290 the premaster secret 295a which they share in S340 through S341, and generate the session key 295b by using the acquired premaster secret 295a and the random numbers shared in S310.

After S380, the process proceeds to S381.

<S381>

The cryptographic authentication communication part 242 of the communication device A 201 and the cryptographic authentication communication part 242 of the communication device B 202 encrypt the communication data 295d by using the session key 295b generated in S380, and communicate the encrypted communication data 295d with each other.

After necessary data communication is ended in S381, the process ends.

The ID-based encryption signature verification process (S331, S336) is not performed in the conventional SSL communication and certificate verification. This is one of the features of the device authentication system 100 of the first embodiment. This process guarantees that the self-signed certificate 294 is the certificate generated by the device specified by the device unique ID 291b.

In the first embodiment, for example, the following device authentication system 100 has been described.

At the time of manufacture, the communication device 200 generates and stores the ID-based encryption private key 293b corresponding to the device unique ID 291b.

At the time of system construction, the communication device 200 generates the self-signed certificate 294, including the host name 291c and the ID-based encryption signature 294b which is generated based on the RSA public key 292b by using the ID-based encryption private key 293b.

At the time of operation, as a verification of the self-signed certificate 294 of the communication party, the communication device 200 verifies the RSA self signature 294a and ID-based encryption signature 294b which are included in the self-signed certificate 294.

Hence, reliable device authentication which guarantees that the device of the communication party is the device to which the specified host name is assigned and that the device of the communication party is the device specified by the device unique ID 291b included in the self-signed certificate 294, can be performed without requiring a cumbersome procedure such as issuance of the certificate by the certificate authority and offline certificate verification.

For example, the device authentication system 100 can be utilized as a communication system in which devices manufactured by the same manufacturer transmit and receive highly confidential data to and from each other.

In the first embodiment, in place of the RSA public key encryption system, another public key encryption system may be employed that uses Elliptic Curve Cryptography, DSA, DH, or the like.

In the RSA public key encryption system, a hash function such as SHA1 or MD5 is used.

The first embodiment can be applied to any system whose security relies on the verification of the certificate, among systems according to which the communication device 200 has a private key and a public key certificate and lets the communication-party device to authenticate itself by means of signature based on the private key, or a session key using a public key included in the certificate of the communication-party device is encrypted.

Embodiment 2

An embodiment will be described wherein the communication device 200 generates the self-signed certificate 294 not at the time of system construction but at the time of manufacture.

An explanation will be made mainly on matters that are different from the first embodiment. An explanation on matters that are identical to those of the first embodiment will be omitted.

Figure 11:
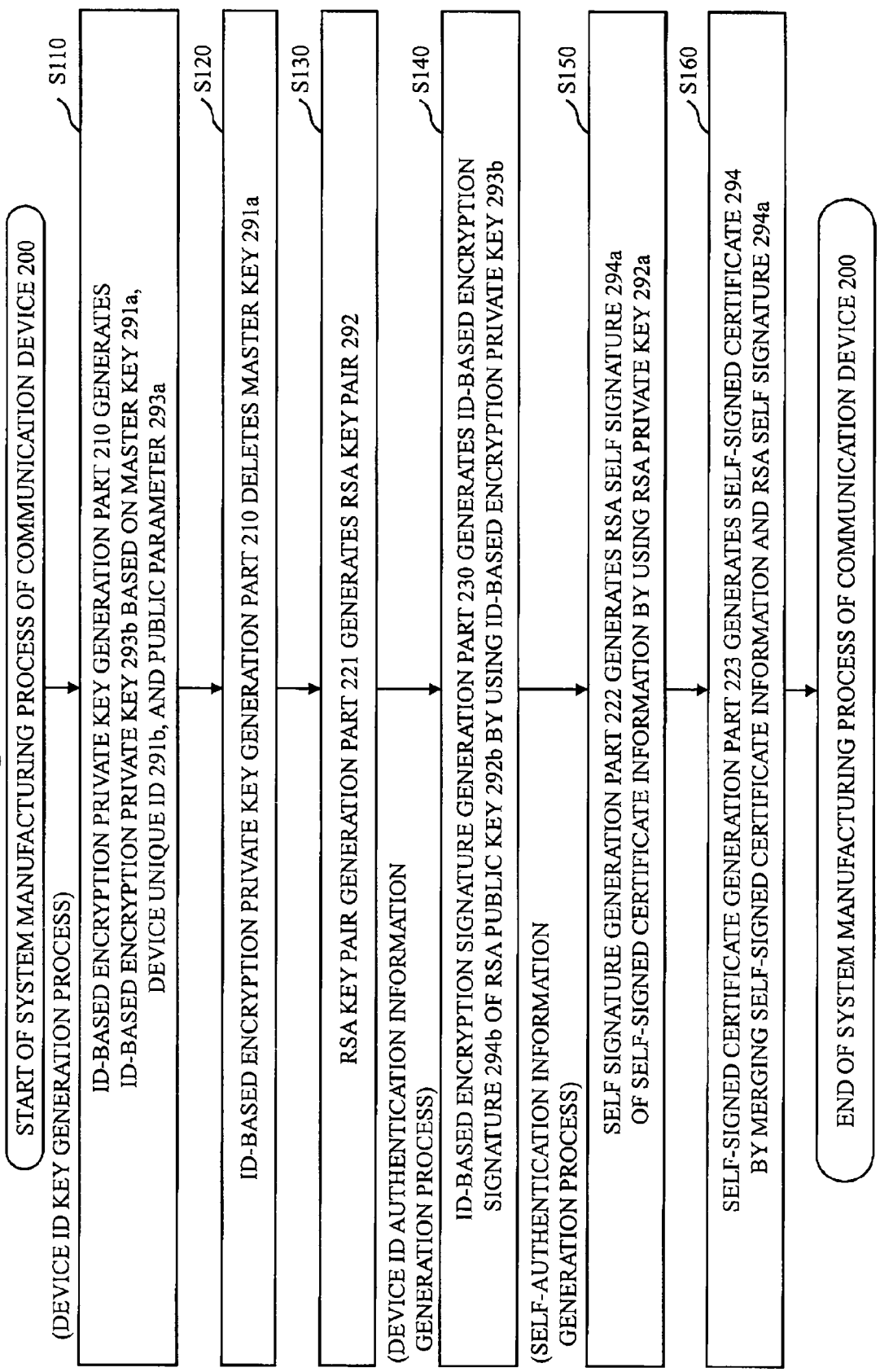
FIG. 11 is a flowchart showing the manufacturing process of a communication device 200 of the second embodiment.

FIG. 11 is a flowchart showing the manufacturing process of the communication device 200 of the second embodiment.

The manufacturing process of the communication device 200 of the second embodiment will be described with reference to FIG. 11.

The flowchart shown in FIG. 11 is obtained by adding S130 to S160 to the manufacturing process (see FIG. 5) of the communication device 200 of the first embodiment.

Note that S130 to S150 are identical to S220 to S240 of the system construction process (see FIG. 7) of the communication device 200 of the first embodiment.

In S160, the self-signed certificate generation part 223 generates the self-signed certificate 294 by merging the self-signed certificate information and the RSA self signature 294a, and stores the generated self-signed certificate 294 in the device storage part 290, in the same manner as in S250 (see FIG. 7).

Note that since the host name 291c is not set in the communication device 200 at the time of manufacture, the host name 291c is not included in the self-signed certificate information. The self-signed certificate generation part 223 sets the device unique ID 291b, in place of the host name 291c, in the CommonName field of the subject name of the self-signed certificate 294.

Of the system construction process of the communication device 200, only S210 (setting the host name 291c) is executed, and S220 through S250 are not executed (see FIG. 7).

The operation process of the communication device 200 is the same as that of the first embodiment (FIG. 10) except that the host name 291c is not set in the self-signed certificate 294.

In other words, in the self-signed certificate verification process (S330, S360), the host name is not verified.

In the second embodiment, for example, the following device authentication system 100 has been described.

The communication device 200, at the time of manufacture, generates and stores the ID-based encryption private key 293b corresponding to the device unique ID 291b, and generates the self-signed certificate 294 including the ID-based encryption signature 294b which is generated based on the RSA public key 292b by using the ID-based encryption private key 293b.

At the time of operation, the communication device 200 verifies the RSA self signature 294a and ID-based encryption signature 294b included in the self-signed certificate 294, as a verification of the self-signed certificate 294 of the communication party.

Since the self-signed certificate 294 is generated at the time of manufacture, the device identification name such as the host name 291c or the IP address which is determined at the time of system construction is not set in the self-signed certificate 294. Therefore, there is no guarantee that the device of the communication party is the device to which the specified host name is assigned. However, the fact that the device of the communication party is the authentic device specified by the device unique ID 291b is guaranteed in the same manner as in the first embodiment.

Embodiment 3

An embodiment will be described wherein the communication device 200 updates the self-signed certificate 294.

An explanation will be made mainly on matters that are different from the first embodiment. An explanation on matters that are identical to those of the first embodiment will be omitted.

Figure 12:
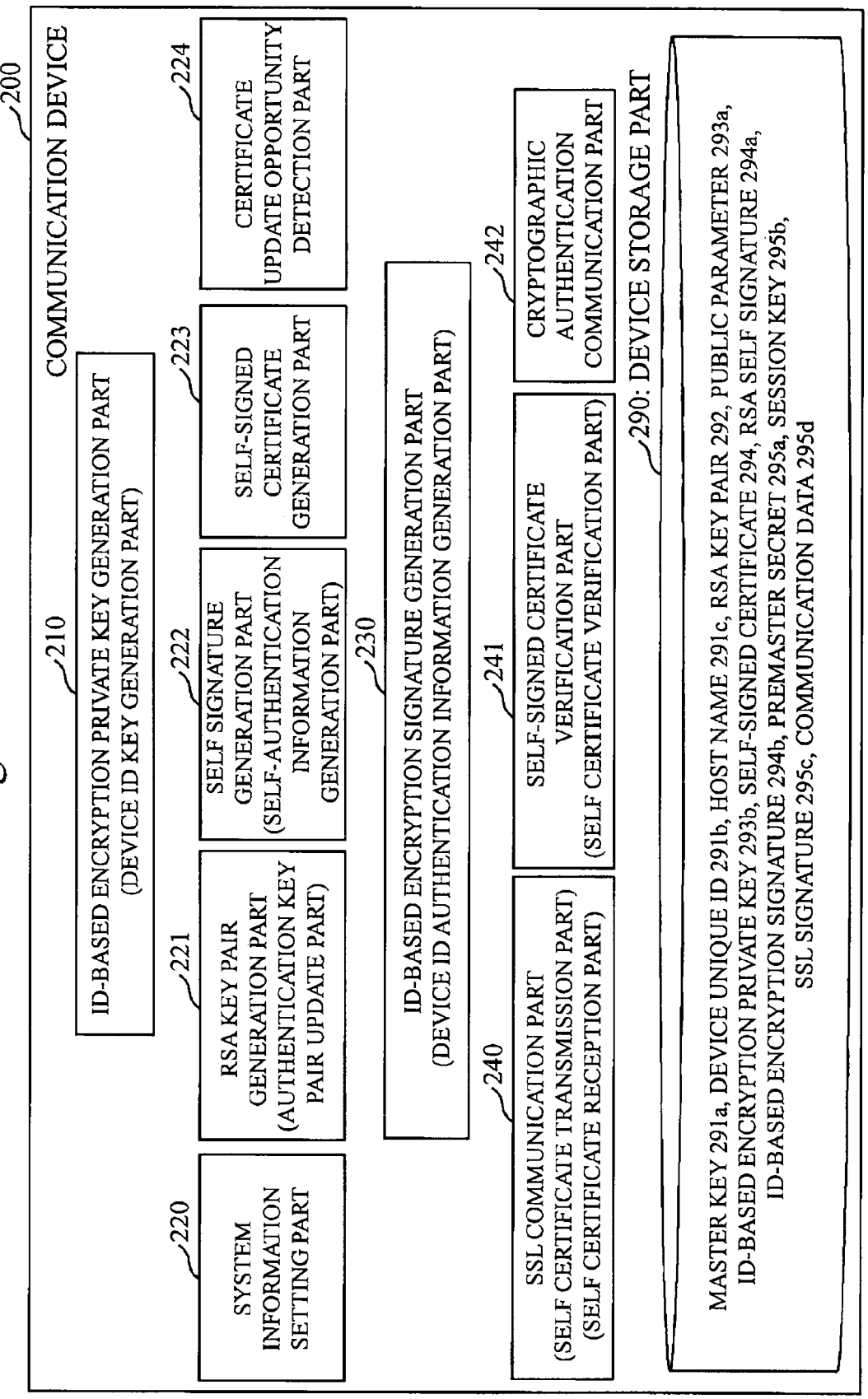
FIG. 12 is a function block diagram of a communication device 200 of the third embodiment.

FIG. 12 is a function block diagram of the communication device 200 of the third embodiment.

The function blocks of the communication device 200 of the third embodiment will be described with reference to FIG. 12.

The communication device 200 comprises a certificate update opportunity detection part 224 in addition to the structure (see FIG. 3) described in the first embodiment.

The certificate update opportunity detection part 224 detects, by using the CPU, the opportunity (a predetermined timing) to update the self-signed certificate 294.

For example, the certificate update opportunity detection part 224 verifies the expiration date set in the self-signed certificate 294, and detects a timing which is prior to the expiration date by a predetermined time, or a time that has elapsed since the expiration date, as the update opportunity of the self-signed certificate 294.

For example, the certificate update opportunity detection part 224 also detects a timing at which certificate update is specified by the administrator, as the update opportunity of the self-signed certificate 294.

When the certificate update opportunity detection part 224 detects the update opportunity of the RSA key pair 292, the RSA key pair generation part 221 (an example of the authentication key pair update part) updates the RSA key pair 292 (The RSA private key 292a, the RSA public key 292b).

Based on the RSA public key 292b updated by the RSA key pair generation part 221, the ID-based encryption signature generation part 230 newly generates the ID-based encryption signature 294b.

Based on the RSA private key 292a updated by the RSA key pair generation part 221, the self signature generation part 222 newly generates the RSA self signature 294a.

The self-signed certificate generation part 223 generates the self-signed certificate 294 by merging predetermined data, the new ID-based encryption signature 294b, and the new RSA self signature 294a.

The SSL communication part 240 transmits the self-signed certificate 294 newly generated by the self-signed certificate generation part 223 to the communication device 200 of the communication party.

Figure 13:
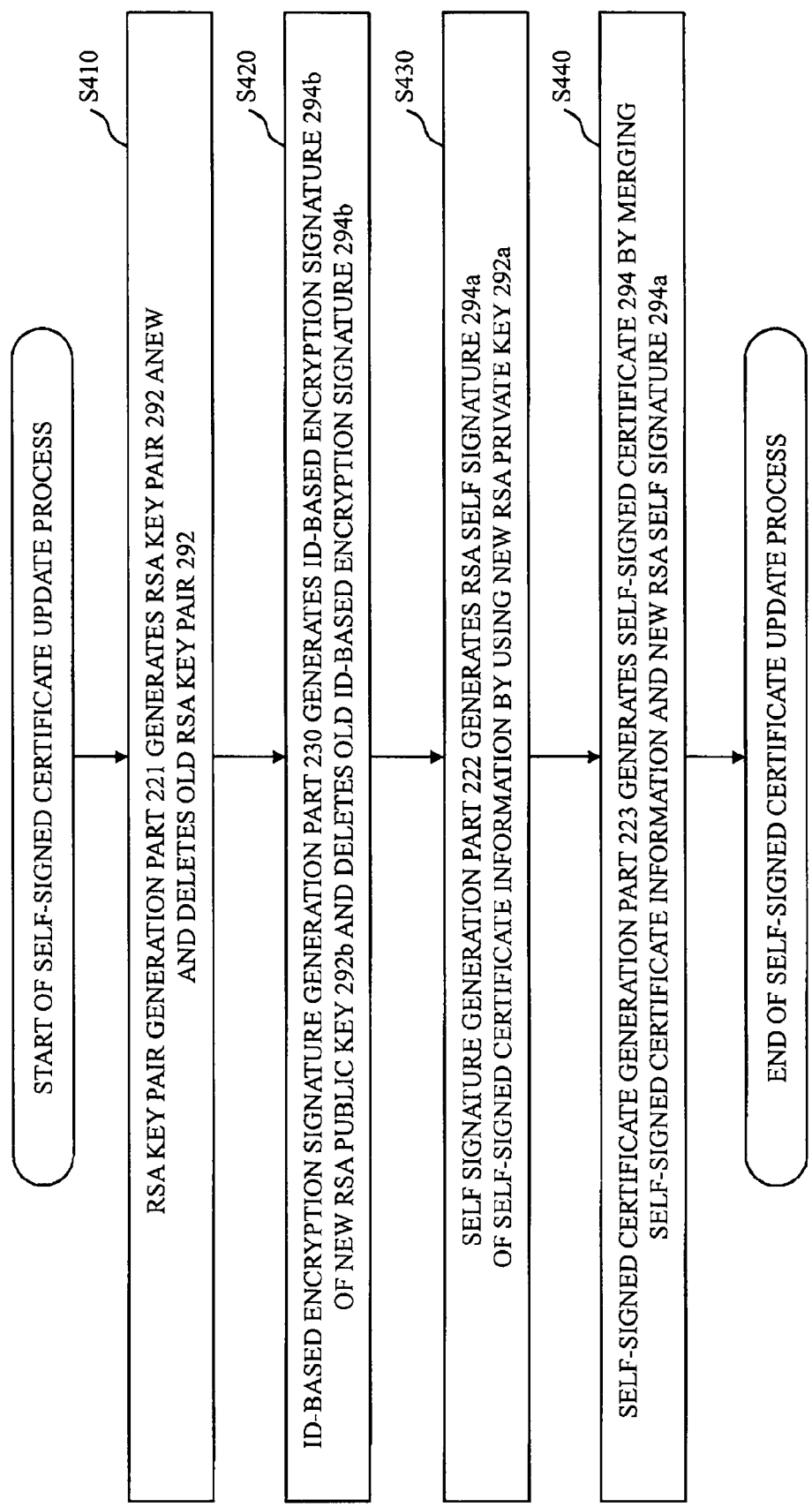
FIG. 13 is a flowchart showing the self-signed certificate update process of the third embodiment.

FIG. 13 is a flowchart showing the self-signed certificate update process of the third embodiment.

The self-signed certificate update process by the communication device 200 of updating the self-signed certificate 294 will be described with reference to FIG. 13.

Each "part" of the communication device 200 executes the process to be described below by using the CPU.

The self-signed certificate update process to be described below is executed when the certificate update opportunity detection part 224 has detected the update opportunity of the self-signed certificate 294.

<S410>

The RSA key pair generation part 221 newly generates the RSA key pair 292 in the same manner as in S220 (see FIG. 7), and stores the generated RSA key pair 292 in the device storage part 290.

The RSA key pair generation part 221 then deletes the old RSA key pair 292 from the device storage part 290.

After S410, the process proceeds to S420.

<S420>

The ID-based encryption signature generation part 230 generates the ID-based encryption signature 294b of the new RSA public key 292b in the same manner as in S230 (see FIG. 7), and stores the generated ID-based encryption signature 294b in the device storage part 290.

The ID-based encryption signature generation part 230 then deletes the old ID-based encryption signature 294b from the device storage part 290.

After S420, the process proceeds to S430.

<S430>

The self signature generation part 222 generates the RSA self signature 294a of the self-signed certificate information by using the new RSA private key 292a, in the same manner as in S240 (see FIG. 7). The self-signed certificate information includes the new RSA public key 292b and the new ID-based encryption private key 293b.

After S430, the process proceeds to S440.

<S440>

The self-signed certificate generation part 223 generates the self-signed certificate 294 by merging the self-signed certificate information and new RSA self signature 294a, in the same manner as in S250 (see FIG. 7), and stores the generated self-signed certificate 294 in the device storage part 290.

The self-signed certificate generation part 223 then deletes the old self-signed certificate 294 from the device storage part 290.

After S440, the process ends.

In the third embodiment, for example, the following device authentication system 100 has been described.

At the time of operation, the communication device 200 deletes the existing RSA key pair 292 and self-signed certificate 294, generates the RSA key pair 292 again, and updates the self-signed certificate 294.

Thus, the certificate (self-signed certificate 294) can be updated by the device alone without executing a certificate reissue procedure that requires interaction with the certificate authority, so that the operation load of certificate update can be reduced greatly.

Embodiment 4

An embodiment will be described wherein the communication device 200 generates the digital signature of the RSA public key 292b by using not the ID-based encryption private key 293b but the unique RSA private key of the device, and that the generated digital signature of the RSA public key 292b is set in the self-signed certificate 294.

An explanation will be made mainly on matters that are different from the first embodiment. An explanation on matters that are identical to those of the first embodiment will be omitted.

Figure 14:
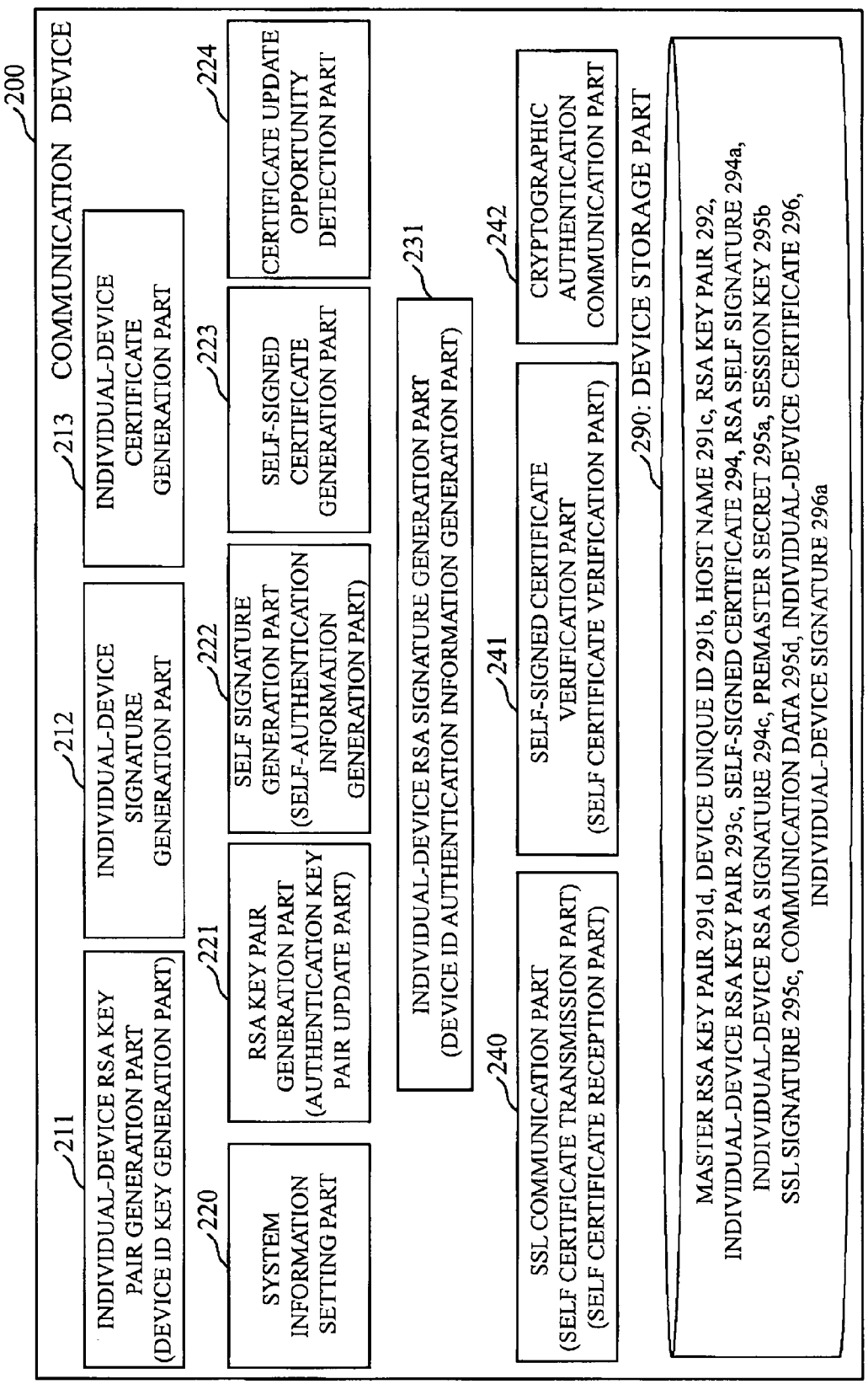
FIG. 14 is a function block diagram of a communication device 200 of the fourth embodiment.

FIG. 14 is a function block diagram of the communication device 200 of the fourth embodiment.

The function blocks of the communication device 200 of the fourth embodiment will be described with reference to FIG. 14.

The communication device 200 is different from the structure (see FIG. 3) described in the first embodiment in the following respects.

The communication device 200 includes an individual-device RSA key pair generation part 211 (an example of the device ID key generation part), an individual-device signature generation part 212, and an individual-device certificate generation part 213, in place of the ID-based encryption private key generation part 210.

The communication device 200 includes an individual-device RSA signature generation part 231 (an example of the device ID authentication information generation part) in place of the ID-based encryption signature generation part 230.

The device storage part 290 stores a master RSA key pair 291d (a master RSA private key 291d1 and a master RSA public key 291d2) in place of the master key 291a and the public parameter 293a, an individual-device RSA key pair 293c (an individual-device RSA private key 293c1 and an individual-device RSA public key 293c2) in place of the ID-based encryption private key 293b, and an individual-device RSA signature 294c in place of the ID-based encryption signature 294b.

The device storage part 290 also stores an individual-device certificate 296 and an individual-device signature 296a.

By using the CPU, the individual-device RSA key pair generation part 211 (an example of the device ID key generation part) generates the individual-device RSA key pair 293c (the individual-device RSA private key 293c1 and the individual-device RSA public key 293c2) (an example of the device ID key) based on the device unique ID 291*b*, in accordance with the public key encryption system.

By using the CPU, the individual-device signature generation part 212 generates the digital signature of the individual-device RSA public key 293*c*2 (an example of the individual-device public key) as the individual-device signature 296*a*, based on the master RSA private key 291*d*1 (an example of the private key data of its own device).

By using the CPU, the individual-device certificate generation part 213 generates the individual-device certificate 296 by merging the individual-device signature 296*a* and device unique ID 291*b*.

The individual-device RSA signature generation part 231 (an example of the device ID authentication information generation part) generates the digital signature of the RSA public key 292*b* as the individual-device RSA signature 294*c* (an example of the device ID authentication information), by using the individual-device RSA private key 293*c*1.

Figure 15:
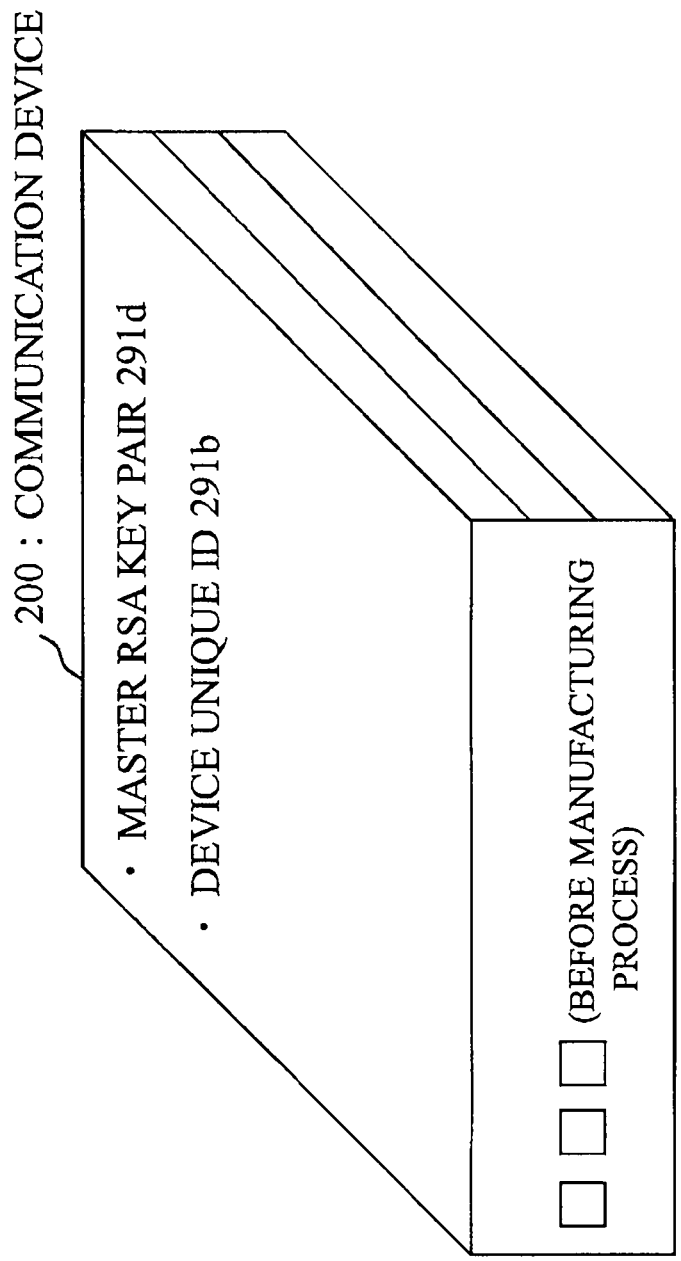
FIG. 15 is a view showing stored data at the time of manufacture (before the manufacturing process) of the communication device 200 of the fourth embodiment.

FIG. 15 is a view showing stored data at the time of manufacture (before the manufacturing process) of the communication device 200 of the fourth embodiment.

As shown in FIG. 15, when the communication device 200 is manufactured, the master RSA key pair 291*d* (the master RSA private key 291*d*1 and the master RSA public key 291*d*2) and the device unique ID 291*b* are registered in the device storage part 290 (not shown) of the communication device 200.

The master RSA key pair 291*d* is information used for generating the individual-device signature 296*a* which is to be set in the individual-device certificate 296, and is the same among all the communication devices 200.

Figure 16:
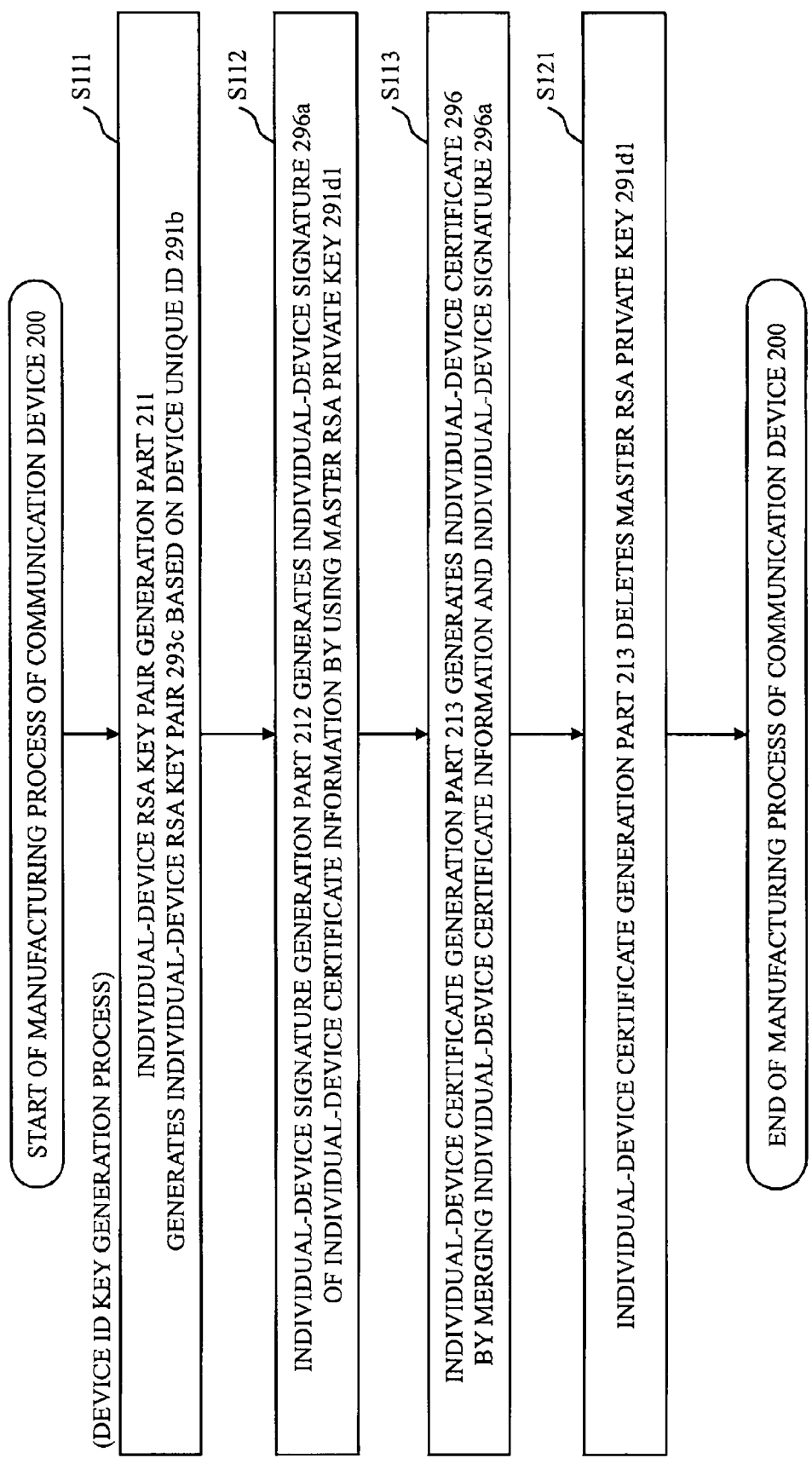
FIG. 16 is a flowchart showing the manufacturing process of the communication device 200 of the fourth embodiment.

FIG. 16 is a flowchart showing the manufacturing process of the communication device 200 of the fourth embodiment.

The manufacturing process of the communication device 200 of the fourth embodiment will be described with reference to FIG. 16.

The individual-device RSA key pair generation part 211 generates the individual-device RSA key pair 293*c* based on the device unique ID 291*b* (S111). The individual-device signature generation part 212 generates the individual-device signature 296*a* of the individual-device certificate information by using the master RSA private key 291*d*1 (S112). The individual-device certificate generation part 213 generates the individual-device certificate 296 by merging the individual-device certificate information and the individual-device signature 296*a* (S113). The individual-device certificate generation part 213 deletes the master RSA private key 291*d*1 (S121).

The respective processes (S111 to S113, S121) will be described in detail.

<S111: Example of Device ID Key Generation Process>

The individual-device RSA key pair generation part 211 acquires the device unique ID 291*b* from the device storage part 290.

The individual-device RSA key pair generation part 211 executes the key generation algorithm of the RSA public key encryption system by treating the acquired device unique ID 291*b* as an input value, to generate the individual-device RSA key pair 293*c*.

The individual-device RSA key pair generation part 211 then stores the generated individual-device RSA key pair 293*c* in the device storage part 290.

After S111, the process proceeds to S112.

<S112>

The individual-device signature generation part 212 acquires the master RSA private key 291*d*1, and various types of information (individual-device certificate information) to be included in the individual-device certificate 296, from the device storage part 290.

The individual-device signature generation part 212 executes the signature algorithm of the RSA public key encryption system by treating the acquired master RSA private key 291*d*1 and individual-device certificate information as input values, to generate the individual-device signature 296*a* of the individual-device certificate information.

In the following explanation, the individual-device RSA public key 293*c*2 and device unique ID 291*b* are the individual-device certificate information, but the individual-device certificate information is not limited to them.

After S112, the process proceeds to S113.

<S113>

The individual-device certificate generation part 213 generates the individual-device certificate 296 by merging the individual-device signature 296*a* generated in S112 and the individual-device certificate information, and stores the generated individual-device certificate 296 in the device storage part 290.

After S113, the process proceeds to S121.

<S121>

The individual-device signature generation part 212 deletes the master RSA private key 291*d*1 used for generating the individual-device signature 296*a*, from the device storage part 290. By deleting the master RSA private key 291*d*1, the individual-device signature generation part 212 prevents the master RSA private key 291*d*1 from leaking, so the individual-device signature 296*a* will not be falsified by using the master RSA private key 291*d*1 that has leaked.

After S121, the process ends.

Figure 17:
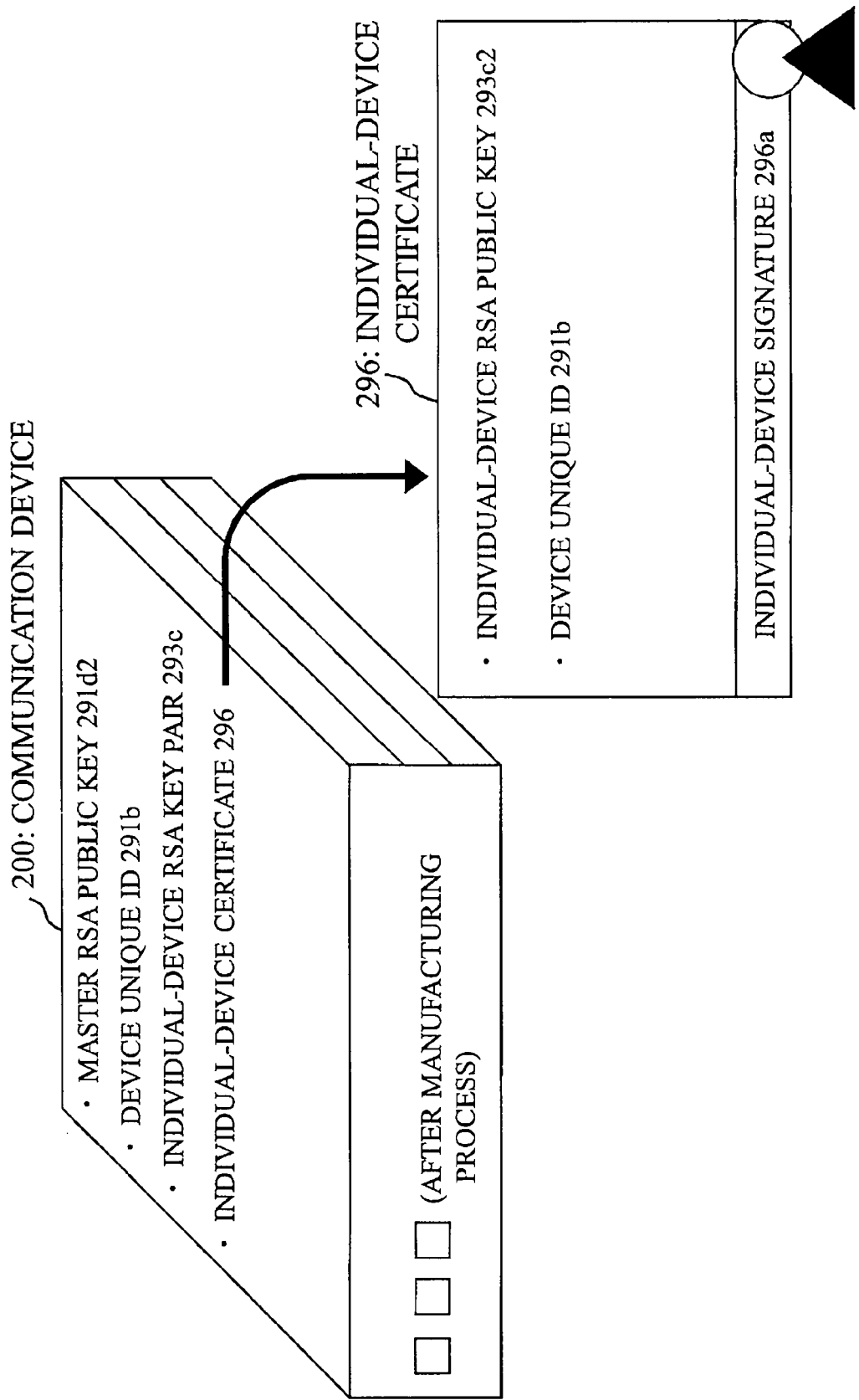
FIG. 17 is a view showing stored data at the time of manufacture (after the manufacturing process) of the communication device 200 of the fourth embodiment.

FIG. 17 is a view showing stored data at the time of manufacture (after the manufacturing process) of the communication device 200 of the fourth embodiment.

As shown in FIG. 17, after the manufacturing process of the communication device 200, the master RSA public key 291*d*2, device unique ID 291*b*, individual-device RSA key pair 293*c*, and individual-device certificate 296 are stored in the device storage part 290 (not shown) of the communication device 200.

The individual-device RSA public key 293*c*2, the device unique ID 291*b*, and the individual-device signature 296*a* are set in the individual-device certificate 296.

Figure 18:
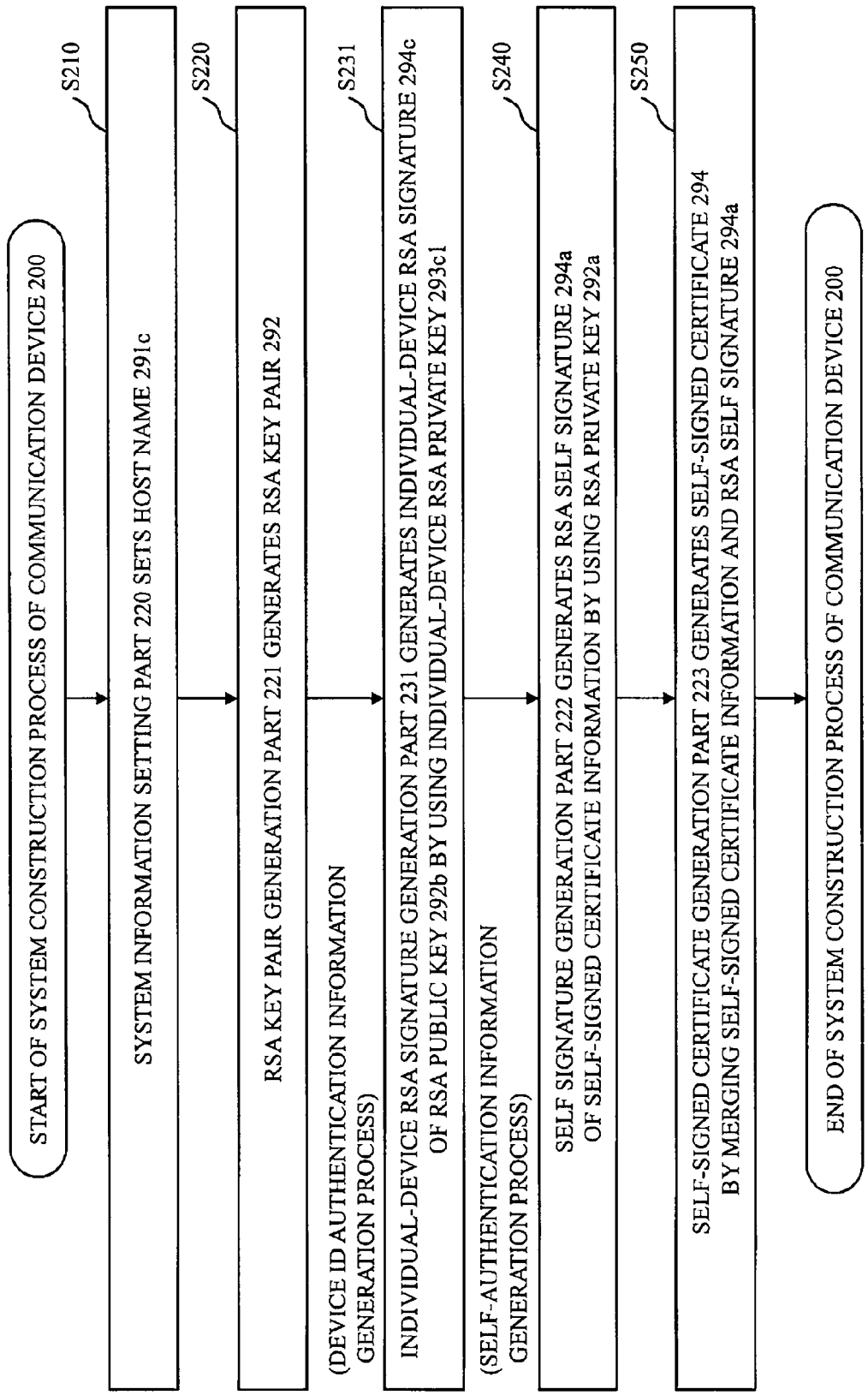
FIG. 18 is a flowchart showing the system construction process of the communication device 200 of the fourth embodiment.

FIG. 18 is a flowchart showing the system construction process of the communication device 200 of the fourth embodiment.

The system construction process of the communication device 200 of the fourth embodiment will be described with reference to FIG. 18.

The flowchart shown in FIG. 18 is obtained by altering S230 of the system construction process (see FIG. 7) of the communication device 200 of the first embodiment to S231 to be described hereinafter.

<S231: Example of Device ID Authentication Information Generation Process>

After S220, the individual-device RSA signature generation part 231 acquires the individual-device RSA private key 293*c*1 and the RSA public key 292*b* from the device storage part 290.

The individual-device RSA signature generation part 231 executes the signature algorithm of the RSA public key encryption system by treating the acquired individual-device RSA private key 293*c*1 and RSA public key 292*b* as input values, to generate the individual-device RSA signature 294*c* of the RSA public key 292*b*.

The individual-device RSA signature generation part 231 stores the generated individual-device RSA signature 294c of the RSA public key 292b, in the device storage part 290.

After S231, the process proceeds to S240.

In S240 and S250, the self-signed certificate information includes the individual-device certificate 296 in place of the device unique ID 291b, and the individual-device RSA signature 294c in place of the ID-based encryption signature 294b.

Figure 19:
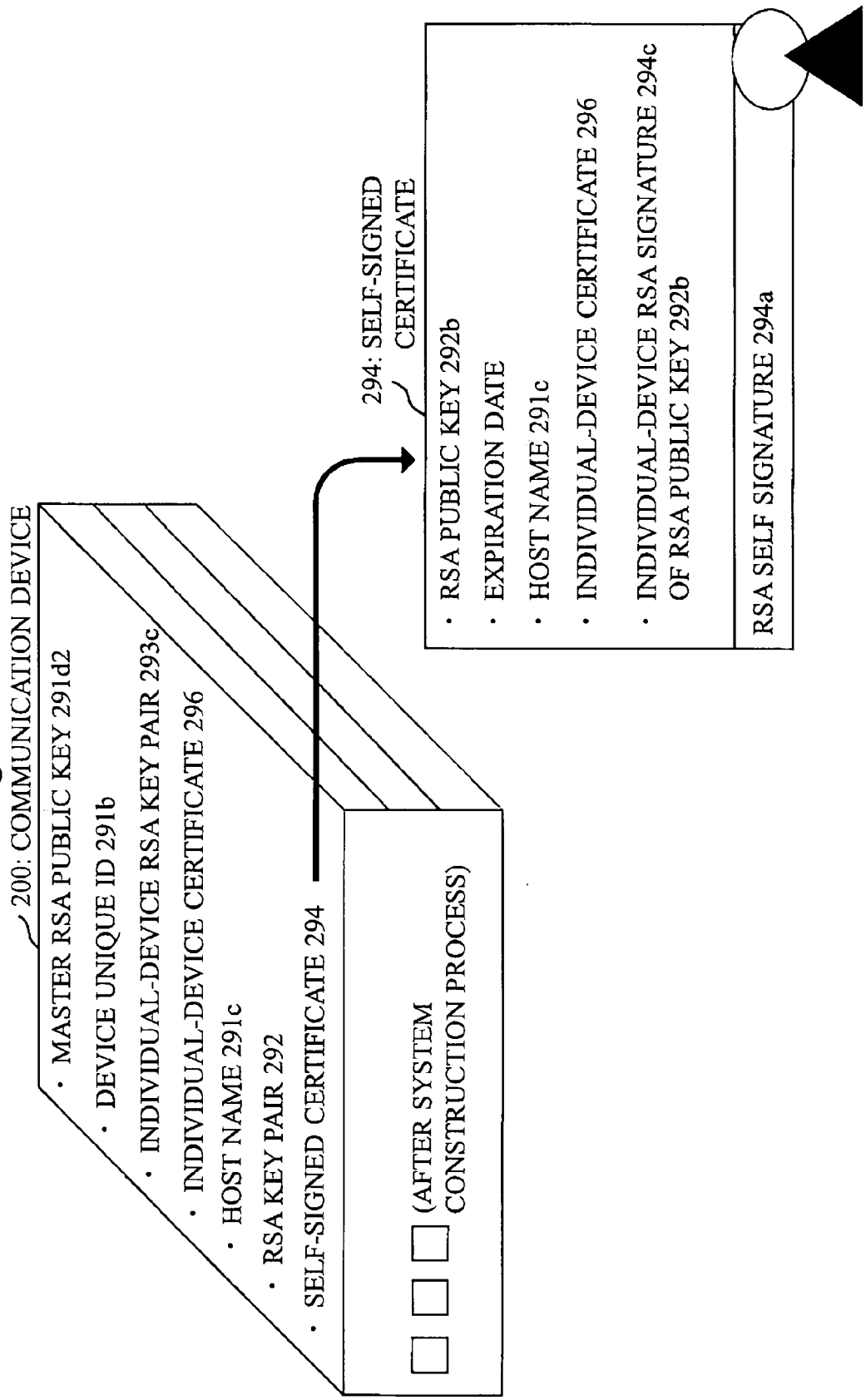
FIG. 19 is a view showing stored data at the time of system construction (after the system construction process) of the communication device 200 of the fourth embodiment.

FIG. 19 is a view showing stored data at the time of system construction (after the system construction process) of the communication device 200 of the fourth embodiment.

As shown in FIG. 19, after the system construction process of the communication device 200, the master RSA public key 291d2, device unique ID 291b, individual-device RSA key pair 293c, individual-device certificate 296, host name 291c, RSA key pair 292, and self-signed certificate 294 are stored in the device storage part 290 (not shown) of the communication device 200.

The RSA public key 292b, the expiration date of the self-signed certificate 294, the host name 291c, the individual-device certificate 296, the individual-device RSA signature 294c of the RSA public key 292b, and the RSA self signature 294a are set in the self-signed certificate 294.

Figure 20:
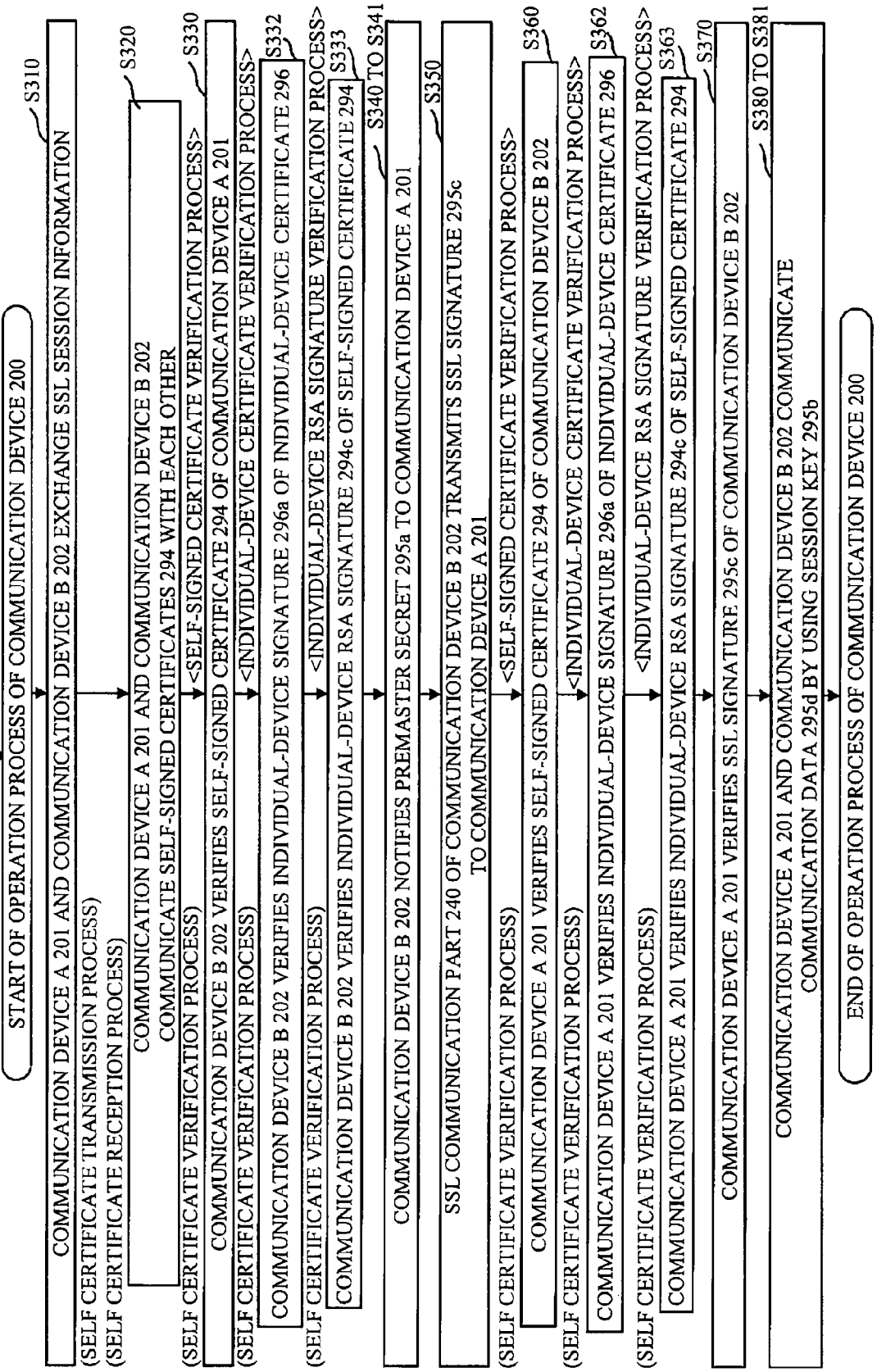
FIG. 20 is a flowchart showing the operation process of the communication device 200 of the fourth embodiment.

FIG. 20 is a flowchart showing the operation process of the communication device 200 of the fourth embodiment.

The operation process of the communication device 200 of the fourth embodiment will be described with reference to FIG. 20.

The flowchart shown in FIG. 20 is obtained by adding S332 and S362 to be described later to the operation process (see FIG. 10) of the communication device 200 of the first embodiment and altering S331 and S361 to S333 and S363 to be described later.

<S332: Individual-Device Certificate Verification Process (Example of Self Certificate Verification Process)>

After S330, the self-signed certificate verification part 241 of the communication device B 202 acquires the master RSA public key 291d2 from the device storage part 290, acquires the individual-device certificate 296 from the self-signed certificate 294 of the communication device A 201, and verifies the individual-device signature 296a set in the individual-device certificate 296 by using the master RSA public key 291d2.

The individual-device certificate 296 whose individual-device signature 296a is valid is guaranteed not having been tampered.

In other words, the individual-device RSA public key 293c2 set in the individual-device certificate 296 is guaranteed having been generated by the communication device A 201 which is specified by the device unique ID 291b set in the individual-device certificate 296.

If the individual-device signature 296a is valid, the process proceeds to S333.

If the individual-device signature 296a is not valid, the communication device B 202 ends communication with the communication device A 201, and the operation process of the communication device 200 ends.

The illustration of a condition branch is omitted for a case wherein the individual-device signature 296a is not valid.

<S333: Individual-Device RSA Signature Verification Process (Example of Self Certificate Verification Process)>

The self-signed certificate verification part 241 of the communication device B 202 executes the verification algorithm of the RSA public key system by using the individual-device RSA public key 293c2 set in the individual-device certificate 296, to verify the individual-device RSA signature 294c set in the self-signed certificate 294 of the communication device A 201.

It is guaranteed in S332 that the individual-device RSA public key 293c2 has been generated by the communication device A 201. Hence, if the individual-device RSA signature 294c of the RSA public key 292b is valid, this guarantees that the RSA public key 292b set in the self-signed certificate 294 has been generated by the communication device A 201. Also, the verification of the RSA self signature 294a in S330 guarantees that the self-signed certificate 294 has not been tampered. Hence, the self-signed certificate 294 is guaranteed to have been generated by the communication device A 201.

In other words, the communication party of the communication device B 202 is guaranteed to be the communication device A 201.

If the individual-device RSA signature 294c is valid, the process proceeds to S340.

If the individual-device RSA signature 294c is not valid, the communication device B 202 ends communication with the communication device A 201, and the operation process of the communication device 200 ends.

The illustration of a process branch is omitted for a case wherein the individual-device RSA signature 294c is not valid.

<S362: Individual-Device Certificate Verification Process (Example of Self Certificate Verification Process)>

After S360, the self-signed certificate verification part 241 of the communication device A 201 acquires the individual-device certificate 296 set in the self-signed certificate 294 of the communication device B 202, in the same manner as the communication device B 202 does in S332, to verify the individual-device signature 296a set in the individual-device certificate 296.

If the individual-device signature 296a is valid, the process proceeds to S363.

If the individual-device signature 296a is not valid, the communication device A 201 ends communication with the communication device B 202, and the operation process of the communication device 200 ends.

The illustration of a process branch is omitted for a case wherein the individual-device signature 296a is not valid.

<S363: Individual-Device RSA Signature Verification Process (Example of Self Certificate Verification Process)>

The self-signed certificate verification part 241 of the communication device A 201 verifies the individual-device RSA signature 294c set in the self-signed certificate 294 of the communication device B 202, in the same manner as the communication device B 202 does in S333.

If the individual-device RSA signature 294c is valid, the process proceeds to S370.

If the individual-device RSA signature 294c is not valid, the communication device A 201 ends communication with the communication device B 202, and the operation process of the communication device 200 ends.

The illustration of a process branch is omitted for a case wherein the individual-device RSA signature 294c is not valid.

In the fourth embodiment, the following embodiment has been described wherein the communication device 200 generates the digital signature of the RSA public key 292b by using not the ID-based encryption private key 293b but the unique private key of the device, and that the generated digital signature of the RSA public key 292b is set in the self-signed certificate 294.

The device authentication system 100 is advantageous in that it guarantees the communication party based on the self-signed certificate 294 even if the certificate authority does not issue a certificate, in the same manner as in the first embodiment.

The communication device 200 may generate the self-signed certificate 294 in the manufacturing process, in the same manner as in the second embodiment.

The communication device 200 may update the self-signed certificate 294, in the same manner as in the third embodiment.

Embodiment 5

An embodiment will be described wherein the communication device 200 generates the digital signature of the RSA public key 292b by using not the ID-based encryption private key 293b but the unique common key of the device, and that the generated digital signature of the RSA public key 292b is set in the self-signed certificate 294.

An explanation will be made mainly on matters that are different from the first embodiment. An explanation on matters that are identical to those of the first embodiment will be omitted.

Figure 21:
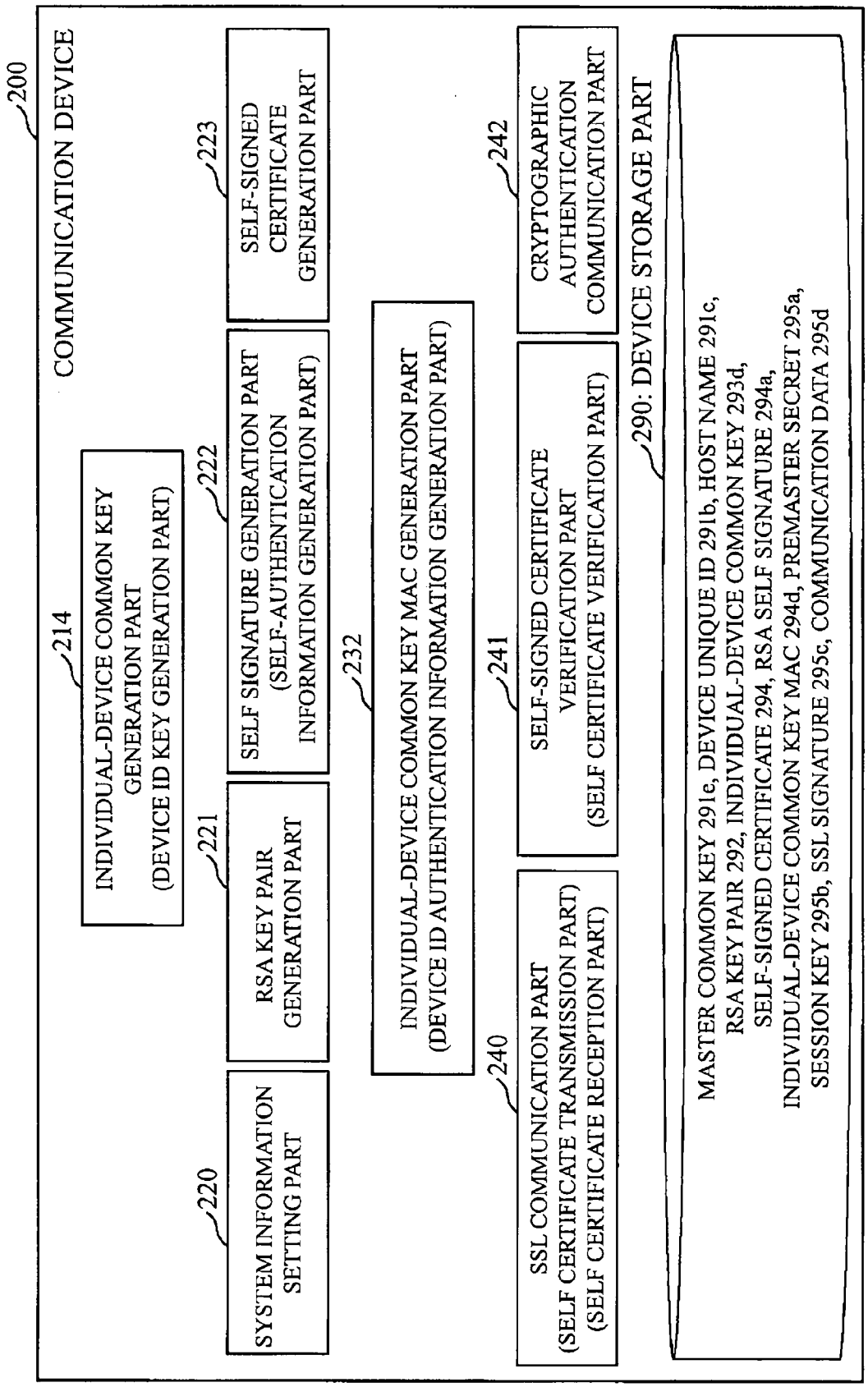
FIG. 21 is a function block diagram of a communication device 200 of the fifth embodiment.

FIG. 21 is a function block diagram of the communication device 200 of the fifth embodiment.

The function blocks of the communication device 200 of the fifth embodiment will be described with reference to FIG. 21.

The communication device 200 is different from the structure (see FIG. 3) described in the first embodiment in the following respects.

The communication device 200 includes an individual-device common key generation part 214 (an example of the device ID key generation part) in place of the ID-based encryption private key generation part 210.

The communication device 200 includes an individual-device common key MAC generation part 232 (an example of the device ID authentication information generation part) in place of the ID-based encryption signature generation part 230.

The device storage part 290 stores a master common key 291e in place of the master key 291a and public parameter 293a, an individual-device common key 293d in place of the ID-based encryption private key 293b, and an individual-device common key MAC 294d in place of the ID-based encryption signature 294b.

By using the CPU, the individual-device common key generation part 214 (an example of the device ID key generation part) generates the individual-device common key 293d (an example of the device ID key) based on the device unique ID 291b and in accordance with the common key encryption system.

The individual-device common key MAC generation part 232 (an example of the device ID authentication information generation part) generates the MAC (Message authentication Code) (an example of the device ID authentication information) of the RSA public key 292b as the individual-device common key MAC 294d by using the individual-device common key 293d.

Figure 22:
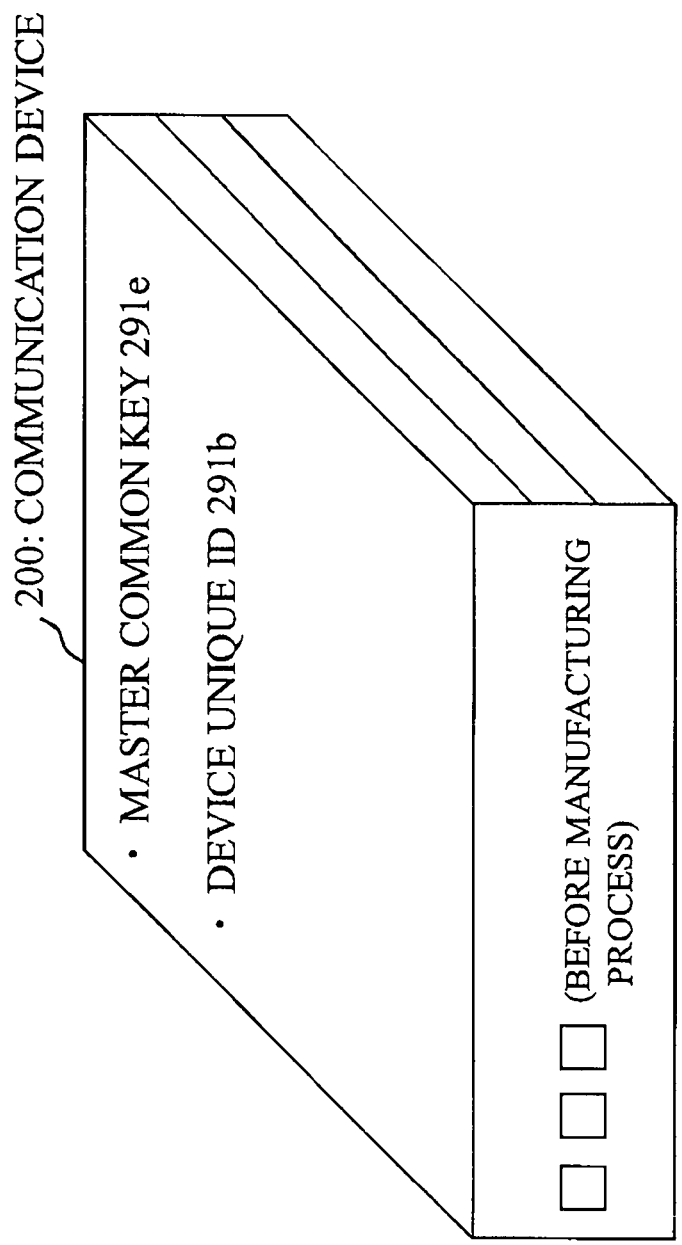
FIG. 22 is a view showing stored data at the time of manufacture (before the manufacturing process) of the communication device 200 of the fifth embodiment.

FIG. 22 is a view showing stored data at the time of manufacture (before the manufacturing process) of the communication device 200 of the fifth embodiment.

As shown in FIG. 22, when the communication device 200 is manufactured, the master common key 291e and the device unique ID 291b are registered in the device storage part 290 (not shown) of the communication device 200.

The master common key 291e is information used for generation of the individual-device common key 293d, and is the same among all the communication devices 200.

Figure 23:
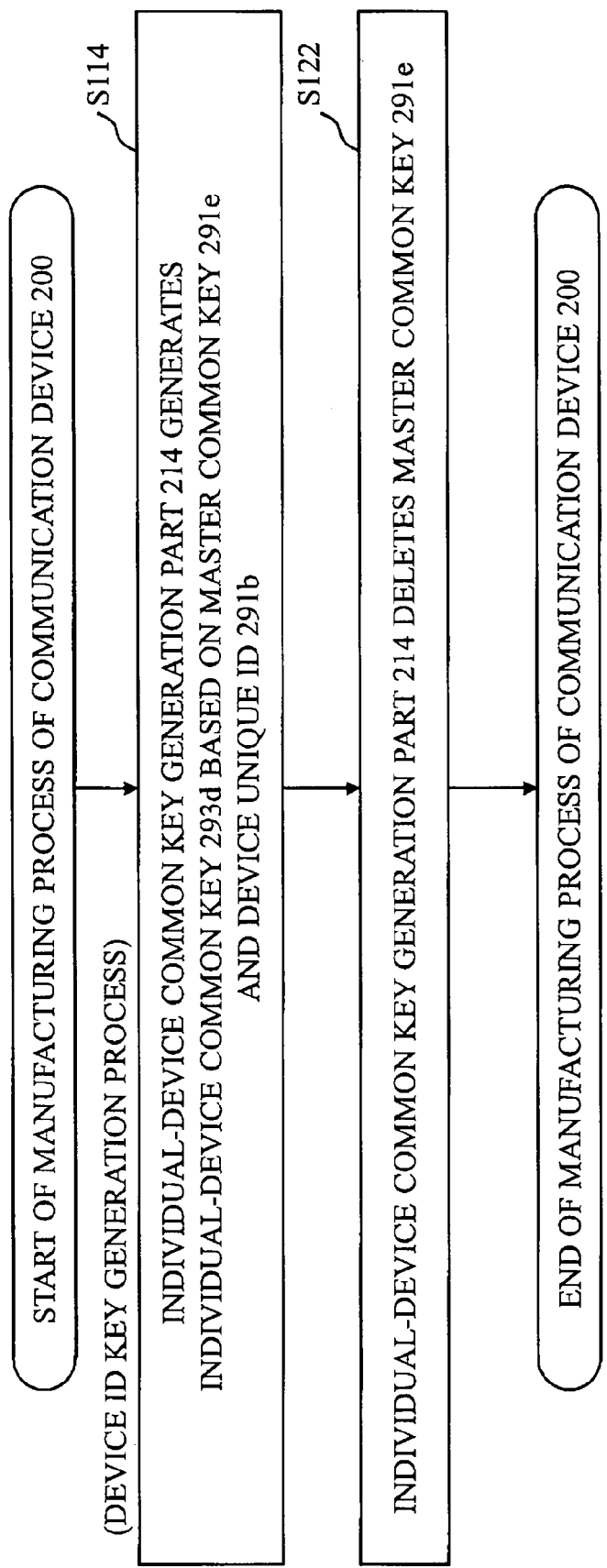
FIG. 23 is a flowchart showing the manufacturing process of the communication device 200 of the fifth embodiment.

FIG. 23 is a flowchart showing the manufacturing process of the communication device 200 of the fifth embodiment.

The manufacturing process of the communication device 200 of the fifth embodiment will be described with reference to FIG. 23.

The individual-device common key generation part 214 generates the individual-device common key 293d based on the master common key 291e and device unique ID 291b (S114), and deletes the master common key 291e (S122).

Each process (S114, S122) will be described in detail.

<S114: Example of Device ID Key Generation Process>

The individual-device common key generation part 214 acquires the master common key 291e and device unique ID 291b from the device storage part 290.

The individual-device common key generation part 214 executes the MAC algorithm (for example, HMAC-SHA1 or HMAC-MD5) by treating the acquired master common key 291e and device unique ID 291b as input values, to generate the individual-device common key 293d.

The individual-device common key generation part 214 stores the generated individual-device common key 293d in the device storage part 290.

After S114, the process proceeds to S122.

<S122>

The individual-device common key generation part 214 deletes the master common key 291e, used for generation of the individual-device common key 293d, from the device storage part 290. By deleting the master common key 291e, the individual-device common key generation part 214 prevents the master common key 291e from leaking, so the individual-device common key 293d will not be falsified by using the master common key 291e.

After S122, the process ends.

Figure 24:
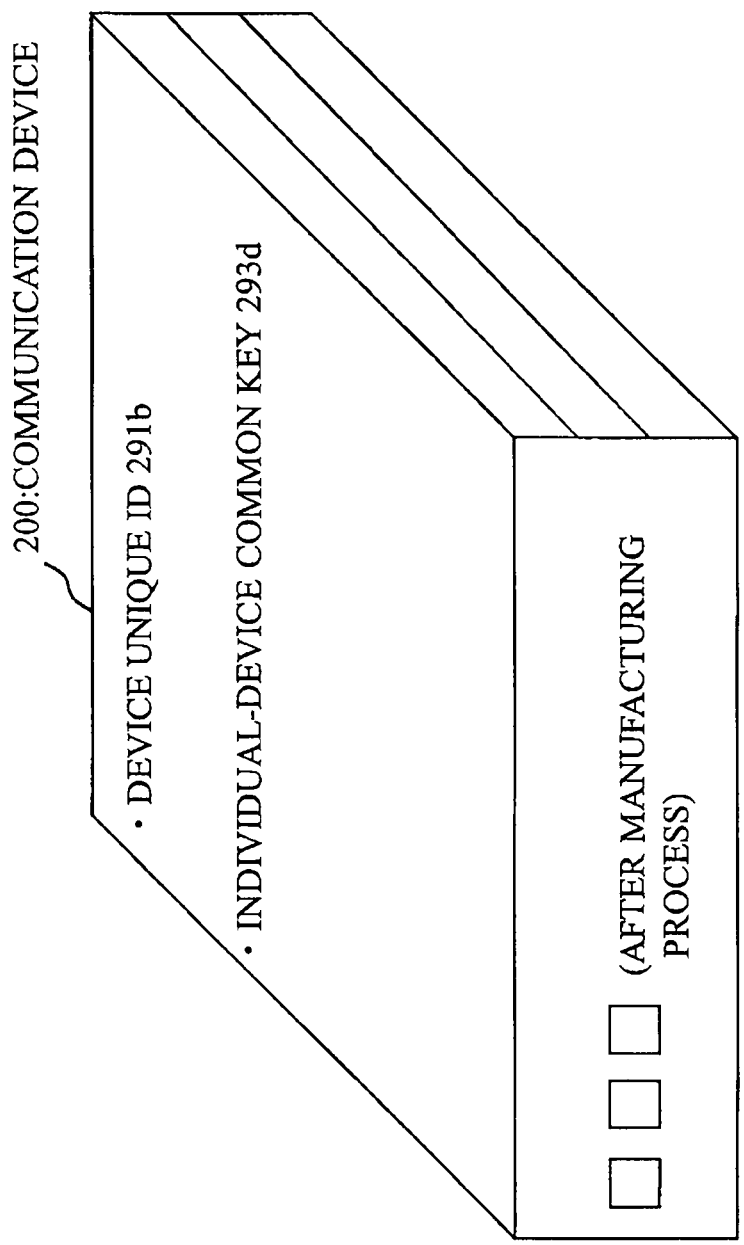
FIG. 24 is a view showing stored data at the time of manufacture (after the manufacturing process) of the communication device 200 of the fifth embodiment.

FIG. 24 is a view showing stored data at the time of manufacture (after the manufacturing process) of the communication device 200 of the fifth embodiment.

As shown in FIG. 24, after the manufacturing process of the communication device 200, the device unique ID 291b and individual-device common key 293d are stored in the device storage part 290 (not shown) of the communication device 200.

Figure 25:
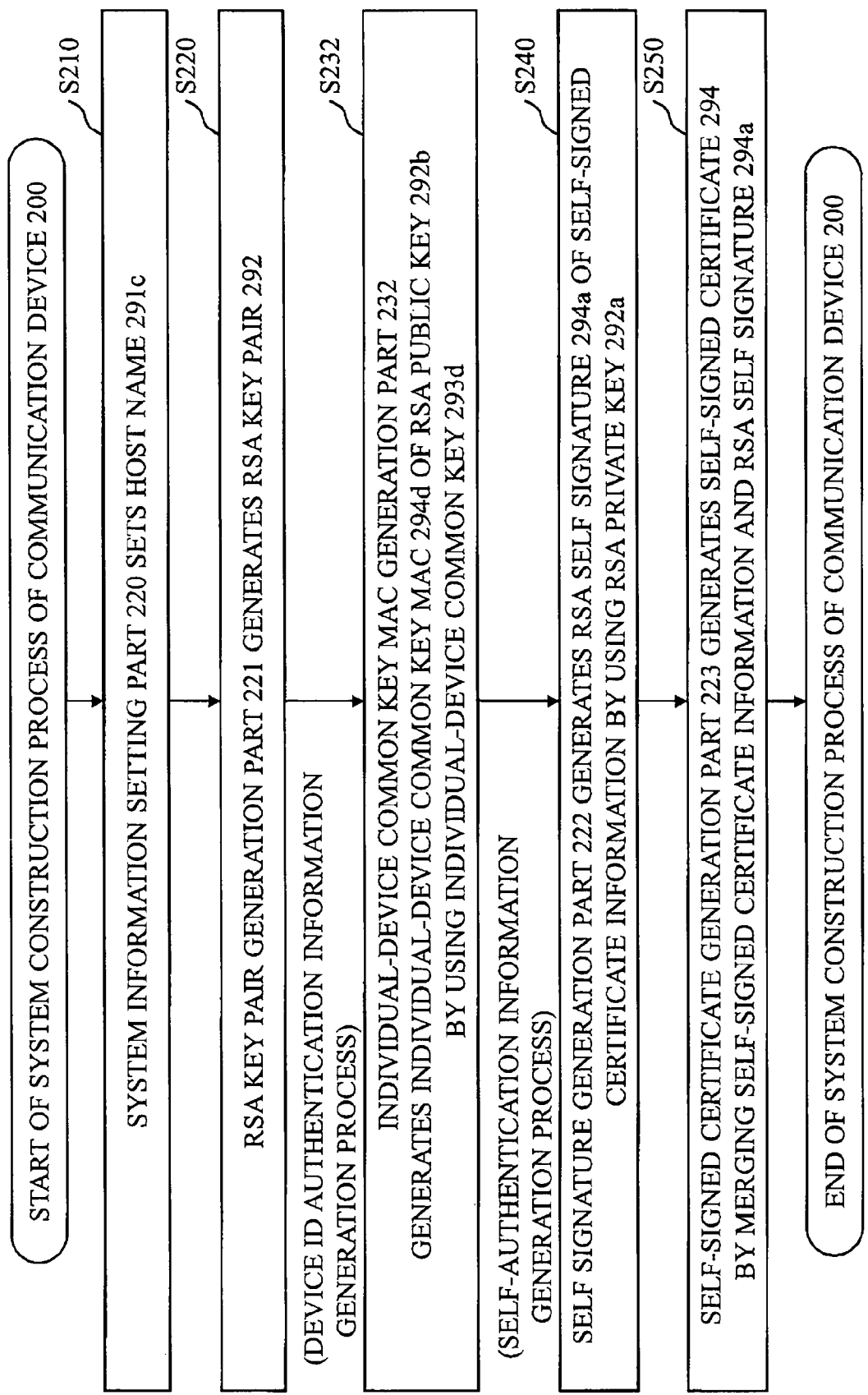
FIG. 25 is a flowchart showing the system construction process of the communication device 200 of the fifth embodiment.

FIG. 25 is a flowchart showing the system construction process of the communication device 200 of the fifth embodiment.

The system construction process of the communication device 200 of the fifth embodiment will be described with reference to FIG. 25.

The flowchart shown in FIG. 25 is obtained by altering S230 in the system construction process (see FIG. 7) of the communication device 200 of the first embodiment to S232 to be described below.

<S232>

After S220, the individual-device common key MAC generation part 232 acquires the individual-device common key 293d and RSA public key 292b from the device storage part 290.

The individual-device common key MAC generation part 232 executes the MAC algorithm (for example, HMAC-SHA1 or HMAC-MD5) by treating the acquired individual-device common key 293d and RSA public key 292b as input values, to generate the individual-device common key MAC 294d of the RSA public key 292b.

The individual-device common key MAC generation part 232 stores the generated individual-device common key MAC 294*d* of the RSA public key 292*b* in the device storage part 290.

After S232, the process proceeds to S240.

In S240 and S250, the self-signed certificate information includes the individual-device common key MAC 294*d* in place of the ID-based encryption signature 294*b*.

FIG. 26 is a view showing stored data at the time of system construction (after the system construction process) of the communication device 200 of the fifth embodiment.

As shown in FIG. 26, after the system construction process of the communication device 200, the device unique ID 291*b*, individual-device common key 293*d*, host name 291*c*, RSA key pair 292, and self-signed certificate 294 are stored in the device storage part 290 (not shown) of the communication device 200.

The RSA public key 292*b*, the expiration date of the self-signed certificate 294, the host name 291*c*, the device unique ID 291*b*, the individual-device common key MAC 294*d*, and the RSA self signature 294*a* are set in the self-signed certificate 294.

Figure 27:
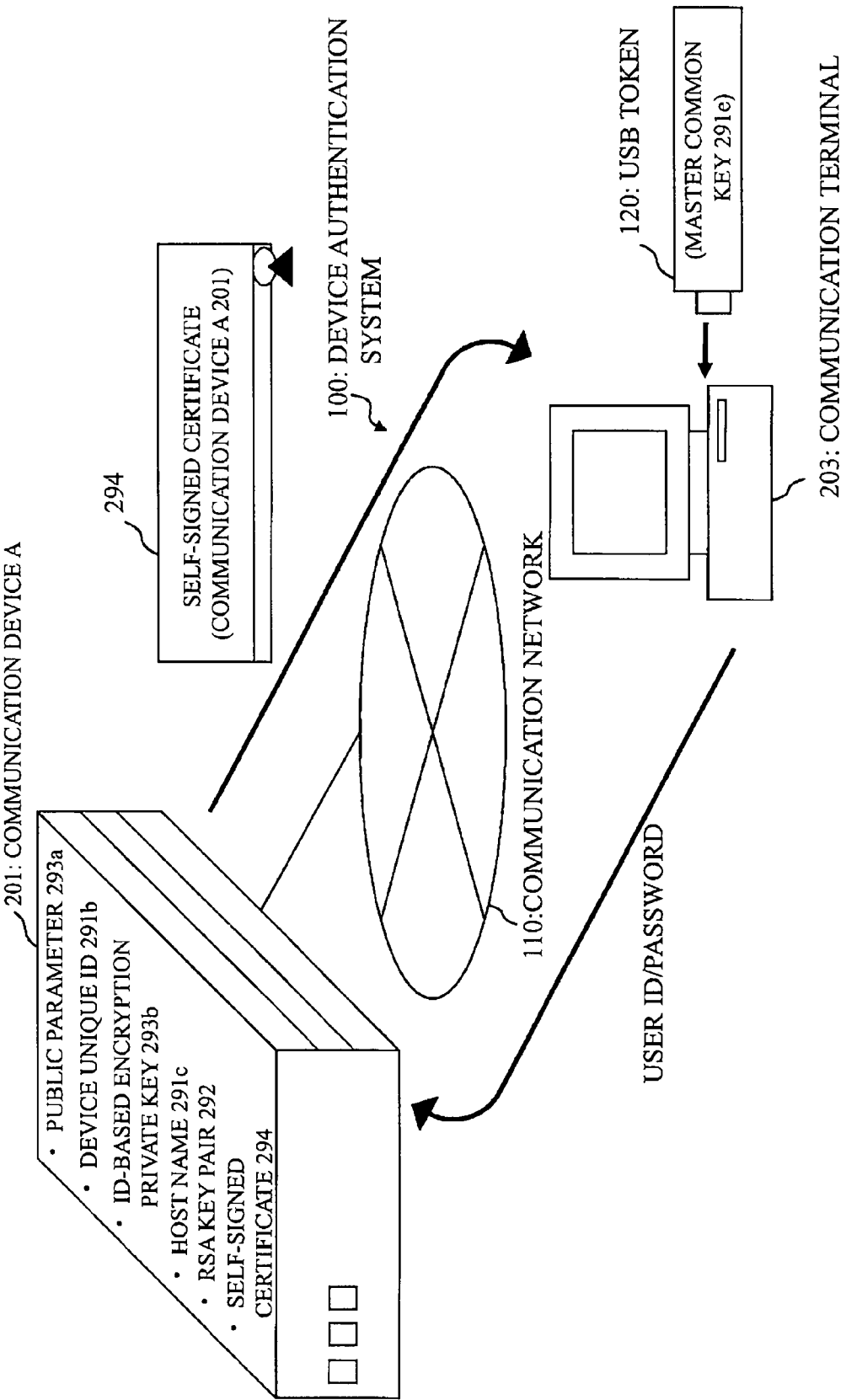
FIG. 27 is a view showing the operation outline of a device authentication system 100 of the fifth embodiment.

FIG. 27 is a view showing the operation outline of a device authentication system 100 of the fifth embodiment.

As shown in FIG. 27, the communication device A 201 communicates with a communication terminal 203.

The communication terminal 203 has an interface connected to a USB token 120 (USB: Universal Serial Bus). For example, the communication terminal 203 is a personal computer.

The communication terminal 203 comprises the SSL communication part 240, the self-signed certificate verification part 241, and the cryptographic authentication communication part 242.

When the user of the communication terminal 203 tries to access the communication device A 201 from the communication terminal 203, the user connects to the communication terminal 203 the USB token 120 which stores the same master common key 291*e* as the master common key 291*e* registered in the communication device 200 at the time of manufacture. In place of the USB token 120, an IC card or another medium may be employed as a medium that can securely store the master common key 291*e*.

Assume that the communication device A 201 stores the user ID and password of the user who is permitted to access the communication device A 201.

Figure 28:
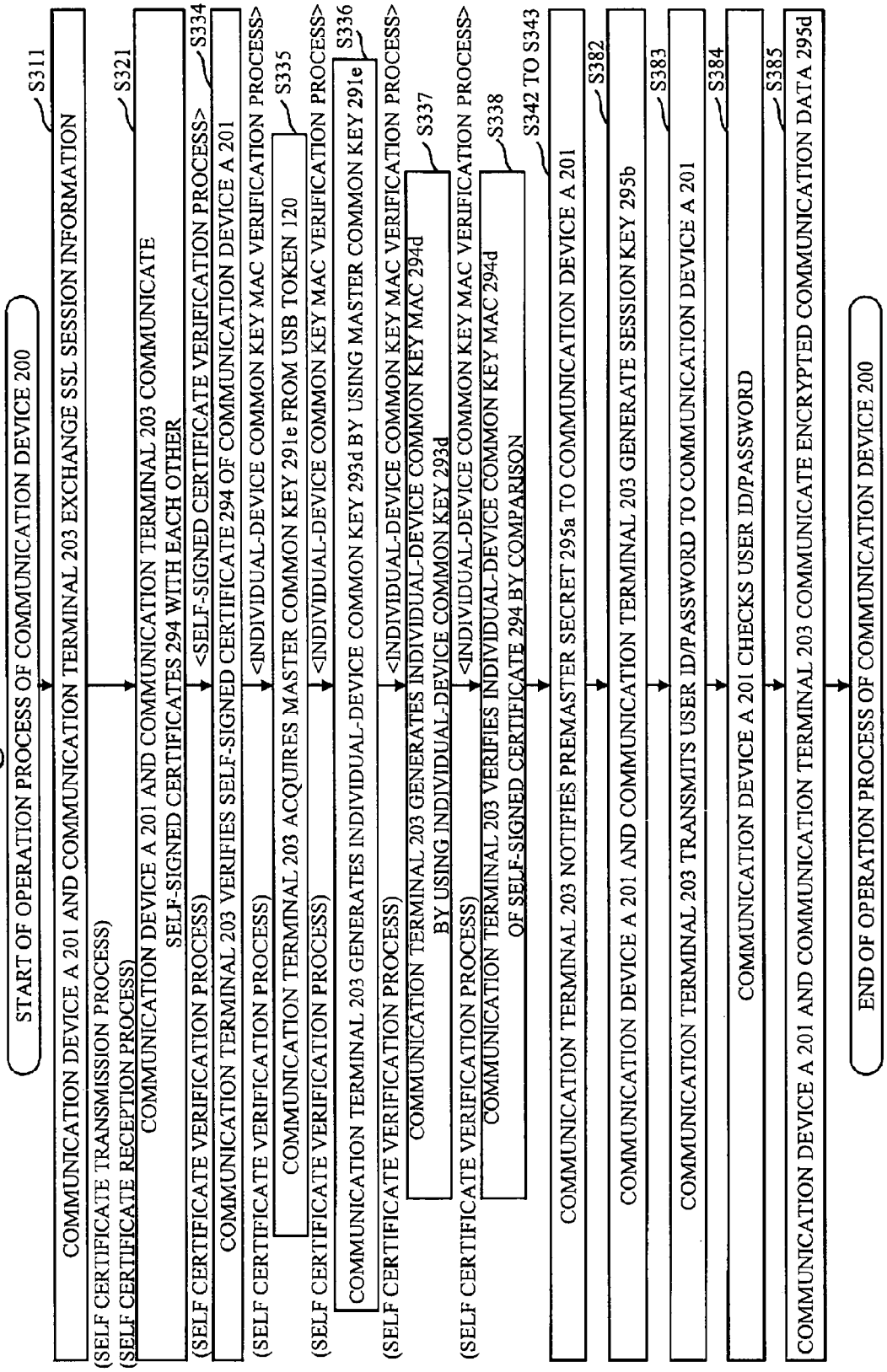
FIG. 28 is a flowchart showing the operation process of the communication device 200 of the fifth embodiment.

FIG. 28 is a flowchart showing the operation process of the communication device 200 of the fifth embodiment.

The operation process of the communication device 200 of the fifth embodiment will be described with reference to FIG. 28.

<S311>

The communication device A 201 and the communication terminal 203 exchange the SSL session information in the same manner as the communication device A 201 and communication device B 202 do in S310 of the first embodiment (see FIG. 10).

After S311, the process proceeds to S321.

<S321: Example of Self Certificate Transmission Process and Self Certificate Reception Process>

The SSL communication part 240 of the communication device A 201 transmits the self-signed certificate 294 to the communication terminal 203 in the same manner as in S322 of the first embodiment.

The SSL communication part 240 of the communication terminal 203 need not transmit the self-signed certificate 294 to the communication device A 201.

After S321, the process proceeds to S330.

<S334: Self-Signed Certificate Verification Process (Example of Self Certificate Verification Process)>

The self-signed certificate verification part 241 of the communication terminal 203 verifies the self-signed certificate 294 of the communication device A 201 in the same manner as the communication device B 202 does in S330 of the first embodiment.

If the self-signed certificate 294 of the communication device A 201 is valid, the process proceeds to S335.

<S335: Individual-Device Common Key MAC Verification Process (Example of Self Certificate Verification Process)>

The self-signed certificate verification part 241 of the communication terminal 203 acquires the master common key 291*e* from the USB token 120 connected to the communication terminal 203.

After S335, the process proceeds to S336.

<S336: Individual-Device Common MAC Verification Process (Example of Self Certificate Verification Process)>

The self-signed certificate verification part 241 of the communication terminal 203 executes the MAC algorithm by treating the master common key 291*e* acquired in S335 and the device unique ID 291*b* set in the self-signed certificate 294 of the communication device A 201 as input values, to generate the individual-device common key 293*d*. In S335 and S336, generation of the individual-device common key 293*d* may alternatively be carried out in the USB token 120 that confidentially holds the master common key 291*e*. In this case, the individual-device common key 293*d* is an output in response to the device unique ID 291*b* as an input.

The processing content is the same as that of the generation process (see S1, 14 of FIG. 23) of the individual-device common key 293*d* performed by the communication device A 201.

After S336, the process proceeds to S337.

<S337: Individual-Device Common Key MAC Verification Process (Example of Self Certificate Verification Process)>

The self-signed certificate verification part 241 of the communication terminal 203 executes the MAC algorithm by treating the individual-device common key 293*d* generated in S336 and the RSA public key 292*b* set in the self-signed certificate 294 of the communication device A 201 as input values, to generate the individual-device common key MAC 294*d* of the RSA public key 292*b*.

The processing content is the same as that of the generation process (see S232 of FIG. 25) of the individual-device common key MAC 294*d* performed by the communication device A 201.

After S337, the process proceeds to S338.

<S338: Individual-Device Common Key MAC Verification Process (Example of Self Certificate Verification Process)>

The self-signed certificate verification part 241 of the communication terminal 203 compares the individual-device common key MAC 294*d* set in the self-signed certificate 294 of the communication device A 201, with the individual-device common key MAC 294*d* generated in S337.

When the individual-device common key MACs 294*d* coincide, the self-signed certificate verification part 241 of the communication terminal 203 determines that the individual-device common key MAC 294*d* set in the self-signed certificate 294 of the communication device A 201 is valid. If the individual-device common key MACs 294*d* do not coincide, the self-signed certificate verification part 241 determines that the individual-device common key MAC 294d set in the self-signed certificate 294 of the communication device A 201 is not valid.

The self-signed certificate verification part 241 of the communication terminal 203 verifies the individual-device common key MAC 294d set in the self-signed certificate 294, by comparing the individual-device common key MAC 294d with the individual-device common key MAC 294d generated in accordance with the same method as that employed by the communication device A 201.

Hence, if the individual-device common key MAC 294d is valid, it guarantees that the communication party of the communication device B 202 is the communication device A 201.

If the individual-device common key MAC 294d is valid, the process proceeds to S342.

If the individual-device common key MAC 294d is not valid, the communication device B 202 ends communication with the communication device A 201, and the operation process of the communication device 200 ends.

The illustration of a process branch is omitted for a case wherein the individual-device common key MAC 294d is not valid.

<S342>

The SSL communication part 240 of the communication terminal 203 generates the premaster secret 295a in the same manner as in S340 of the first embodiment, and transmits the premaster secret 295a encrypted by using the RSA public key 292b to the communication device A 201.

After S342, the process proceeds to S343.

<S343>

The SSL communication part 240 of the communication device A 201 decrypts the premaster secret 295a received from the communication terminal 203, by using the RSA private key 292a in the same manner as in S341 of the first embodiment.

After S343, the process proceeds to S382.

<S382>

The SSL communication part 240 of the communication device A 201 and the SSL communication part 240 of the communication terminal 203 generate the session key 295b based on the premaster secret 295a, in the same manner as in S380 of the first embodiment.

After S382, the process proceeds to S383.

<S383>

The user of the communication terminal 203 inputs his user ID and password in the communication terminal 203.

The cryptographic authentication communication part 242 of the communication terminal 203 encrypts the user ID and password which are input by the user, by using the session key 295b, and transmits the encrypted user ID and password to the communication device A 201.

After S383, the process proceeds to S384.

<S384>

The cryptographic authentication communication part 242 of the communication device A 201 receives the user ID and password transmitted from the communication terminal 203, and decrypts the received user ID and password by using the session key 295b.

The cryptographic authentication communication part 242 of the communication device A 201 compares the decrypted user ID and password with the user ID and password stored in the device storage part 290 in advance.

If the comparison result indicates coincidence, the cryptographic authentication communication part 242 of the communication device A 201 authenticates the user of the communication terminal 203. If the comparison result does not indicate coincidence, the cryptographic authentication communication part 242 of the communication device A 201 does not authenticate the user of the communication terminal 203.

If the user is not authenticated, S383 to S384 are repeated until the user is authenticated. The illustration of a process branch is omitted for a case wherein the user is not authenticated.

When the user is authenticated, the process proceeds to S385.

<S385>

The cryptographic authentication communication part 242 of the communication device A 201 and the cryptographic authentication communication part 242 of the communication terminal 203 communicate the communication data 295d which is encrypted by using the session key 295b, in the same manner as in S381 of the first embodiment.

After the necessary data communication ends in S385, the process ends.

The communication terminal 203 may be a communication device 200 that generates the self-signed certificate 294 and transmits the generated self-signed certificate 294 to the communication party (communication device A 201), in the same manner as the communication device A 201 does.

In this case, the communication device A 201 verifies the self-signed certificate 294 of the communication terminal 203 and the individual-device common key MAC 294d set in the self-signed certificate 294, in the same manner as in the process (S330, S334 to S337) executed by the communication terminal 203.

In the fifth embodiment, an embodiment has been described wherein the communication device 200 generates the digital signature of the RSA public key 292b by using not the ID-based encryption private key 293b but the unique common key of the device, and sets the generated digital signature of the RSA public key 292b in the self-signed certificate 294.

The device authentication system 100 is advantageous in that it guarantees the communication party based on the self-signed certificate 294 even if the certificate authority does not issue a certificate, in the same manner as in the first embodiment.

The communication device 200 may generate the self-signed certificate 294 in the manufacturing process, in the same manner as in the second embodiment.

The communication device 200 may update the self-signed certificate 294, in the same manner as in the third embodiment.

Embodiment 6

An embodiment will be described wherein the communication device 200 prevents the ID-based encryption private key 293b or RSA private key 292a from leaking.

An explanation will be made mainly on matters that are different from the first embodiment. An explanation on matters that are identical to those of the first embodiment will be omitted.

Figure 29:
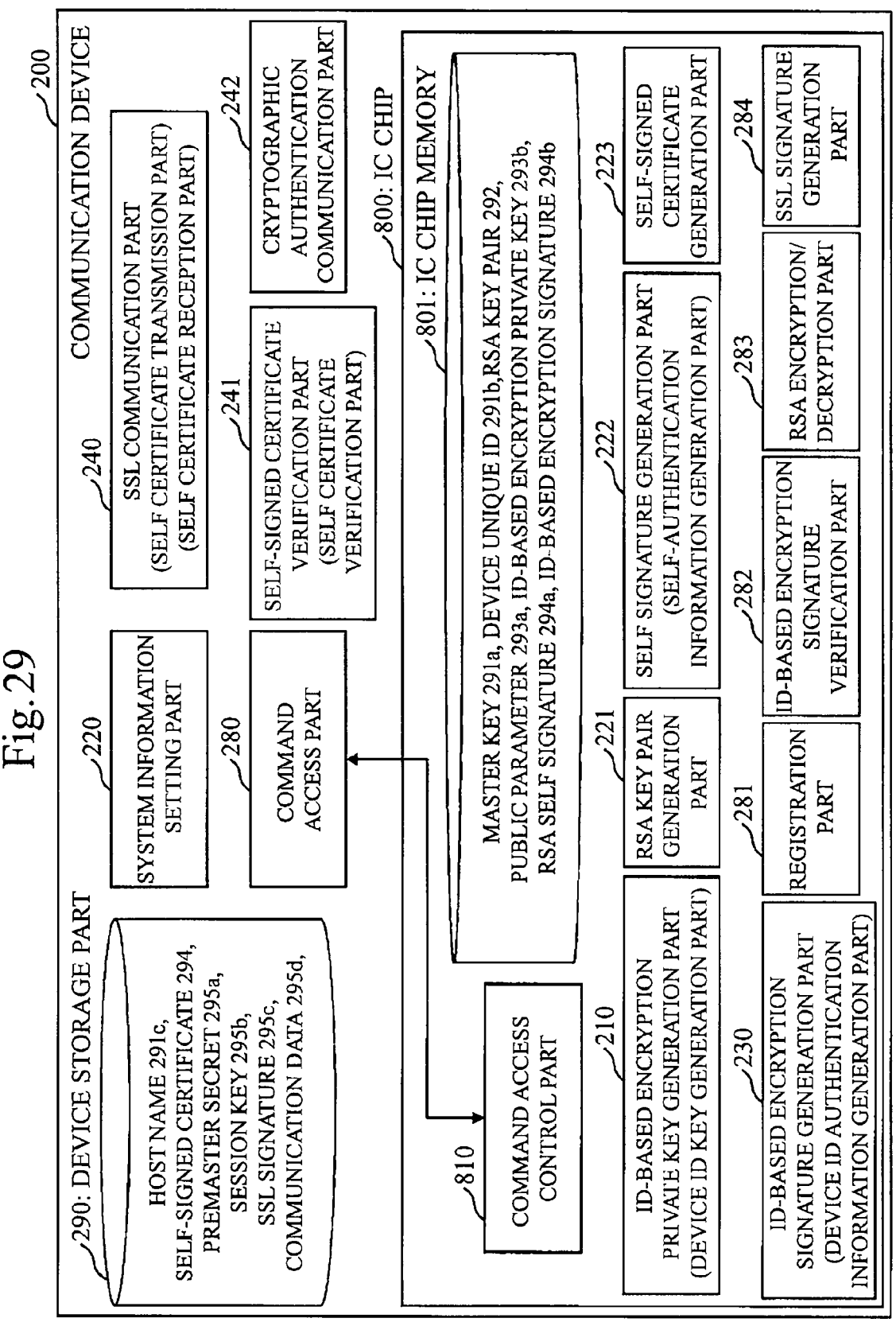
FIG. 29 is a function block diagram of a communication device 200 of the sixth embodiment.

FIG. 29 is a function block diagram of the communication device 200 of the sixth embodiment.

The function blocks of the communication device 200 of the sixth embodiment will be described with reference to FIG. 29.

The communication device 200 has an IC chip 800 (IC: Integrated Circuit), and the IC chip 800 has an IC chip memory 801 (an example of an access-limited data storage part).

The communication device 200 also has a command access part 280 which generates a command for requesting a specific process of the IC chip 800.

The master key 291a, the device unique ID 291b, the RSA key pair 292 (the RSA private key 292a, the RSA public key 292b), the public parameter 293a, the ID-based encryption private key 293b, the RSA self signature 294a, and the ID-based encryption signature 294b (examples of access-limited data) are stored in the IC chip memory 801.

Other data are stored in the device storage part 290 outside of the IC chip 800.

A process request for the IC chip 800 is made by using a command (interface) defined in advance.

The data stored in the IC chip memory 801 cannot be directly accessed from the outside of the IC chip 800, even from within the communication device 200.

For example,
(1) a registration command, (2) an IDBE private key generation command (IDBE: ID-Based encryption), (3) a certificate generation command, (4) an IDBE signature verification command, (5) an RSA encryption/decryption command, and (6) an SSL signature command are defined.

(1) The registration command is a command used for registering the master key 291a, the public parameter 293a, and the device unique ID 291b.

(2) The IDBE private key generation command is a command used for generating the ID-based encryption private key 293b.

(3) The certificate generation command is a command used for generating the self-signed certificate 294.

(4) The IDBE signature verification command is a command used for verifying the ID-based encryption signature 294b.

(5) The RSA encryption/decryption command is a command used for performing encryption/decryption by using the RSA key pair 292.

(6) The SSL signature command is a command used for generating the SSL signature 295c.

Also, for example, (7) an RSA key pair generation command and (8) a key read command are defined.

(7) The RSA key pair generation command is a command used for generating the RSA key pair 292.

(8) The key read command is a command to read the master key 291a, the RSA key pair 292, the ID-based encryption private key 293b, and the public parameter 293a.

The IC chip 800 includes the ID-based encryption private key generation part 210, the RSA key pair generation part 221, the self signature generation part 222, the self-signed certificate generation part 223, the ID-based encryption signature generation part 230, a registration part 281, an ID-based encryption signature verification part 282, an RSA encryption/decryption part 283, an SSL signature generation part 284, and a command access control part 810 (an example of the access limiting part).

Other elements of the communication device 200 are provided outside of the IC chip 800.

The command access control part 810 accepts only a command that does not output specific data (for example, the ID-based encryption private key 293b, RSA private key 292a) stored in the IC chip memory 801 to the outside of the IC chip 800, and operates the elements in the IC chip 800 in accordance with the accepted command.

By limiting the command to accept, the command access control part 810 limits access to the data stored in the IC chip memory 801, so that data leak is prevented.

For example, the command access control part 810 accepts the commands (1) to (6), but does not accept the commands (7) and (8) and rejects them.

The registration part 281 registers the master key 291a, the device unique ID 291b, and the public parameter 293a in the IC chip memory 801.

By using the public parameter 293a stored in the IC chip memory 801, the ID-based encryption signature verification part 282 verifies the ID-based encryption signature 294b.

By using the RSA key pair 292 stored in the IC chip memory 801, the RSA encryption/decryption part 283 encrypts and decrypts data.

By using the RSA private key 292a stored in the IC chip memory 801, the SSL signature generation part 284 generates the SSL signature 295c.

FIG. 30 is a flowchart showing the manufacturing process of the communication device 200 of the sixth embodiment.

The manufacturing process of the communication device 200 of the sixth embodiment will be described with reference to FIG. 30.

<S101>

The manufacturer inputs the master key 291a, device unique ID 291b, and public parameter 293a to be registered, into the communication device 200.

The command access part 280 generates a registration command in which the input master key 291a, device unique ID 291b, and public parameter 293a are set, and inputs the generated registration command into the IC chip 800. The registration command is a command whose acceptance is allowed by the command access control part 810 of the IC chip 800.

The command access control part 810 of the IC chip 800 judges the input registration command, and accepts the registration command.

The registration part 281 stores the master key 291a, device unique ID 291b, and public parameter 293a which are set in the registration command, in the IC chip memory 801.

After S101, the process proceeds to S102.

<S102>

The command access part 280 generates the IDBE private key generation command, and inputs the generated IDBE private key generation command into the IC chip 800. The IDBE private key generation command is a command whose acceptance is allowed by the command access control part 810 of the IC chip 800.

After S102, the process proceeds to S110.

<S110>

The command access control part 810 of the IC chip 800 judges the input IDBE private key generation command, and accepts the IDBE private key generation command.

The ID-based encryption private key generation part 210 generates the ID-based encryption private key 293b based on the master key 291a, device unique ID 291b, and public parameter 293a, in the same manner as in the first embodiment (see FIG. 5). The master key 291a, device unique ID 291b, and public parameter 293a are stored in the IC chip memory 801.

The ID-based encryption private key generation part 210 stores the generated ID-based encryption private key 293b in the IC chip memory 801.

After S110, the process proceeds to S120.

<S120>

The ID-based encryption private key generation part 210 deletes the master key 291a in the same manner as in the first embodiment. The master key 291a is deleted from the IC chip memory 801.

With S120, the manufacturing process ends.

FIG. 31 is a flowchart showing the system construction process of the communication device 200 of the sixth embodiment.

The system construction process of the communication device 200 of the sixth embodiment will be described with reference to FIG. 31.

<S210>

The system information setting part 220 stores the host name 291c input by the administrator in the device storage part 290, in the same manner as in the first embodiment (see FIG. 7).

After S210, the process proceeds to S290.

<S290>

The command access part 280 generates a certificate generation command in which the host name 291c and other data are set as data to be included in the self-signed certificate information, and inputs the generated certificate command into the IC chip 800. The certificate generation command is a command whose acceptance is allowed by the command access control part 810 of the IC chip 800.

After S290, the process proceeds to S220.

<S220>

The command access control part 810 of the IC chip 800 judges the input certificate generation command, and accepts the certificate generation command.

The RSA key pair generation part 221 generates the RSA key pair 292 (the RSA private key 292a, the RSA public key 292b) in the same manner as in the first embodiment (see FIG. 7).

The RSA key pair generation part 221 stores the generated RSA key pair 292 in the IC chip memory 801.

After S220, the process proceeds to S230.

<S230>

The ID-based encryption signature generation part 230 generates the ID-based encryption signature 294b of the RSA public key 292b by using the ID-based encryption private key 293b, in the same manner as in the first embodiment. The ID-based encryption private key 293b and RSA public key 292b are stored in the IC chip memory 801.

The ID-based encryption signature generation part 230 stores the generated ID-based encryption signature 294b of the RSA public key 292b, in the IC chip memory 801.

After S230, the process proceeds to S240.

<S240>

The self signature generation part 222 generates the RSA self signature 294a of the self-signed certificate information by using the RSA private key 292a, in the same manner as in the first embodiment. Of the self-signed certificate information, some data including the host name 291c are set in the certificate generation command. The RSA private key 292a is stored in the IC chip memory 801.

The self signature generation part 222 stores the generated RSA self signature 294a in the IC chip memory 801.

After S240, the process proceeds to S250.

<S250>

The self-signed certificate generation part 223 generates the self-signed certificate 294 by merging the self-signed certificate information and the RSA self signature 294a, in the same manner as in the first embodiment.

The command access control part 810 outputs the generated self-signed certificate 294 to the command access part 280. The command access part 280 stores the output self-signed certificate 294 in the device storage part 290.

With S250, the system construction process ends.

FIG. 32 is a flowchart showing the operation process of the communication device 200 of the sixth embodiment.

The operation process of the communication device 200 of the sixth embodiment will be described with reference to FIG. 32.

<S310 to S320>

The communication device A 201 and the communication device B 202 exchange the SSL session information (S310) in the same manner as in the first embodiment (see FIG. 10), and communicate the self-signed certificates 294 with each other (S320).

After S320, the process proceeds to S330.

<S330>

The self-signed certificate verification part 241 of the communication device B 202 verifies the self-signed certificate 294 of the communication device A 201 in the same manner as in the first embodiment.

After S330, the process proceeds to S331. Note that if the self-signed certificate 294 is invalid, the operation process ends, in the same manner as in the first embodiment.

<S331>

The self-signed certificate verification part 241 of the communication device B 202 requests the IDBE signature verification command from the command access part 280.

The command access part 280 generates the IDBE signature verification command in which the self-signed certificate 294 of the communication device A 201 is set, and inputs the generated IDBE signature verification command into the IC chip 800. The IDBE signature command is a command whose acceptance is allowed by the command access control part 810 of the IC chip 800.

The command access control part 810 of the IC chip 800 judges the input IDBE signature verification command, and accepts the IDBE signature verification command.

The ID-based encryption signature verification part 282 verifies the ID-based encryption signature 294b of the self-signed certificate 294 in the same manner as the self-signed certificate verification part 241 of the first embodiment does. The self-signed certificate 294 has been set in the IDBE signature verification command. The public parameter 293a to be used for verification has been stored in the IC chip memory 801.

The command access control part 810 outputs the verification result to the command access part 280. The command access part 280 outputs the output verification result to the self-signed certificate verification part 241.

After S331, the process proceeds to S340. Note that if the ID-based encryption signature 294b is invalid, the operation process ends, in the same manner as in the first embodiment.

<S340>

The SSL communication part 240 of the communication device B 202 generates the premaster secret 295a in the same manner as in the first embodiment, encrypts the generated premaster secret 295a, and transmits the encrypted premaster secret 295a to the communication device A 201.

After S340, the process proceeds to S341.

<S341>

The SSL communication part 240 of the communication device A 201 receives the encrypted premaster secret 295a.

The SSL communication part 240 of the communication device A 201 requests from the command access part 280 the RSA decryption command that decrypts the premaster secret 295a.

The command access part 280 generates the RSA decryption command in which the encrypted premaster secret 295a has been set, and inputs the generated RSA decryption command into the IC chip 800. The RSA command is a command whose acceptance is allowed by the command access control part 810 of the IC chip 800.

The command access control part 810 of the IC chip 800 judges the input RSA decryption command, and accepts the RSA decryption command.

The RSA encryption/decryption part 283 decrypts the premaster secret 295a by using the RSA private key 292a, in the same manner as the SSL communication part 240 of the first embodiment does. The RSA private key 292a has been stored in the IC chip memory 801.

The command access control part 810 outputs the decrypted premaster secret 295a to the command access part 280. The command access part 280 stores the output premaster secret 295a in the device storage part 290.

After S341, the process proceeds to S350.

<S350>

The SSL communication part 240 of the communication device B 202 requests the SSL signature command from the command access part 280.

The command access part 280 generates the SSL signature command in which the handshake message (information communicated between the communication device A 201 and communication device B 202) has been set, and inputs the generated SSL signature command into the IC chip memory 801. The SSL signature command is a command whose acceptance is allowed by the command access control part 810 of the IC chip 800.

The command access control part 810 of the IC chip 800 judges the input SSL signature command and accepts the SSL signature command.

The SSL signature generation part 284 generates the signature of the handshake message as the SSL signature 295c by using the RSA private key 292a, in the same manner as the SSL communication part 240 of the first embodiment does. The RSA private key 292a has been stored in the IC chip memory 801.

The command access control part 810 outputs the SSL signature 295c to the command access part 280. The command access part 280 outputs the SSL signature 295c to the SSL communication part 240. The SSL communication part 240 transmits the SSL signature 295c to the communication device A 201.

The SSL communication part 240 of the communication device A 201 receives the SSL signature 295c of the communication device B 202, and stores the received SSL signature 295c in the device storage part 290.

After S350, the process proceeds to S360.

<S360>

The communication device A 201 verifies the self-signed certificate 294 of the communication device B 202 in the same manner as the communication device B 202 does in S330.

After S360, the process proceeds to S361. Note that if the self-signed certificate 294 is invalid, the operation process ends, in the same manner as in S330.

<S361>

The communication device A 201 verifies the ID-based encryption signature 294b set in the self-signed certificate 294 of the communication device B 202, in the same manner as the communication device B 202 does in S331.

After S361, the process proceeds to S370. Note that if the ID-based encryption signature 294b is invalid, the operation process ends, in the same manner as in S331.

<S370>

The SSL communication part 240 of the communication device A 201 verifies the SSL signature 295c of the communication device B 202, in the same manner as in the first embodiment.

After S370, the process proceeds to S380. Note that if the SSL signature 295c is invalid, the operation process ends, in the same manner as in the first embodiment.

<S380 to S381>

S380 to S381 are performed in the same manner as in the first embodiment.

The SSL communication part 240 of the communication device A 201 and the SSL communication part 240 of the communication device B 202 generate the session key 295b (S380), and performs cryptographic communication of the communication data 295d by using the generated session key 295b (S381).

With S381, the operation process ends.

In the sixth embodiment, for example, the following device authentication system 100 has been described.

The device authentication system 100 solves the following problems.

(1) If an ID-based encryption private key 293b leaks to the outside, an ID-based encryption signature 294b may be generated based on the ID-based encryption private key 293b that has leaked, and an outsider may perform communication by passing itself as the authentic communication party.

(2) An outsider may wrongfully use the ID-based encryption signature generation part 230, generate an ID-based encryption signature 294b that uses its own RSA public key, and perform communication by passing itself as the authentic communication party.

(3) If the RSA private key 292a leaks to the outside, the premaster secret may be decrypted, and an outsider may perform communication by passing itself as the authentic communication party.

Since the communication device 200 comprises the IC chip 800 having a certificate generation function, the communication device 200 need not have a communication function to communicate with the certificate issuance server. In other words, since highly secure communication need not be realized between the communication device 200 and the certificate issuance server, the cost can be reduced accordingly.

The communication device 200 takes countermeasures against the leakage of the ID-based encryption private key 293b, the wrongful use of the ID-based encryption signature generation part 230, and the leakage of the RSA private key 292a, so that an identity fraud by an outsider communication device is prevented.

When the self-signed certificate 294 is verified successfully, it guarantees that the ID-based encryption signature 294b included in the self-signed certificate 294 has been generated by the communication device 200 identified by the device unique ID 291b included in the self-signed certificate 294, based on the following reason.

(1) The ID-based encryption private key 293b stored in the IC chip 800 is accessed only when the certificate generation command is executed. Any other commands that try to access the ID-based encryption private key 293b are rejected by the command access control part 810. Hence, falsification of the ID-based encryption signature 294b is prevented.

(2) The RSA private key 292a corresponding to the RSA public key 292b included in the self-signed certificate 294 is accessed only when the certificate generation command, the RSA description command, or the SSL signature command is executed. Any other commands that try to access the RSA private key 292a are rejected by the command access control part 810. Hence, the RSA private key 292a is prevented from leaking to the outside. Namely, the self-signed certificate 294 will not be falsified. The self-signed certificate 294 is guaranteed to have been generated by the communication device 200 identified by the device unique ID 291b used for generation of the ID-based encryption signature 294b.

The IC chip 800 (IC chip memory 801) is an example of an element that limits access to the internal data. Access to the RSA private key 292a, ID-based encryption private key 293b, or the like may be limited by an element other than the IC chip 800.

The communication device 200 may generate the self-signed certificate 294 in the manufacturing process, in the same manner as in the second embodiment.

The communication device 200 may update the self-signed certificate 294 in the same manner as in the third embodiment.

The communication device 200 may set the individual-device RSA signature 294c in the self-signed certificate 294 in place of the ID-based encryption signature 294b by using the individual-device RSA key pair 293c in place of the ID-based encryption private key 293b, in the same manner as in the fourth embodiment.

The communication device 200 may also set the individual-device common key MAC 294d in the self-signed certificate 294 in place of the ID-based encryption signature 294b by using the individual-device common key 293d in place of the ID-based encryption private key 293b, in the same manner as in the fifth embodiment.

REFERENCE SIGNS LIST 100 device authentication system, 110 communication network, 120 USB token, 200 communication device, 201 communication device A, 202 communication device B, 203 communication terminal, 210 ID-based encryption private key generation part, 211 individual-device RSA key pair generation part, 212 individual-device signature generation part, 213 individual-device certificate generation part, 214 individual-device common key generation part, 220 system information setting part, 221 RSA key pair generation part, 222 self signature generation part, 223 self-signed certificate generation part, 224 certificate update opportunity detection part, 230 ID-based encryption signature generation part, 231 individual-device RSA signature generation part, 232 individual-device common key MAC generation part, 240 SSL communication part, 241 self-signed certificate verification part, 242 cryptographic authentication communication part, 280 command access part, 281 registration part, 282 ID-based encryption signature verification part, 283 RSA encryption/decryption part, 284 SSL signature generation part, 290 device storage part, 291a master key, 291b device unique ID, 291c host name, 291d master RSA key pair, 291d1 master RSA private key, 291d2 master RSA public key, 291e master common key, 292 RSA key pair, 292a RSA private key, 292b RSA public key, 293a public parameter, 293b ID-based encryption private key, 293c individual-device RSA key pair, 293c1 individual-device RSA private key, 293c2 individual-device RSA public key, 293d individual-device common key, 294 self-signed certificate, 294a RSA self signature, 294b ID-based encryption signature, 294c individual-device RSA signature, 294d individual-device common key MAC, 295a premaster secret, 295b session key, 295c SSL signature, 295d communication data, 296 individual-device certificate, 296a individual-device signature, 800 IC chip, 801 IC chip memory, 810 command access control part, 911 CPU, 912 bus, 913 ROM, 914 RAM, 915 communication board, 920 magnetic disk device, 921 OS, 923 programs, 924 files

The invention claimed is:

1. A self-authentication communication device comprising:
   a device ID key generation part that generates, based on a device ID (IDentity) that identifies the self-authentication communication device, encryption key data as a device ID key by using a CPU (Central Processing Unit);
   a device ID authentication information generation part that generates, based on public key data of the self-authentication communication device and the device ID key generated by the device ID key generation part, authentication information of the public key data as device ID authentication information by using the CPU;
   a self-authentication information generation part that generates, based on predetermined data and private key data of the self-authentication communication device, authentication information of the predetermined data as self-authentication information by using the CPU; and
   a self certificate transmission part that transmits a digital certificate, including the predetermined data, the device ID authentication information generated by the device ID authentication information generation part, and the self-authentication information generated by the self-authentication information generation part, to a specific device as a self certificate by using a communication unit.

2. The self authentication communication device according to claim 1,
   wherein the device ID key generation part generates an ID-based encryption private key, for which the device ID is used as an ID-based encryption public key, as the device ID key in accordance with an ID-based encryption system,
   wherein the device ID authentication information generation part generates an ID-based encryption private key signature, which is a digital signature of the public key data, as the device ID authentication information by using the ID-based encryption private key, and
   wherein the self-authentication information generation part generates a self signature, which is a digital signature of the predetermined data, as the self-authentication information by using the private key data.

3. The self-authentication communication device according to claim 2, wherein the self certificate transmission part transmits the self certificate, including the public key data, the device ID, an ID-based encryption private key signature, and the self signature, to the specific device.

4. The self-authentication communication device according to claim 3, further comprising an authentication key pair update part that updates the private key data and the public key data, as an authentication key pair at a predetermined timing by using the CPU,
   wherein the device ID authentication information generation part newly generates the device ID authentication information based on the public key data updated by the authentication key pair update part,
   wherein the self-authentication information generation part newly generates the self-authentication information based on the private key data updated by the authentication key pair update part, and
   wherein the self certificate transmission part transmits a self certificate, including the device ID authentication information newly generated by the device ID authentication information generation part and the self-authentication information newly generated by the self-authentication information generation part, to the specific device.

5. The self-authentication communication device according to claim 4, further comprising:
an access-limited data storage part that stores the device ID key as access-limited data; and
an access limiting part that limits access to the access-limited data stored in the access-limited data storage part and limits access to the device ID key to access from the device ID authentication information generation part.

6. The self-authentication communication device according to claim 5,
wherein the access-limited data storage part stores the private key data as access-limited data, and
wherein the access limiting part limits access to the private key data to access from the self-authentication information generation part.

7. The self-authentication communication device according to claim 6, further comprising an IC chip (IC: Integrated Circuit),
wherein the access-limited data storage part and the access limiting part are provided to the IC chip.

8. The self-authentication communication device according to claim 1,
wherein the device ID key generation part generates an individual-device private key which is private key data, and an individual-device public key which is public key data, as the device ID key in accordance with a public key encryption system by using the device ID,
wherein the device ID authentication information generation part generates an individual-device private key signature, which is a digital signature of the public key data of the self-authentication communication device, as the device ID authentication information by using the individual-device private key, and
wherein the self-authentication information generation part generates a self signature, which is a digital signature of the predetermined data, as the self-authentication information by using the private key data of the self-authentication communication device.

9. The self-authentication communication device according to claim 8, further comprising an individual-device signature generation part that generates a digital signature of the individual-device public key as an individual-device signature based on the private key data of the self-authentication communication device by using the CPU,
wherein the self certificate transmission part transmits the self certificate, including the individual-device signature generated by the individual-device signature generation part, to the specific device.

10. The self-authentication communication device according to claim 1,
wherein the device ID key generation part generates an individual-device common key, which is common key data, as the device ID key in accordance with a common key encryption system by using the device ID,
wherein the device ID authentication information generation part generates an individual-device common key MAC, which is a MAC (Message Authentication Code) of the public key data, as the device ID authentication information by using the individual-device common key, and
wherein the self-authentication information generation part generates a self signature, which is a digital signature of the predetermined data, as the self-authentication information by using the private key data.

11. A self-authentication verification communication device comprising:
a self certificate reception part that receives a self certificate, transmitted by the self-authentication communication device according to claim 1, by using a communication unit; and
a self certificate verification part that verifies the self certificate, received by the self certificate reception part, by using a CPU.

12. A device authentication system comprising:
a self-authentication communication device comprising,
a device ID key generation part that generates, based on a device ID (IDentity) that identifies the self-authentication communication device, encryption key data as a device ID key by using a CPU (Central Processing Unit);
a device ID authentication information generation part that generates, based on public key data of the self-authentication communication device and the device ID key generated by the device ID key generation part, authentication information of the public key data as device ID authentication information by using the CPU,
a self-authentication information generation part that generates, based on predetermined data and private key data of the self-authentication communication device, authentication information of the predetermined data as self-authentication information by using the CPU, and
a self certificate transmission part that transmits a digital certificate, including the predetermined data, the device ID authentication information generated by the device ID authentication information generation part, and the self-authentication information generated by the self-authentication information generation part, to a specific device as a self certificate by using a communication unit; and a self-authentication verification communication device according to claim 11.

13. A device authentication method for a device authentication system including a self-authentication communication device and a self-authentication verification communication device, the method comprising:
in the self-authentication communication device,
with a device ID key generation part, performing a device ID key generation process of generating, based on a device ID (IDentity) that identifies the self-authentication communication device, encryption key data as a device ID key by using a CPU (Central Processing Unit),
with a device ID authentication information generation part, performing a device ID authentication information generation process of generating, based on public key data of the self-authentication communication device and the device ID key generated by the device ID key generation part, authentication information of the public key data as device ID authentication information by using the CPU,
with a self-authentication information generation part, performing a self-authentication information generation process of generating, based on predetermined data and private key data of the self-authentication communication device, authentication information of the predetermined data as self-authentication information by using the CPU, and
with a self certificate transmission part, performing a self certificate transmission process of transmitting a digital certificate, including the predetermined data, the device ID authentication information generated by the device ID authentication information generation part, and the self-authentication information generated by the self-authentication information generation part, to a specific device as a self certificate by using a communication unit; and in the self-authentication verification communication device, with a self certificate reception part, performing a self certificate reception process of receiving the self certificate, transmitted by the self-authentication communication device, by using a communication unit, and with a self certificate verification part, performing a self certificate verification process of verifying the self certificate, received by the self certificate reception part, by using a CPU.

14. A non-transitory computer readable medium storing computer executable instructions for a self-authentication communication process that causes a communication device to execute a device ID key generation process of generating, based on a device ID (IDentity) that identifies the communication device, encryption key data as a device ID key by using a CPU (Central Processing Unit);

a device ID authentication information generation process of generating, based on public key data of the communication device and the device ID key generated by the device ID key generation process, authentication information of the public key data as device ID authentication information by using the CPU;

a self-authentication information generation process of generating, based on predetermined data and private key data of the communication device, authentication information of the predetermined data as self-authentication information by using the CPU; and a self certificate transmission process of transmitting a digital certificate, including the predetermined data, the device ID authentication information generated by the device ID authentication information generation process, and the self-authentication information generated by the self-authentication information generation process, to a specific device as a self certificate by using a communication unit.

15. A non-transitory computer readable medium storing computer executable instructions for a self-authentication verification communication process that causes a communication device to execute a self certificate reception process of receiving a self certificate transmitted by the self-authentication communication device according to claim 1, by using a communication unit, and a self certificate verification process of verifying the self certificate received by the self certificate reception process, by using a CPU.

* * * * *